US012757263B2

(12) United States Patent
Esswie

(10) Patent No.: US 12,757,263 B2
(45) Date of Patent: Oct. 6, 2026

(54) REDUCED CAPABILITY NON-TERRESTRIAL IDLE MODE SIGNALING

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/740,419

(22) Filed: Jun. 11, 2024

(65) Prior Publication Data

US 2025/0380315 A1 Dec. 11, 2025

(51) Int. Cl.
*H04W 76/10* (2018.01)
*H04W 48/10* (2009.01)
*H04W 84/06* (2009.01)

(52) U.S. Cl.
CPC ........... *H04W 76/10* (2018.02); *H04W 48/10* (2013.01); *H04W 84/06* (2013.01)

(58) Field of Classification Search
CPC ...... H04W 76/10; H04W 48/10; H04W 84/06
See application file for complete search history.

(56) References Cited

U.S. PATENT DOCUMENTS 7,454,166 B2 * 11/2008 Patsiokas ............... H04H 60/63 455/3.06
11,985,696 B2 5/2024 Choi
2021/0227490 A1 7/2021 Yiu
2021/0250781 A1 8/2021 Dang
(Continued)

FOREIGN PATENT DOCUMENTS

WO 2022015664 A1 1/2022

OTHER PUBLICATIONS

Esswie, Ali. "Two-Stage Non-Terrestrial Synchronization Signal Detection" U.S. Appl. No. 18/740,401, filed Jun. 11, 2024, 124 pages.
(Continued)

*Primary Examiner* — Kabir A Timory
(74) *Attorney, Agent, or Firm* — Amin, Turocy & Watson, LLP

(57) ABSTRACT

A non-terrestrial radio network node may broadcast a reduced-content synchronization signal block message, via an idle-mode beam, which may indicate non-terrestrial uplink resources usable by a user equipment to transmit a first preamble or a second preamble indicated by the reduced content message. If the user equipment cannot connect with a terrestrial radio network node upon determining to establish a connection with the non-terrestrial node, the user equipment may transmit a second preamble, responsive to which the non-terrestrial node may broadcast full synchronization signal block information via the idle-mode beam. Alternatively, the user equipment may receive, from a terrestrial node, non-terrestrial minimum system information and non-terrestrial beam information indicative of a refined beam, and may transmit, to the non-terrestrial node, a first preamble, responsive to which the non-terrestrial node may activate the refined beam via which the user equipment may establish a connection according to the non-terrestrial minimum system information.

20 Claims, 28 Drawing Sheets

300

(56) References Cited

U.S. PATENT DOCUMENTS

| | | | | |
|---|---|---|---|---|
| 2022/0060959 | A1 | 2/2022 | Atungsiri | |
| 2022/0150858 | A1* | 5/2022 | Ren | H04L 27/2607 |
| 2023/0118153 | A1 | 4/2023 | Medeiros | |
| 2023/0276258 | A1* | 8/2023 | Wei | H04W 16/28 455/422.1 |
| 2023/0403586 | A1 | 12/2023 | Shrestha | |
| 2024/0056925 | A1* | 2/2024 | Maaref | H04W 36/0022 |
| 2024/0080800 | A1 | 3/2024 | Ji | |
| 2024/0121692 | A1 | 4/2024 | Jia | |
| 2024/0163688 | A1 | 5/2024 | Tsai | |
| 2025/0081016 | A1 | 3/2025 | Abedini | |
| 2025/0081066 | A1 | 3/2025 | Khoshkholgh Dashtaki | |
| 2025/0261242 | A1 | 8/2025 | Deogun | |
| 2026/0019225 | A1 | 1/2026 | Ling | |
| 2026/0189951 | A1 | 7/2026 | Cui | |

OTHER PUBLICATIONS

Esswie, Ali. "On-Demand Non-Terrestrial System Information Delivery Over Terrestrial Networks" U.S. Appl. No. 18/740,414, filed Jun. 11, 2024, 123 pages.

"3rd Generation Partnership Project; Technical Specification Group Services and System Aspects; Release 15 Description; Summary of Rel-15 Work Items (Release 15)" 3GPP TR 21.915, V15.0.0, Sep. 2019, 118 pages.

"3rd Generation Partnership Project; Technical Specification Group Services and System Aspects; Technical Specification Group working methods (Release 19)" 3GPP TR 21.900, v19.0.0, Mar. 2025, 43 pages.

Office Action mailed Jul. 17, 2026 for U.S. Appl. No. 18/740,401, 42 pages.

Office Action mailed Jul. 28, 2026 for U.S. Appl. No. 18/740,414, 74 pages.

* cited by examiner

300

310

NTN Uplink preamble configuration

| | TN connectivity state | NTN preamble set |
|---|---|---|
| A | ≥ Minimum coverage threshold (capable of connecting) | Set A (First Set) |
| B | ≤ Minimum coverage threshold (e.g., incapable of connecting) | Set B (Second Set) |

1310

1315

1300

FIG. 13

REDUCED CAPABILITY NON-TERRESTRIAL IDLE MODE SIGNALING

REFERENCE TO RELATED APPLICATIONS

The subject patent application is related to U.S. patent application Ser. No. 18/740,401, filed Jun. 11, 2024, and entitled "TWO-STAGE NON-TERRESTRIAL SYNCHRONIZATION SIGNAL DETECTION" and U.S. patent application Ser. No. 18/740,414, filed Jun. 11, 2024, and entitled "ON-DEMAND NON-TERRESTRIAL SYSTEM INFORMATION DELIVERY OVER TERRESTRIAL NETWORKS", the entireties of which applications are hereby incorporated by reference herein.

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise determining, by a non-terrestrial radio network node comprising at least on processor, content to be broadcast via a reduced-content synchronization signal block signal message, and facilitating, by the non-terrestrial radio network node comprising at least one processor, broadcasting, via at least one idle-mode beam, the reduced-content synchronization signal block signal message. The content of the reduced-content synchronization signal block signal message may comprise at least one first preamble indication of at least one first preamble and at least one second preamble indication indicative of at least one second preamble. The non-terrestrial radio network node may avoid including, in the reduced-content synchronization signal block signal message, master information block information corresponding to the non-terrestrial radio network node.

The at least one first preamble may be usable by at least one user equipment to request connection establishment with respect to the non-terrestrial radio network node according to system information block information corresponding to the non-terrestrial radio network node indicated by the master information block information.

The reduced-content synchronization signal block signal message may further comprise at least one idle-mode uplink resource indication indicative of at least one idle-mode uplink resource usable to receive, by the non-terrestrial radio network node from the at least one user equipment, at least one of the at least one first preamble or the at least one second preamble further comprising. The method may further comprise facilitating, by the non-terrestrial radio network node, receiving, from at least one of the at least one user equipment via the at least one idle-mode uplink resource, at least one of the at least one first preamble. Responsive to the at least one of the at least one first preamble, the method may further comprise facilitating, by the non-terrestrial radio network node, establishment of a non-terrestrial connection with the at least one of the at least one user equipment.

In an example embodiment, the method may further comprise facilitating, by the non-terrestrial radio network node, receiving, from the at least one of the at least one user equipment, a terrestrial node identifier associated with a terrestrial radio network node from which the at least one of the at least one user equipment obtained the system information block information corresponding to the non-terrestrial radio network node, and determining, by the non-terrestrial radio network node, a refined non-terrestrial beam, corresponding to the non-terrestrial radio network node, that has a geographic signal coverage area that overlaps the terrestrial radio network node. The facilitating of the establishment of the non-terrestrial connection with the at least one of the at least one user equipment may comprise facilitating delivery of at least one connection setup message signal via the refined non-terrestrial beam.

In an example embodiment, the reduced-content synchronization signal block signal message may further comprise a synchronization signal block detection priority indication indicative of a detection order according to which the at least one user equipment is to attempt to obtain, from the non-terrestrial radio network node or a terrestrial radio network node, the master information block information or the system information block information. The synchronization signal block detection priority indication may be indicative that the at least one user equipment is to attempt to obtain the master information block information and the system information block information from the terrestrial radio network node before the non-terrestrial radio network node. The broadcasting of the reduced-content synchronization signal block signal message may be conducted via the at least one idle-mode beam corresponding to at least one idle-mode geographic coverage area. The facilitating of the establishing of the non-terrestrial connection with the at least one of the at least one user equipment may be conducted via the at least one idle-mode beam. The method may further comprise facilitating, by the non-terrestrial radio network node, receiving, from the at least one user equipment, at least one of the at least one first preamble. Responsive to receiving the at least one first preamble and based on the synchronization signal block detection priority indication being indicative that the at least one user equipment is to attempt to obtain the master information block information and the system information block information from the terrestrial radio network node before the non-terrestrial radio network node, the method may further comprise facilitating, by the non-terrestrial radio network node, continuing the broadcasting of the reduced-content synchronization signal block signal message via the at least one idle-mode beam corresponding to the at least one idle-mode geographic coverage area.

In an example embodiment, the reduced-content synchronization signal block signal message may further comprise a synchronization signal block detection priority indication indicative of a detection order according to which the at least one user equipment is to attempt to obtain, from the non-terrestrial radio network node or a terrestrial radio network node, the master information block information corresponding to the non-terrestrial radio network node or the system information block information corresponding to the non-terrestrial radio network node. The synchronization signal block detection priority indication may be indicative that the at least one user equipment is to attempt to obtain the master information block information and the system information block information from the non-terrestrial radio network node before the terrestrial radio network node. The method may further comprise facilitating, by the non-terrestrial radio network node, receiving, from the at least one user equipment, at least one of the at least one first preamble. Responsive to receiving the at least one first preamble and based on the synchronization signal block detection priority indication being indicative that the at least one user equipment is to attempt to obtain the master information block information and the system information block information from the non-terrestrial radio network node before the terrestrial radio network node, the method may further comprise facilitating, by the non-terrestrial radio network node, delivering, to the at least one user equipment, the master information block information and the system information block information.

In an example embodiment, the reduced-content synchronization signal block signal message may further comprise at least one non-terrestrial idle-mode uplink resource usable by at least one user equipment to transmit the at least one second preamble. The at least one second preamble may be usable by the at least one user equipment to request, from the non-terrestrial radio network node, the master information block information to facilitate the at least one of the at least one user equipment transmitting a connection establishment request to the non-terrestrial radio network node.

The method may further comprise facilitating, by the non-terrestrial radio network node, receiving, from the at least one user equipment according to the at least one non-terrestrial idle-mode uplink resource, at least one of the at least one second preamble. Responsive to receiving the at least one of the at least one second preamble via the at least one non-terrestrial idle-mode uplink resource, the method may further comprise facilitating, by the non-terrestrial radio network node, transmitting, to the at least one user equipment via the at least one idle-mode beam, the master information block information and system information block information corresponding to the non-terrestrial radio network node. The method may further comprise facilitating, by the non-terrestrial radio network node, establishing a non-terrestrial connection with the at least one user equipment based on at least one connection establishment message delivered according to the system information block information.

In an example embodiment, the method may further comprise facilitating, by the non-terrestrial radio network node, receiving a network energy saving configuration message comprising at least one network energy saving mode criterion, and determining, by the non-terrestrial radio network node, that the at least one energy saving mode criterion is satisfied. Based on the at least one energy saving mode criterion being determined to be satisfied, the method may further comprise implementing the broadcasting, via the at least one idle-mode beam, of the reduced-content synchronization signal block signal message. The at least one network energy saving mode criterion may comprise at least one of: at least one transitioning user equipment number criterion, applicable to a number of user equipment determined to be attempting to transition from an idle mode or an inactive mode to a connected mode with respect to the non-terrestrial radio network node; at least one energy consumption parameter criterion, applicable to energy consumption corresponding to the non-terrestrial radio network node; or at least one scheduled idle-mode beam period indication indicative of at least one idle-mode beam period during which the non-terrestrial radio network node is to broadcast the at least one reduced-content synchronization signal block signal message via the at least one idle-mode beam.

In an example embodiment, the non-terrestrial radio network node may avoid broadcasting, in the reduced-content synchronization signal block signal message via the at least one idle-mode beam, system information block information corresponding to the non-terrestrial radio network node.

In another example embodiment, a non-terrestrial radio network node may comprise at least one processor configured to process executable instructions that, when executed by the at least one processor, may facilitate performance of operations, that may comprise determining content to be broadcast via a reduced-content synchronization signal block signal message. The operations may further comprise broadcasting, via an idle-mode beam, the reduced-content synchronization signal block signal message comprising at least one first idle-mode beam preamble indication of at least one first idle-mode beam preamble of a first idle-mode beam preamble group and at least one second idle-mode beam preamble indication indicative of at least one second idle-mode beam preamble of a second idle-mode beam preamble group and comprising at least one idle-mode beam uplink resource indication indicative of at least one idle-mode beam uplink resource usable by the non-terrestrial radio network node to receive from at least one user equipment at least one of the at least one first idle-mode beam preamble or at least one of the at least one second idle-mode beam preamble. At least one of the at least one first idle-mode beam preamble or the at least one second idle-mode beam preamble may be usable by the at least one user equipment to establish a connection with the non-terrestrial radio network node, and wherein the non-terrestrial radio network node avoids including, in the reduced-content synchronization signal block signal message, master information block information corresponding to the non-terrestrial radio network node.

Receiving, by the non-terrestrial radio network node from the at least one user equipment via the at least one idle-mode beam uplink resource, of the at least one first idle-mode beam preamble of the first idle-mode beam preamble group may be indicative to the non-terrestrial radio network node that the at least one user equipment obtained, from a terrestrial radio network node, system information block information, corresponding to the non-terrestrial radio network node, usable by the at least one user equipment to establish a connection with the non-terrestrial radio network node. The operations may further comprise receiving, from at least one of the least one user equipment, a first idle-mode beam preamble via the at least one idle-mode beam uplink resource. Responsive to the receiving of the first idle-mode beam preamble via the at least one idle-mode beam uplink resource, the operations may further comprise establishing, with the at least one of the at least one user equipment, a connection according to the system information block information to result in an established connection.

The operations may further comprise receiving, from the at least one user equipment, a terrestrial radio node indication indicative of the terrestrial radio network node from which the at least one user equipment received the system information block information corresponding to the non-terrestrial radio network node, determining a refined beam corresponding to the non-terrestrial radio network node to facilitate the established connection, wherein the refined beam corresponds to a location associated with the terrestrial radio network node, and conducting the established connection via the refined beam.

Receiving, by the non-terrestrial radio network node from the at least one user equipment via the at least one idle-mode beam uplink resource, of at least one second idle-mode beam preamble of the second idle-mode beam preamble group may be indicative to the non-terrestrial radio network node that the at least one user equipment has not obtained system information block information corresponding to the non-terrestrial radio network node. The operations may further comprise receiving, from at least one of the least one user equipment, a second idle-mode beam preamble via the at least one idle-mode beam uplink resource. Responsive to the receiving of the second idle-mode beam preamble via the at least one idle-mode beam uplink resource, the operations may further comprise activating the at least one idle-mode beam to result in at least one non-idle-mode beam, transmitting, via the at least one non-idle-mode beam, a full synchronization signal block signal message at least comprising master information block information corresponding to the non-terrestrial radio network node and indicative of system information block information corresponding to the non-terrestrial radio network node, and establishing, with the at least one of the at least one user equipment, a connection according to the master information block information or the system information block information to result in an established connection.

In an example embodiment, the operations may further comprise receiving a network energy saving configuration message comprising at least one network energy saving mode criterion. The broadcasting of the reduced-content synchronization signal block signal message may be implemented based on the at least one energy saving mode criterion being determined to be satisfied.

In yet another example embodiment, a non-transitory machine-readable medium may comprise executable instructions that, when executed by at least one processor of a non-terrestrial radio network node, may facilitate performance of operations that may comprising receiving a network energy saving configuration message comprising at least one network energy saving mode criterion, and determining that the at least one energy saving mode criterion is satisfied. Based on the at least one energy saving mode criterion being determined to be satisfied, the operations may further comprise broadcasting, via an idle-mode beam, a reduced-content synchronization signal block signal message comprising at least one first idle-mode beam preamble, at least one second idle-mode beam preamble, and an idle-mode beam uplink resource indication indicative of at least one idle-mode beam uplink resource usable by the non-terrestrial radio network node to receive from at least one user equipment at least one of the at least one first idle-mode beam preamble or the at least one second idle-mode beam preamble, wherein the at least one first idle-mode beam preamble or the at least one second idle-mode beam preamble is to be usable by the at least one user equipment to facilitate establishing a connection with the non-terrestrial radio network node, and wherein the non-terrestrial radio network node avoids inclusion, in the reduced-content synchronization signal block signal message, of minimum system information.

The operations may further comprise receiving, from at least one of the least one user equipment, a first idle-mode beam preamble via the at least one idle-mode beam uplink resource, and receiving, from at least one of the at least one user equipment, a terrestrial radio node indication indicative of a terrestrial radio network node from which the at least one of the at least one user equipment obtained system information block information corresponding to the non-terrestrial radio network node. Based on the terrestrial radio node indication, The operations may further comprise determining a refined beam corresponding to the non-terrestrial radio network node. The refined beam may be associated with a geographic coverage area that overlaps a location associated with the terrestrial radio network node. The non-terrestrial radio network node may avoid conducting a beam refinement procedure with the at least one of the at least one user equipment to determine the refined beam. Responsive to the first idle-mode beam preamble, the operations may further comprise establishing, with the at least one of the at least one user equipment via the refined beam, a connection according to the system information block information.

Of information contained in a conventional synchronization signal block message, the reduced-content synchronization signal block signal message may comprise only a primary synchronization signal block and a secondary synchronization signal block, which may facilitate a user equipment synchronizing with the non-terrestrial radio network node.

In another example embodiment, a method may comprise facilitating, by a terrestrial radio network node comprising at least one processor, receiving, from at least one user equipment, a reduced-capability connection establishment request message comprising a non-terrestrial radio network node identifier corresponding to a non-terrestrial radio network node that is configured to broadcast a reduced-content synchronization signal block signal message in which master information block information corresponding to the non-terrestrial radio network node is absent. Responsive to the reduced-capability connection establishment request message, facilitating, by the terrestrial radio network node, the method may further comprise establishing, with the at least one user equipment, a reduced-capability connection, and facilitating, by the terrestrial radio network node, transmitting, to at least one network element associated with the non-terrestrial radio network node, a minimum system information fetch request requesting the master information block information corresponding to the non-terrestrial radio network node and system information block information corresponding to the non-terrestrial radio network node. Responsive to transmitting the minimum system information fetch request, the method may further comprise facilitating, by the terrestrial radio network node, receiving, from the at least one network element associated with the non-terrestrial radio network node, minimum system information, comprising master information block information or system information block information, corresponding to the non-terrestrial radio network node, and facilitating, by the terrestrial radio network node, transmitting, to the at least one user equipment according to the reduced-capability connection, the minimum system information to be usable by the at least one user equipment to establish a connection with the non-terrestrial radio network node.

In an example embodiment, the at least one network element may be a first network element. The method may further comprise facilitating, by the terrestrial radio network node, receiving, from a second network element associated with the non-terrestrial radio network node, a terrestrial-to-non-terrestrial connected-mode downlink beam mapping configuration message comprising terrestrial-to-non-terrestrial connected-mode downlink beam mapping information indicative of association of at least one connected-mode non-terrestrial beam corresponding to the non-terrestrial radio network node with at least one connected mode terrestrial beam corresponding to the terrestrial radio network node. In an example embodiment, the first network element and the second network element may be the same. In an example embodiment, the first network element and the second network element may be different. In an example embodiment, the first network element or the second network element may comprise at least one of: a non-terrestrial network gateway, a shared core network element, or a core network element.

In an example embodiment, based on the terrestrial-to-non-terrestrial connected-mode downlink beam mapping information, method may further comprise determining, by the terrestrial radio network node, a non-terrestrial connected-mode beam, associated with the non-terrestrial radio network node, corresponding to a first geographic coverage area that overlaps a second geographic coverage area, corresponding to a terrestrial beam via which the terrestrial radio network node received the reduced-capability connection establishment request message, to result in a determined non-terrestrial connected-mode beam. The method may further comprise facilitating, by the terrestrial radio network node, transmitting, to the at least one user equipment, a non-terrestrial connected-mode beam indication indicative of the determined non-terrestrial connected-mode beam. The terrestrial radio network node may transmit the minimum system information and the non-terrestrial connected-mode beam indication via a non-terrestrial connection information message.

The minimum system information comprises master information block information corresponding to the non-terrestrial radio network node or system information block information corresponding to the non-terrestrial radio network node.

In an example embodiment, the reduced-capability connection establishment request message may comprise a control channel establishment request to establish a control channel between the at least one user equipment and the terrestrial radio network node. Responsive to the control channel establishment request, the establishing of the reduced-capability connection may comprise establishing, by the terrestrial radio network node, a control channel with respect to the at least one user equipment. The facilitating of the transmitting of the minimum system information is facilitated by the control channel.

In an example embodiment, the method may further comprise avoiding, by the terrestrial radio network node in response to the control channel establishment request, establishing a data channel with respect to the at least one user equipment.

In an example embodiment, the reduced-capability connection establishment request message may comprise a service cause indication indicative that the reduced-capability connection establishment request message may comprise a request for at least one of: master information block information corresponding to the non-terrestrial radio network node, system information block information corresponding to the non-terrestrial radio network node, or a non-terrestrial connected-mode beam indication indicative of a beam corresponding to the non-terrestrial radio network node.

In another example embodiment, a terrestrial radio network node may comprise at least one processor configured to process executable instructions that, when executed by the at least one processor, may facilitate performance of operations that may comprise receiving, from a user equipment, a reduced-capability connection establishment request message comprising a non-terrestrial radio network node indication indicative of a non-terrestrial radio network node that is configured to broadcast a reduced-content synchronization signal block signal message that does not comprise minimum system information corresponding to the non-terrestrial radio network node. Responsive to the reduced-capability connection establishment request message, The operations may further comprise establishing a reduced-capability connection. The operations may further comprise transmitting, to a network element associated with the non-terrestrial radio network node via at least one backhaul link, a minimum system information request requesting the minimum system information. Responsive to transmitting the minimum system information request, the operations may further comprise receiving, from the network element associated with the non-terrestrial radio network node via the at least one backhaul link, minimum system information, comprising master information block information or system information block information, corresponding to the non-terrestrial radio network node. The operations may further comprise transmitting, to the user equipment according to the reduced-capability connection, the minimum system information to be usable by the user equipment to establish a connection with the non-terrestrial radio network node.

In an example embodiment, the operations may further comprise receiving, from the network element associated with the non-terrestrial radio network node, a terrestrial-to-non-terrestrial connected-mode downlink beam mapping configuration message comprising terrestrial-to-non-terrestrial connected-mode downlink beam mapping information indicative of association of at least one connected-mode non-terrestrial beams corresponding to the non-terrestrial radio network node with at least one connected mode terrestrial beam corresponding to the terrestrial radio network node.

In an example embodiment, based on the terrestrial-to-non-terrestrial connected-mode downlink beam mapping information, the operations may further comprise determining a non-terrestrial connected-mode beam, associated with the non-terrestrial radio network node, corresponding to a first geographic coverage area that overlaps a second geographic coverage area, corresponding to a terrestrial beam via which the terrestrial radio network node received the reduced-capability connection establishment request message, to result in a determined non-terrestrial connected-mode beam. The operations may further comprise transmitting, to the user equipment via the reduced-capability connection, a non-terrestrial connected-mode beam indication indicative of the determined non-terrestrial connected-mode beam.

In an example embodiment, the reduced-capability connection establishment request message may comprise a control channel connection establishment request to establish a control channel connection between the user equipment and the terrestrial radio network node. Responsive to the control channel connection establishment request, the operations may further comprise establishing a control channel connection with the user equipment. The transmitting of the minimum system information may be facilitated by the control channel connection. The operations may further comprise avoiding, in response to the control channel connection establishment request, establishing a data channel with respect to the user equipment.

In another example embodiment, a non-transitory machine-readable medium may comprise executable instructions that, when executed by at least one processor of a terrestrial radio network node, may facilitate performance of operations that may comprise receiving, from a user equipment, a reduced-capability connection establishment request message comprising a non-terrestrial radio network node indication indicative of a non-terrestrial radio network node that is configured to broadcast a reduced-content synchronization signal block signal message that does not comprise minimum system information corresponding to the non-terrestrial radio network node. Responsive to the reduced-capability connection establishment request message, the operations may further comprise establishing a reduced-capability connection with the user equipment, and transmitting, to a network element associated with the non-terrestrial radio network node, a minimum system information fetch request requesting the minimum system information. Responsive to transmitting the minimum system information fetch request, The operations may further comprise receiving, from the network element associated with the non-terrestrial radio network node, minimum system information, comprising the minimum system information, and transmitting, to the user equipment according to the reduced-capability connection, the minimum system information to be usable by the user equipment to establish a connection with the non-terrestrial radio network node.

In an example embodiment, the operations may further comprise receiving, from the network element associated with the non-terrestrial radio network node, a terrestrial-to-non-terrestrial connected-mode downlink beam mapping configuration message that may comprise terrestrial-to-non-terrestrial connected-mode downlink beam mapping information indicative of at least one connected-mode non-terrestrial beams corresponding to the non-terrestrial radio network node being associated with at least one connected mode terrestrial beam corresponding to the terrestrial radio network node.

Based on the terrestrial-to-non-terrestrial connected-mode downlink beam mapping information, the operations may further comprise determining, by the terrestrial radio network node, a non-terrestrial connected-mode beam, associated with the non-terrestrial radio network node, corresponding to a geographic coverage area that overlaps a location corresponding to the terrestrial radio network node, to result in a determined non-terrestrial connected-mode beam, and transmitting, to the user equipment according to the reduced-capability connection, a non-terrestrial connected-mode beam indication indicative of the determined non-terrestrial connected-mode beam.

In an example embodiment, the operations may further comprise responsive to the reduced-capability connection establishment request message, scheduling, with respect to the user equipment, control channel resources associated with the reduced-capability connection. Responsive to the reduced-capability connection establishment request message, the operations may further comprise avoiding scheduling, with respect to the user equipment, data channel resources associated with the reduced-capability connection.

In another example embodiment, a method may comprise receiving, by a user equipment comprising at least one processor from a non-terrestrial radio network node via at least one idle-mode beam, a reduced-content synchronization signal block signal message comprising at least one first idle-mode beam preamble indication indicative of at least one first idle-mode beam preamble and comprising at least one second idle-mode beam preamble indication indicative of at least one second idle-mode beam preamble. Minimum system information, for example master information block information and system information block information 1 (e.g., "SIB1"), corresponding to the non-terrestrial radio network node may be absent from the reduced-content synchronization signal block signal message. The method may further comprise determining, by the user equipment, at least one terrestrial connection capability with respect to the user equipment, corresponding to at least one terrestrial radio network node, to result in at least one determined terrestrial connection capability. Based on the at least one determined terrestrial connection capability, the method may further comprise determining, by the user equipment, either the at least one first idle-mode beam preamble or the at least one second idle-mode beam preamble to result in a determined idle-mode beam preamble. The method may further comprise transmitting, by the user equipment to the non-terrestrial radio network node, the determined idle-mode beam preamble to facilitate establishing a non-terrestrial connection with the non-terrestrial radio network node.

In an example embodiment, the reduced-content synchronization signal block signal message may further comprise at least one idle-mode beam uplink resource indication indicative of at least one idle-mode beam uplink resource, corresponding to the at least one idle-mode beam, usable, or to be usable, by the user equipment to transmit the determined idle-mode beam preamble to the non-terrestrial radio network node. The at least one terrestrial connection capability may correspond to the user equipment being located within a signal strength coverage range of at least one of the at least one terrestrial radio network node that satisfies a configured terrestrial connection establishment criterion.

Based on the at least one determined terrestrial connection capability, the method may further comprise determining, by the user equipment, a terrestrial radio network node of the at least one terrestrial radio network node to result in a determined terrestrial radio network node, and transmitting, by the user equipment to the determined terrestrial radio network node, a reduced-capability connection request indicative of a request for minimum system information corresponding to the non-terrestrial radio network node. Based on the reduced-capability connection request, the method may further comprise facilitating, by the user equipment, establishing, with the determined terrestrial radio network node, a reduced-capability connection. Responsive to transmitting the reduced-capability connection request, The method may further comprise receiving, by the user equipment from the determined terrestrial radio network node via the reduced-capability connection, the minimum system information corresponding to the non-terrestrial radio network node.

In an example embodiment, the determined idle-mode beam preamble may comprise a first idle-mode beam preamble, wherein the determined idle-mode beam preamble is transmitted via the at least one idle-mode beam uplink resource. The method may further comprise facilitating, by the user equipment, establishing, with the non-terrestrial radio network node according to the minimum system information, a connection.

Responsive to transmitting the reduced-capability connection request, The method may further comprise receiving, by the user equipment from the determined terrestrial radio network node, a non-terrestrial connected-mode beam indication indicative of a non-terrestrial connected-mode beam. The connection established by the user equipment with the non-terrestrial radio network node may be established via the non-terrestrial connected-mode beam.

In an example embodiment, according to the reduced-capability connection request, the reduced-capability connection may comprise a control channel but not comprise a data channel.

In an example embodiment, the reduced-content synchronization signal block signal message may further comprise a synchronization signal block detection priority indication indicative of a detection order according to which the user equipment is to attempt to obtain, from the non-terrestrial radio network node or the at least one terrestrial radio network node, the minimum system information corresponding to the non-terrestrial radio network node.

In an example embodiment, the at least one terrestrial connection capability may correspond to the user equipment being located within a signal strength coverage range of at least one of the at least one terrestrial radio network node that satisfies a configured terrestrial connection establishment criterion. The detection order may be indicative that the user equipment is to attempt to obtain the minimum system information from the non-terrestrial radio network node before attempting to obtain the minimum system information from the at least one terrestrial radio network node. The determined idle-mode beam preamble may comprise at least one of the at least one second idle-mode beam preamble. The determined idle-mode beam preamble may be transmitted according to the at least one idle-mode beam uplink resource. Responsive to transmitting the determined idle-mode beam preamble, the method may further comprise receiving, by the user equipment from the non-terrestrial radio network node via the at least one idle-mode beam, minimum system information corresponding to the non-terrestrial radio network node. The method may further comprise facilitating, by the user equipment, establishing, with the non-terrestrial radio network node according to the minimum system information, a connection.

In an example embodiment, the at least one terrestrial connection capability may correspond to the user equipment failing to be located within a signal strength coverage range of at least one of the at least one terrestrial radio network node that satisfies a configured terrestrial connection establishment criterion (e.g., beyond a signal range that can facilitate a configured connection quality criterion or located at a location where signal conditions are poor and cannot satisfy a configured connection quality criterion). The determined idle-mode beam preamble may comprise at least one of the at least one second idle-mode beam preamble. The determined idle-mode beam preamble may be transmitted according to the at least one idle-mode beam uplink resource. Responsive to transmitting the determined idle-mode beam preamble, the method may further comprise receiving, by the user equipment from the non-terrestrial radio network node, minimum system information corresponding to the non-terrestrial radio network node. The method may further comprise facilitating, by the user equipment, establishing, with the non-terrestrial radio network node according to the minimum system information, a connection. In an example embodiment, the minimum system information corresponding to the non-terrestrial radio network node may be received by the user equipment from the non-terrestrial radio network node via the at least one idle-mode beam. In an example embodiment, the minimum system information corresponding to the non-terrestrial radio network node may be received by the user equipment from the non-terrestrial radio network node via a non-idle-mode beam geographically corresponding to the at least one idle-mode beam.

In an example embodiment, the method may further comprise receiving, by the user equipment from the non-terrestrial radio network node, a refined beam indication indicative of a refined beam corresponding to the non-terrestrial radio network node. The connection may be established via the refined beam.

In another example embodiment, a user equipment may comprise at least one processor configured to process executable instructions that, when executed by the at least one processor, may facilitate performance of operations that may comprise receiving, from a non-terrestrial radio network node via at least one idle-mode beam, a reduced-content synchronization signal block signal message comprising at least one first idle-mode beam preamble indication indicative of at least one first idle-mode beam preamble and comprising at least one second idle-mode beam preamble indication indicative of at least one second idle-mode beam preamble. The reduced-content synchronization signal block signal message may comprise a primary synchronization signal block and a secondary synchronization signal block. Minimum system information corresponding to the non-terrestrial radio network node may be absent from the reduced-content synchronization signal block signal message. The operations may further comprise determining at least one terrestrial connection capability corresponding to at least one terrestrial radio network node to result in at least one determined terrestrial connection capability. Based on the at least one determined terrestrial connection capability being determined to correspond to the user equipment being located within at least one signal strength range that corresponds to at least one terrestrial radio network node and that is capable of facilitating connection establishment with the at least one terrestrial radio network node, the operations may further comprise obtaining, from the at least one terrestrial radio network node, the minimum system information corresponding to the non-terrestrial radio network node. Based on the minimum system information corresponding to the non-terrestrial radio network node and obtained from the at least one terrestrial radio network node, the operations may further comprise establishing a non-terrestrial connection with the non-terrestrial radio network node.

In an example embodiment, the reduced-content synchronization signal block signal message may further comprise a synchronization signal block detection priority indication indicative of a detection order according to which the user equipment is to attempt to obtain, from the at least one terrestrial radio network node, minimum system information corresponding to the non-terrestrial radio network node before attempting to obtain the minimum system information from the non-terrestrial radio network node.

In an example embodiment, the obtaining of the minimum system information from the at least one terrestrial radio network node may comprise transmitting, to the at least one terrestrial radio network node, a reduced-capability connection request indicative of a request for minimum system information corresponding to the non-terrestrial radio network node. Based on the reduced-capability connection request, establishing, by the user equipment with the at least one terrestrial radio network node, a reduced-capability connection. Responsive to transmitting the reduced-capability connection request, receiving, by the user equipment from the at least one terrestrial radio network node via the reduced-capability connection, the minimum system information corresponding to the non-terrestrial radio network node. Responsive to transmitting the reduced-capability connection request, the operations may further comprise receiving, from the at least one terrestrial radio network node, a non-terrestrial connected-mode beam indication indicative of a non-terrestrial connected-mode beam corresponding to the non-terrestrial radio network node. The connection established by the user equipment with the non-terrestrial radio network node may be established via the non-terrestrial connected-mode beam.

In yet another example embodiment, a non-transitory machine-readable medium may comprise executable instructions that, when executed by at least processor of a user equipment, may facilitate performance of operations that may comprise receiving, from a non-terrestrial radio network node via at least one idle-mode beam, a reduced-content synchronization signal block signal message comprising at least one first idle-mode beam preamble indication indicative of at least one first idle-mode beam preamble and comprising at least one second idle-mode beam preamble indication indicative of at least one second idle-mode beam preamble. The reduced-content synchronization signal block signal message comprises a primary synchronization signal block and a secondary synchronization signal block. Minimum system information corresponding to the non-terrestrial radio network node may be absent from the reduced-content synchronization signal block signal message. The reduced-content synchronization signal block signal message may further comprise at least one idle-mode beam uplink resource indication indicative of at least one idle-mode beam uplink resource, corresponding to the at least one idle-mode beam, that may be usable by the user equipment to transmit to the non-terrestrial radio network node at least one of the at least one first idle-mode beam preamble or the at least one second idle-mode beam preamble. The operations may further comprise determining at least one terrestrial connection capability corresponding to at least one terrestrial radio network node to result in at least one determined terrestrial connection capability. Based on the at least one determined terrestrial connection capability being determined to correspond to the user equipment not being located within at least one terrestrial signal strength range that is capable of facilitating connection establishment with at least one of the at least one terrestrial radio network node, the operations may further comprise transmitting, to the non-terrestrial radio network node, at least one of the at least one second idle-mode beam preamble according to the at least one idle-mode beam uplink resource and via the at least one idle-mode beam. Responsive to transmitting at least one of the at least one second idle-mode beam preamble, the operations may further comprise receiving, from the non-terrestrial radio network node via a non-reduced-content synchronization signal block signal message, minimum system information corresponding to the non-terrestrial radio network node, and establishing, with the non-terrestrial radio network node according to the minimum system information, a connection.

In an example embodiment, the at least one idle-mode beam may be formed based on at least one non-refined beam function. The non-reduced-content synchronization signal block signal message may be broadcast by the non-terrestrial radio network node via at least one non-idle-mode beam that may be formed based on the at least one non-refined beam function.

In an example embodiment, the operations may further comprise conducting a beam refinement procedure with the non-terrestrial radio network node after the receiving of the minimum system information to result in a refined beam. The connection may be conducted according to the refined beam.

BRIEF DESCRIPTION OF THE DRAWINGS

Feature(s) and advantage(s) of one or more of the various embodiments of the subject application will become more apparent where described in the detailed description and when taken in conjunction with the accompanying drawings in which:

FIG. 13 illustrates example reduced-capability terrestrial connection establishment criterion configuration information and configured preamble sets respectively corresponding thereto.

DETAILED DESCRIPTION OF THE DRAWINGS

Figure 1:
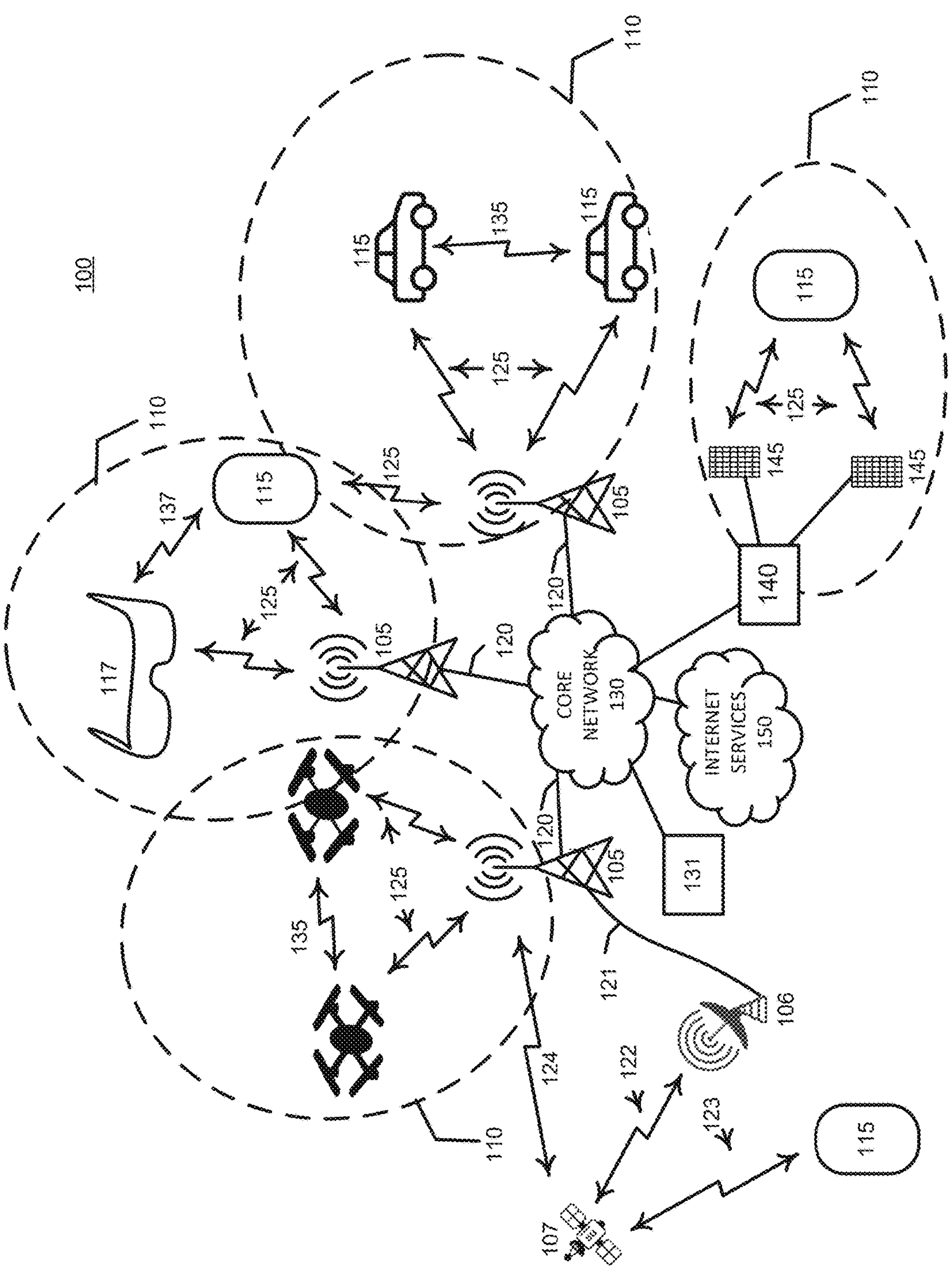
FIG. 1 illustrates an example wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and Nr may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term “cell” may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (cMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and under-served regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network gateway, and satellite 107 may facilitate delivering traffic corresponding to a radio access network, which may comprise RAN nodes 105, core network 130, backhaul links 120, and long-range wireless links 125, to user equipment that may be located beyond coverage of a RAN node 105. Links 121 between RAN nodes 105 and satellite base station/gateway 106 may comprise coaxial, fiber, or wireless links that may be similar to links 120. Links 122 and 124 to satellite node 107, and links 123 from satellite/node 107 to UE 115, may comprise line-of-sight microwave signal transmission. A UE 115 may be configured with at least one antenna, or at least one processor, to facilitate transmitting or receiving microwave signals to/from satellite node 107A UE 115 may be configured with at least one antenna, or at least one processor, to facilitate transmitting or receiving microwave signals to/from satellite node 107, and a user equipment so configured or designed may be referred to as a non-terrestrial network capable user equipment, an NTN-capable user equipment, or simply an NTN user equipment. Description herein of, or reference herein to, a radio node or a radio network node may be a description of or a reference to either a terrestrial RAN node 105, a non-terrestrial gateway 106, a non-terrestrial satellite node 107, or a combination of one or more of a terrestrial RAN node, a non-terrestrial gateway, or a non-terrestrial satellite. A terrestrial radio network node may be referred to as a "TN" node. Reference to a satellite node, or a non-terrestrial network node ("NTN node"), may comprise a reference to satellite 107, base station gateway 106, or a combination of satellite 107 and base station/gateway 106.

Core network 130 may comprise, or may be communicatively coupled with, shared core entity 131, which may be referred to as a shared core entity node or a shared core node. Shared core entity 131 may be associated with TN node 105 or NTN node 107 and may facilitate unified interfacing among TN node 105, NTN node 107, and elements of core network 130. For example, TN node 105 and NTN node 107 may not be configured to communicate directly with one another due to different communication protocols due to absence of direct communication links therebetween, due to configuration incompatibility (e.g., NTN satellite node 107 and TN RAN node 105 being operated by different entities that have declined to configure equipment corresponding to the different entities to interoperate with each other), or due to other reasons. Accordingly, shared core entity 131 may be configured to facilitate joint scheduling, joint interference detection, joint operation of coordination algorithms, or other joint operations between RAN node 105 and NTN node 107. Shared node 131 may facilitate maintaining of user equipment information privacy with respect to RAN node 105 or NTN node 107 that may be operated by a different operator or service provider than an operator or provider with which the user equipment is subscribed to operate. Shared core entity 131 may facilitate executing software instructions that may be provided by an entity other than an operator of NTN node 107 or TN RAN node 105, and thus may facilitate efficient TN-NTN system integration without private terrestrial network information being shared with a non-terrestrial network, and vice versa.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient.

Figure 2:
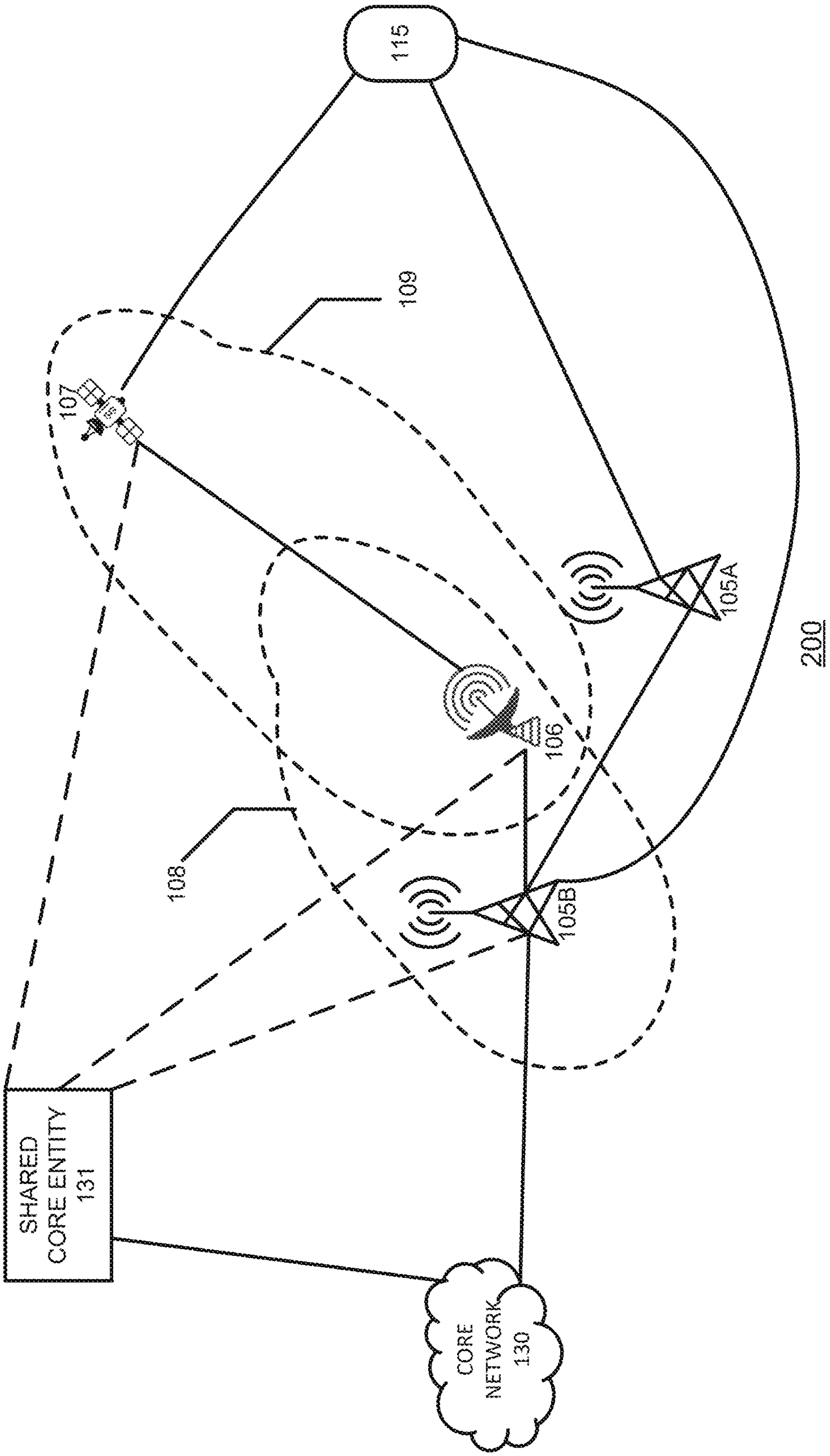
FIG. 2 illustrates an example environment with a satellite base station/gateway and satellite that are capable of communication of traffic corresponding to a radio access network.

Turning now to FIG. 2, the figure illustrates ground-based RAN node 105, base station 106, and NTN node 107, any one or more of which may be referred to as a radio network node. In reference to some embodiments disclosed herein, reference to a TN node may comprise a reference to node 108, which may comprise one or more of terrestrial RAN node 105 or gateway 106. In reference to some embodiments disclosed herein, reference to an NTN node may comprise a reference to node 109, which may comprise one or more of gateway 106 or satellite 107. In some embodiments, a communication session with UE 115 may be served by RAN node 105. RAN node 105 may communicate directly with satellite node 107 via communication links 124 or via gateway 106 via links 121 and 122.

It may be desirable to implement gNodeB/RAN node functionality on board a non-terrestrial node/satellite node to serve user equipment. However, offering terrestrial-like cellular connectivity via a non-terrestrial radio network node results in various performance-related limitations that may limit overall operation non-terrestrial node operation and/or may challenge backward compatibility of currently-deployed NTN vehicles/satellites (e.g., structures or equipment that may house, facilitate, or embody non-terrestrial network RAN node circuitry and components). A particular performance-related limitations that may result is increased energy consumption due to facilitating full cellular connectivity to ground-based user equipment, which may be an exceptionally large number of devices served via a large geographic footprint compared to a number of user equipment devices served by a single terrestrial radio network node. However, a power source corresponding to a non-terrestrial network node may be very limited compared to ground/terrestrial RAN nodes, thus imposing a significant operation and safety risk to operation of an entire NTN vehicle.

Specifically, a needed function of a RAN node is heavy-energy-using radio procedures such as periodic transmission of full synchronization signal block signal messages ("SSB") that facilitate idle-mode user equipment devices to: (1) identify the active RAN node; (2) synchronize with the RAN node, and (3) obtain vital minimum access information/minimum system information corresponding to the RAN node. Furthermore, SSB block transmissions and related system information blocks signal messages (SIB) are periodically repeated via all available downlink beams to span an entire coverage footprint corresponding to the RAN node, which, as discussed above, for an NTN node is much larger compared to a geographic coverage area corresponding to a terrestrial RAN node. Accordingly, a problem that exists with conventional techniques is that broadcasting of SSB and SIB messages imposes a critical energy consumption limitation on an NTN RAN vehicle. Thus, it is desirable to reduce energy consumption at an NTN node while maintaining reasonable RAN functionality and performance.

To address one or problems that exist with conventional techniques, according to at least one embodiment disclosed herein, a light-weight (e.g., a low-energy-consuming and low content), per-beam SSB broadcasting procedure may facilitate reducing energy consumption at an NTN node. Regular, periodic broadcasting of full SSB signal message may not be inefficient with respect to energy consumption when the SSB/SIB signaling facilitates a large number of idle-mode user equipment transitioning to connected mode via a downlink beam corresponding to a particular geographic coverage region or area. However, regular, periodic broadcasting of full SSB signal messages may be inefficient with respect to energy consumption when the SSB/SIB signaling facilitates only a small number, which may be zero (e.g., a scenario where an NTN beam that covers a geographic area that comprises only ocean territory), of idle-mode user equipment transitioning to connected mode via downlink beams. As disclosed herein, embodiments may facilitate broadcasting a 'light', or reduced-content, SSB message via beams that are determined to serve a low number of, or no, user equipment transitioning from idle-mode to connected-mode (e.g., a beam that serves an ocean region or a region comprising user equipment devices that remain idle for extended periods, for example, machine-to-machine devices that rarely wake up to collect and transmit data). Thus, according to embodiments disclosed herein, an NTN RAN node may, with respect to certain beams, only transmit light-weight SSB messages that may only comprise minimum synchronization and cell signals since potential receiving user equipment devices are highly likely to remain in idle mode/state and thus are likely to only attempt to retain synchronization with a NTN RAN node (e.g., RAN node access information and vital SIB information may not always needed in an SSB message), resulting in reducing use and consumption of downlink signaling overhead and corresponding energy consumption. Vital access information, which may be referred to as minimum system information, such as, for example, MIB information and large SIB information (e.g., SIB1 information) corresponding to an NTN RAN node can be delivered to a user equipment transitioning from idle-mode to connected-mode either by an on-demand request as described herein in reference to a novel two-stage SSB/SIB acquisition procedure, or by being provided to a user equipment via a terrestrial RAN node if a user equipment detects reasonable ground coverage corresponding thereto. In an example embodiment, a TN RAN node may be capable of dynamically determining a connected-mode NTN downlink beam, which corresponds to or is associated with, a current TN RAN node beam and/or position, and thus may enable NTN-capable user equipment devices to immediately, or substantially immediately, establish a connection with a target NTN RAN node without the need for processing-heavy, energy-consumption-heavy, and delay-overhead heavy conventional beam refinement procedures implemented by an NTN node.

In an example embodiment, NTN-capable user equipment devices that perceive/detect no TN/ground connectivity may perform a two-stage NTN SSB detection where first a light SSB is received to retain NTN downlink sync and upon the user equipment determining to connect to an NTN node, the user equipment may, on an on-demand basis, request a full SSB and SIB delivery over selected one or more non-terrestrial beams corresponding to the NTN node. In another example embodiment, for NTN-capable user equipment devices that perceive, or detect, reasonable terrestrial/ground connectivity, NTN SSB access information and/or NTN SIB information may be delivered via terrestrial interface links.

According to conventional techniques, a RAN node always transmits full SSB content according to a fixed format. According to embodiments disclosed herein, an NTN node may transmit a reduced-content, lighter SSB message and the remainder of conventional connection information can be broadcast dynamically and on-demand and/or delegated for delivery via another RAN node.

According to conventional techniques, a RAN node only delivers its own SIB and SSB information. According to embodiments disclosed herein, a TN RAN node may process and relay SSB and SIB information, corresponding to an NTN RAN node, to a user equipment for use thereby in accessing and connecting to the NTN node.

According to conventional techniques, SSB delivery is broadcast semi-statically by a RAN node at preconfigured periodicities. Thus, according to conventional techniques, a RAN node cannot, on demand, deliver SSB/SIB info corresponding to another RAN node. According to an embodiment disclosed herein, a terrestrial service cause request may facilitate establishment of a reduced-capability connection between a requesting user equipment and a terrestrial RAN node to facilitate delivery or SSB/SIB corresponding to a non-terrestrial RAN node via terrestrial RAN node interface link(s).

Reduced Capability Non-Terrestrial Idle Mode Signaling.

Figure 3:
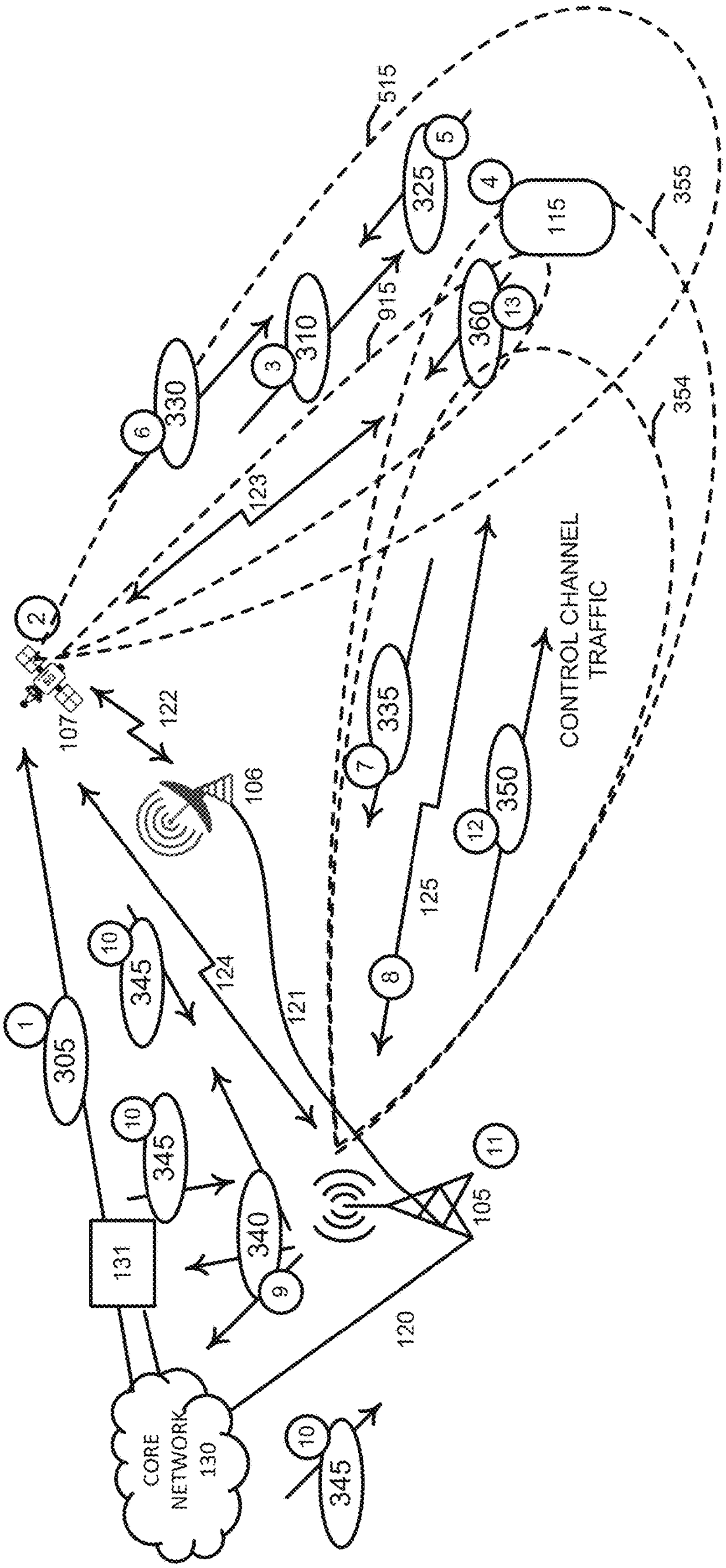
FIG. 3 illustrates an example environment with an idle user equipment establishing a connection with a non-terrestrial radio network node that is broadcasting a reduced-capability synchronization signal block signal message.

Turning now to FIG. 3, the figure illustrates an environment 300. At act 1, NTN node 107 may receive network energy saving configuration information 305 from shared network element 131, from an element of core network 130, or from gateway 106. At act 2, NTN node 107 may determine that a criterion configured via configuration information 305 may be satisfied. For example, a configured period to begin broadcasting of at least one reduced content synchronization signal message may occur, an energy consumption rate, or amount, corresponding to the non-terrestrial node may exceed a configured energy consumption criterion, or fewer than a configured number of user equipment corresponding to a non-terrestrial beam operated by the non-terrestrial network node may have attempted to transition from an idle mode to a connected state mode via the non-terrestrial beam during a configured period. At act 3, the non-terrestrial radio network node may broadcast, via idle mode beam 515, a reduced content synchronization signal block signal message, which may comprise a primary synchronization signal block 605 (shown in FIG. 6) and a secondary synchronization signal block 610, but which may not comprise minimum system information, for example master information block ("MIB") information or system information block ("SIB") information, for example information corresponding to a SIB1 block.

Figure 6:
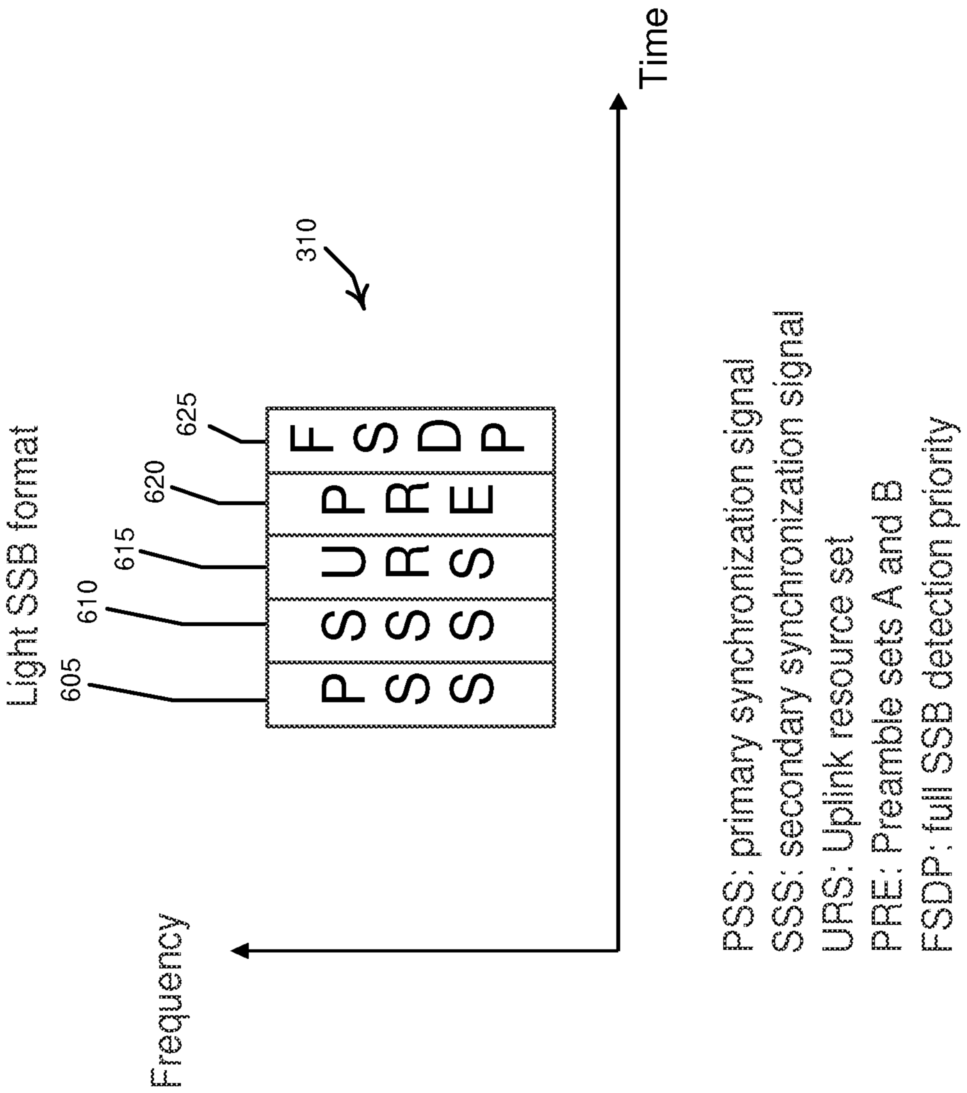
FIG. 6 illustrates an example reduced-content synchronization signal block signal message format.

At act 4, user equipment 115, which may be operating in an idle mode or an inactive mode, may determine to attempt to connect to non-terrestrial node 107. User equipment 115 may be located within a signal coverage range facilitated by idle mode beam 515. User equipment 115 may receive reduced content synchronization signal block message 310, which may be formatted as shown in FIG. 6. If user equipment 115 is not located within a signal coverage range of a terrestrial radio network node, for example the user equipment is not located within a signal coverage range of beam 354 corresponding to terrestrial radio network node 105, the user equipment may, at act 5, transmit to NTN node 107 a preamble message 325 comprising a preamble, configured by or indicated by information 620 in reduced content message 310, that indicates to the NTN node that the user equipment is not within a signal coverage range of a terrestrial network node and thus the user equipment needs the NTN node to provide to the user equipment minimum system information corresponding to the NTN to facilitate the user equipment transitioning from idle mode or inactive mode to connected mode and establishing a connection with the NTN node. Responsive to receiving preamble message 325, non-terrestrial network node 107 may activate beam 515 and broadcast at act 6 a full synchronization signal block signal message 330, comprising minimum system information corresponding to the non-terrestrial network node, via activated beam 515. User equipment 115 may use the minimum system information received via activated beam 515 to establish a connection with non-terrestrial network node 107.

Figure 10:
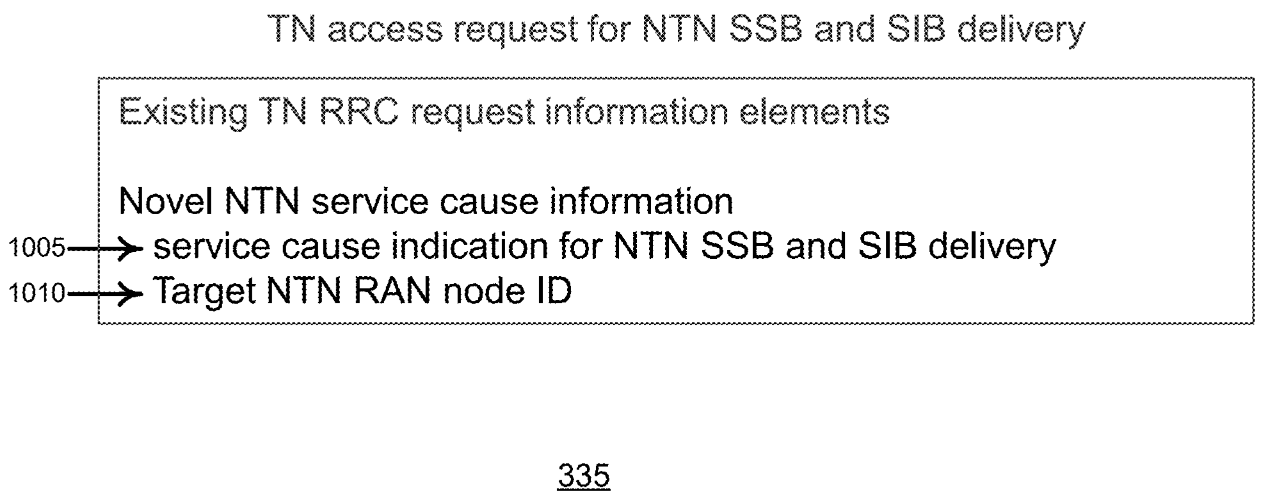
FIG. 10 illustrates example reduced capability connection request information.

If the user equipment determines at act 4 that the user equipment is within a signal coverage range of a terrestrial radio network, for example the user equipment is within range of beam 355 corresponding to terrestrial radio network node 105, the user equipment may transmit at act 7 reduced capability connection request 335. Request 335 may comprise a service cause indication, in field 1005 shown in FIG. 10, indicative that the user equipment is requesting a reduced capability connection with terrestrial radio network node 105 for purposes of obtaining at least minimum system information corresponding to NTN node 107, which NTN node may be identified in field 1010 shown in FIG. 10.

Responsive to receiving request 335, terrestrial node 105, at act 8, may facilitate establishing a reduced capability connection with user equipment 115. The reduced capability connection may facilitate delivery of control channel traffic but terrestrial node 105 may not allocate, assign, or schedule resources to be usable to deliver data channel traffic between the terrestrial node and user equipment 115. At act 9, terrestrial node 105 may transmit, to a network element associated with not terrestrial radio network node 107, a minimum system information fetch request message 340 requesting minimum system information corresponding to NTN node 107, for example, master information block information corresponding to the non-terrestrial radio network node and system information block information corresponding to the non-terrestrial radio network node. At act 10, responsive to transmitting minimum system information fetch request message 340, terrestrial radio network node 105 may receive, from at least one network element associated with non-terrestrial radio network node 107, minimum system information message 345, which may comprise master information block information and system information block information corresponding to the non-terrestrial radio network node. In an example embodiment, information message 345 may comprise beam mapping information 1105, shown in FIG. 11, which may be referred to as terrestrial-to-non-terrestrial connected-mode downlink beam mapping configuration information. Terrestrial-to-non-terrestrial connected-mode downlink beam mapping configuration information 1105 may be delivered to UE via a different message than minimum system information message 345. At act 11, terrestrial node 105 may determine, based on terrestrial-to-non-terrestrial connected-mode downlink beam mapping configuration information 1105, a non-terrestrial beam corresponding to non-terrestrial network node 107. The non-terrestrial beam determined at act 11 may be a refined beam, for example beam 915, that may be used to facilitate establishment of a connection between user equipment 115 and non-terrestrial network node 107 or that may be used to conduct an established connection between the user equipment and the non-terrestrial network node, without the non-terrestrial network node and the user equipment having to take time and consume energy to perform beam refinement procedures. Thus, by using terrestrial-to-non-terrestrial connected-mode downlink beam mapping configuration information 1105 to determine a non-terrestrial beam corresponding to a location of terrestrial node 105, a non-terrestrial beam corresponding to the terrestrial node that is facilitating the reduced capability connection established at act 8, or a non-terrestrial bam corresponding to a location of the user equipment, the terrestrial node may facilitate reducing energy and time consumed to establish a connection between user equipment 115 and non-terrestrial network node 107. At act 12, terrestrial node 105 may transmit to user equipment 115 a minimum system information message 350, which may be referred to as a non-terrestrial connection information message, via control channel resources corresponding to the reduced-capability connection established at act 8, comprising minimum system information corresponding to non-terrestrial node 107 to be usable by user equipment 115 to establish a connection with the non-terrestrial radio network node. Message 350 may comprise an indication of the refined beam determined at act 11. User equipment 115 may receive message 350 and may use minimum system information included in message 350, or indicated thereby, and an indication of the refined beam determined at act 11 to establish a connection with non-terrestrial node 107 at act 13. User equipment 115 may initiate connection establishment with non-terrestrial node 107 by transmitting to the non-terrestrial network node a preamble, configured or indicated via reduce the content synchronization signal block signal message 310, according to minimum system information received from terrestrial node 105 in message 350 and according to a refined beam indicated via message 350. Accordingly, if user equipment 115 uses refined beam 915 to establish a connection with non-terrestrial node 107, the non-terrestrial node may continue to broadcast reduced content synchronization signal block signal messages 310 via idle mode beam 515 while establishing a connection with user equipment 115.

Figure 4:
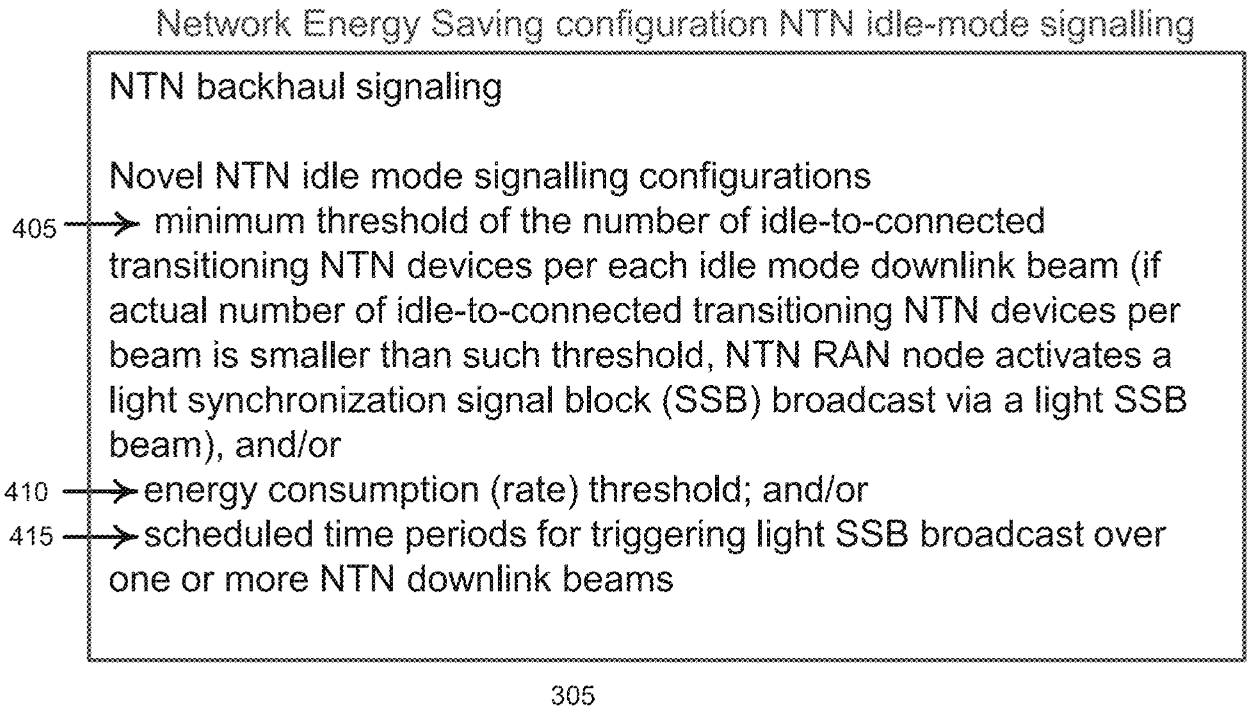
FIG. 4 illustrates example network energy saving configuration information.
Figure 5:
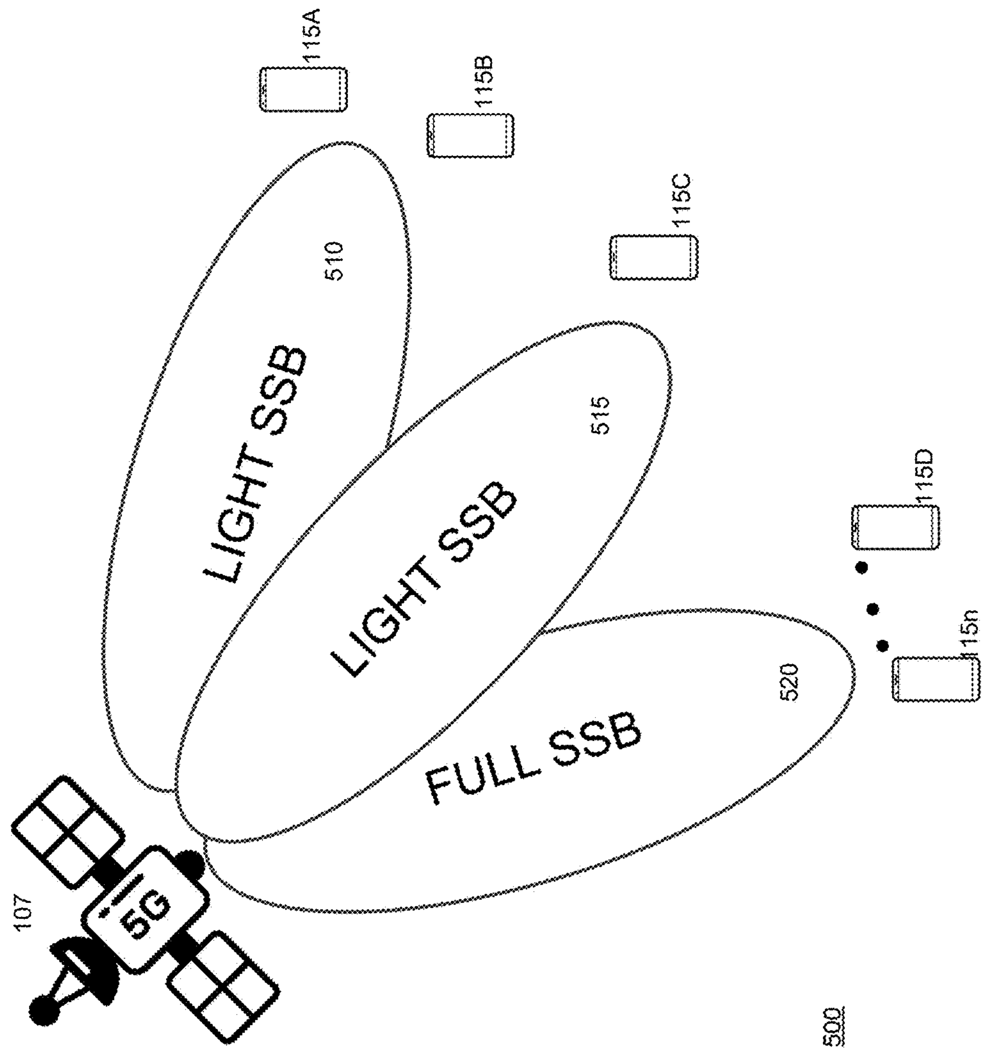
FIG. 5 illustrates an example reduced capability being operated by a satellite non-terrestrial radio network node.

Network energy saving configuration message 305 may be received by NTN RAN node 107 from core network 130, shared TN-NTN core network element 131, and/or gateway 106, and may comprise at least one energy saving criterion, which may be referred to as an energy saving mode criterion. As shown in FIG. 4, the at least one energy saving mode criterion may comprise, in field 405, a minimum transitioning number threshold of user equipment transitioning from idle mode or inactive mode to connected mode. The minimum transitioning number threshold may be applicable per each idle mode downlink beam with respect to which node 107 may be broadcasting a reduced content SSB message. For example, if a number of user equipment 115 being served by beam 515 shown in FIG. 3 transition, or attempt to transition, from idle mode to connected mode during a configured period or duration (e.g., a transitioning rate) is smaller than a criterion indicated in field 405, NTN RAN node 107 may activate broadcasting of a light synchronization signal block (e.g., reduced-content synchronization signal block signal message 310) via beam 515. The at least one energy saving mode criterion may comprise, in field 410, an energy-related criterion, for example an energy consumption rate threshold/criterion, a battery charge level threshold/criterion, and the like. The at least one energy saving mode criterion may comprise, in field 415, at least one time-related value indicative of at least one scheduled period during which NTN node 107 is to broadcast reduced-content SSB information 310 via at least one NTN downlink beam. As shown in FIG. 5, if NTN node 107 determines that at least one criterion indicated in network energy saving configuration message 305 is satisfied, NTN RAN node 107 may determine one or more downlink NTN beams via which only light SSB information 310 will be broadcast. For example, if fewer user equipment 115, which have selected beam 510, attempt to transition to connected mode than a criterion indicated in field 405, NTN node 107 may suspend broadcasting of full SSB information via beam 510 and instead may only broadcast light SSB/reduced-content SSB information via beam 510. Thus, NTN node 107 may reduce energy consumed that would otherwise be used to facilitate broadcasting full SSB information via beam 510 when very few, if any, user equipment are actually attempting to connect with the NTN node. Accordingly, even though NTN node 107 may ultimately broadcast full SSB information to facilitate a user equipment attempting to connect with the NTN node via beam 510, the NTN node may significantly reduce energy consumed broadcasting full SSB information via beam 510 when a likelihood of a user equipment attempting to connect via beam 510 with the NTN node is low. In another example, even if more user equipment than a number configured via field 405 attempt to connect with NTN node 107 during a configured transitioning period, if the NTN node determines that an energy consumption rate corresponding to the NTN node itself, or a non-terrestrial vehicle that corresponds to or embodies the NTN node, exceeds an energy consumption rate criterion indicated by field 410 and configuration information 305, the NTN node may determine that the energy consumption rate criterion is satisfied and the NTN node may suspend broadcasting full SSB information via one or more beam(s) and may begin broadcasting reduced-content SSB information via the one or more beam(s). In another example, configuration information 305 may comprise, in field 415, time information indicative of at least one energy saving period, during which NTN node 107 is to suspend broadcasting full SSB information via one or more beam(s) and is to instead broadcast reduced-content SSB information via the one or more beam(s).

Figure 7:
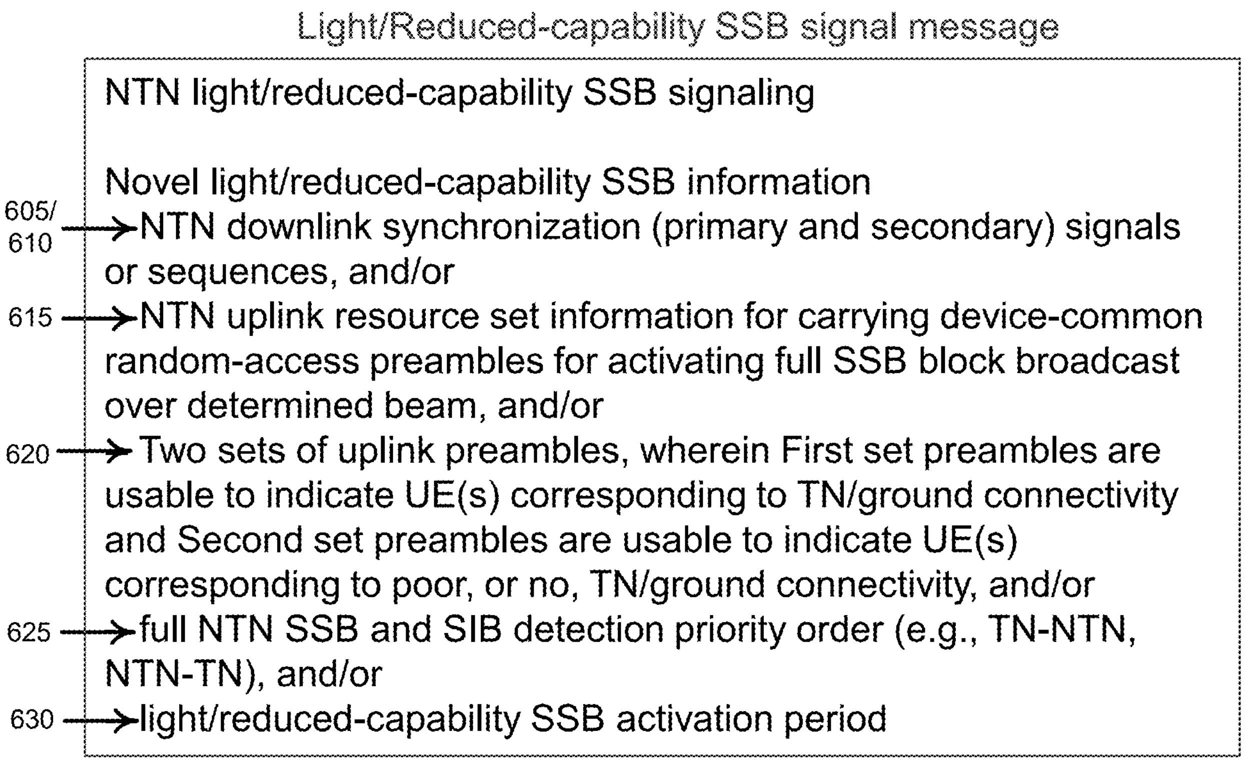
FIG. 7 illustrates example reduced-content synchronization signal block signal message information.

FIGS. 6 and 7 illustrate contents of reduced content synchronization signal block information message 310. As shown in FIG. 6, information 605, 610, 615, 620, and 625 may be broadcast via the same frequency resources but may be separated with respect to time. In an example embodiment, information 605, 610, 615, 620, and 625 may be broadcast via the same time resources but may be separated with respect to frequency. After determining to broadcast reduced-content SSB information 310 via at least one idle-mode beam, for example beams 510 and 515 shown in FIG. 5, NTN node 107 may broadcast the reduced-content SSB information via the determined idle mode beam(s). Reduced content SSB information 310 may respectively comprise in fields 605 and 610 primary and secondary NTN downlink synchronization signals or sequences. Reduced content SSB information 310 may comprise in field 630 a time indication indicative of a during or a light SSB/reduced-content SSB activation period during which the NTN node may suspend broadcasting of full SSB information, at least with respect to at least one idle-mode beam, and instead broadcast a reduced-content SSB information message via the at least one beam. Reduced content SSB information 310 may comprise in field 615 NTN uplink resource set information indicative of idle-mode resources usable by a user equipment to transmit, and usable by the NTN node to receive, device-common random access preambles that may be indicative that the NTN node needs to broadcast full SSB information via a determined idle-mode beam or that may be indicative to activate a refined beam to facilitate connection establishment with a user equipment transmitting the preamble based on minimum system information that the user equipment may have already obtained from a terrestrial node. Reduced content SSB information 310 may comprise in field 620 two sets of device-common uplink preambles, or indications indicative of two sets of device-common preamble. (It will be appreciated that in an example embodiment two different information fields in information 310 may be used to contain or indicate the two different sets of device-common uplink preambles.) The two sets of device common preambles may comprise a first set of first preambles (the first set of first preambles may be referred to as preamble set A) and a second set of second preambles (the second set of second preambles may be referred to as preamble set B.

First preambles of the first preamble set may be used by user equipment to indicate that the user equipment has determined that connectivity, by the user equipment with a terrestrial radio network node, that satisfies a configured connectivity requirement, which may be a conventional signal strength or signal condition criterion, is achievable or has been achieved. Second preambles of the second preamble set may be used by user equipment to indicate that the user equipment has determined that connectivity, by the user equipment with a terrestrial radio network node, that satisfies a configured connectivity requirement is not achievable, or to indicate that, even if connectivity that satisfies the connectivity requirement is achievable, obtaining of minimum system information corresponding to the in TN node is likely unachievable or that an attempt to obtain, by the user equipment, such minimum system information failed.

Reduced content SSB information 310 may comprise, in field 625, a full NTN SSB and system information block detection priority order or a priority order indication in terms of TN-NTN NTN-TN. A priority indication TN-NTN may be indicative that a user equipment receiving message 310 is to attempt to obtain minimum system information corresponding to a non-terrestrial radio network node that broadcast reduced-content message 310 from a terrestrial radio network node before the user equipment attempts to receive the minimum system information from the non-terrestrial radio network node. A priority indication NTN-TN may be indicative that a user equipment receiving message 310 is to attempt to obtain minimum system information corresponding to a non-terrestrial radio network node that broadcast reduced-content message 310 from the non-terrestrial radio network node before the user equipment attempts to receive the minimum system information from the non-terrestrial radio network node, even if the user equipment determines that connectivity that satisfies the connectivity requirement with respect to a terrestrial radio network node is achievable.

The conventional primary and secondary SSB sync signals/sequences indicated in fields 605 and 610 may facilitate idle mode NTN-capable user equipment obtaining/maintaining downlink synchronization with NTN RAN node but lack of further information (e.g., lack of minimum system information in the reduced-content SSB information) may preclude the user equipment from actually accessing the NTN RAN node based only on information contained in, or indicated by, the reduced-content SSB message 310. Information indicated in field 620 may indicate an uplink resource set usable for transmitting, by the user equipment, an uplink preamble via a beam with respect to which light/reduced-contend SSB broadcasting is activated. In an example embodiment, the preamble may function as a request for full SSB delivery via the beam with respect to which reduced-content SSB information is broadcast (e.g., on demand full SSB delivery). A preamble that functions as a request for full SB delivery may be a second preamble selected by the user equipment from a second preamble group indicated in field 620 of information message 310. In another example embodiment, a preamble may function as a direct connection establishment request for a connection with the NTN RAN node. A preamble that functions as a direct connection establishment request may be a first preamble selected from a first preamble group, or set, indicated in field 620 of information message 310. Use of a first preamble from the first preamble group may be applicable if an NTN-capable user equipment device that transmits the first preamble to the non-terrestrial radio network node can obtain NTN SSB access information and NTN SIBs corresponding to the non-terrestrial radio network node (e.g., minimum system information corresponding to the non-terrestrial network node), from a terrestrial radio network node instead.

Field 620 in information message 310 may comprise, indicate, or define the two type sets of uplink preambles (e.g., first preamble group and second preamble group). Any preamble selected from the first preamble set by an NTN-capable user equipment device and transmitted thereby to a non-terrestrial radio network node may be indicative that the user equipment can achieve connectivity with a terrestrial/ground RAN. Any preamble selected from the second preamble set by an NTN-capable user equipment device and transmitted thereby to a non-terrestrial radio network node may be indicative that the user equipment cannot achieve connectivity with a terrestrial/ground RAN.

Field 625 in information message 310 may comprise or indicate a priority order to usable by user equipment to guide the user equipment that receives message 310 with respect to where the user equipment should seek obtaining NTN RAN SSB access information and SIBs corresponding to the not terrestrial network node that broadcast reduced content SSB message 310. In an example embodiment, if field 625 indicates a TN-NTN priority order, a user equipment that may receive message 310 and that may be located such that the user equipment determines adequate or reasonable signal coverage with respect to a terrestrial radio network node (e.g., the user equipment determines that a signal strength or signal quality corresponding to the terrestrial radio network node satisfies a configured connection establishment criterion) may be guided by the priority order to seek NTN SSB and/or NTN SIB1 from the terrestrial radio network node. A TN-NTN priority order may act as optional guidance information from the NTN RAN. However, notwithstanding that the non-terrestrial node indicated the field 625 that a user equipment is to attempt to obtain minimum system information from a terrestrial node before attempting to receive the minimum system information from the non-terrestrial node, the non-terrestrial node may override an indicated TN-NTN priority if the NTN node has obtained information indicative that the user equipment may be unable to achieve connectivity with a terrestrial radio network node or may be unable to receive the minimum system information therefrom. A non-terrestrial network node may also override an indicated TN-NTN priority order if radio channel conditions or other conditions with respect to the non-terrestrial node have changed since the broadcasting of the reduced content information message such that minimum system information corresponding to the non-terrestrial node that the user equipment may obtain from a terrestrial node may no longer be applicable to connection establishment with respect to the non-terrestrial radio network node.

Figure 8:
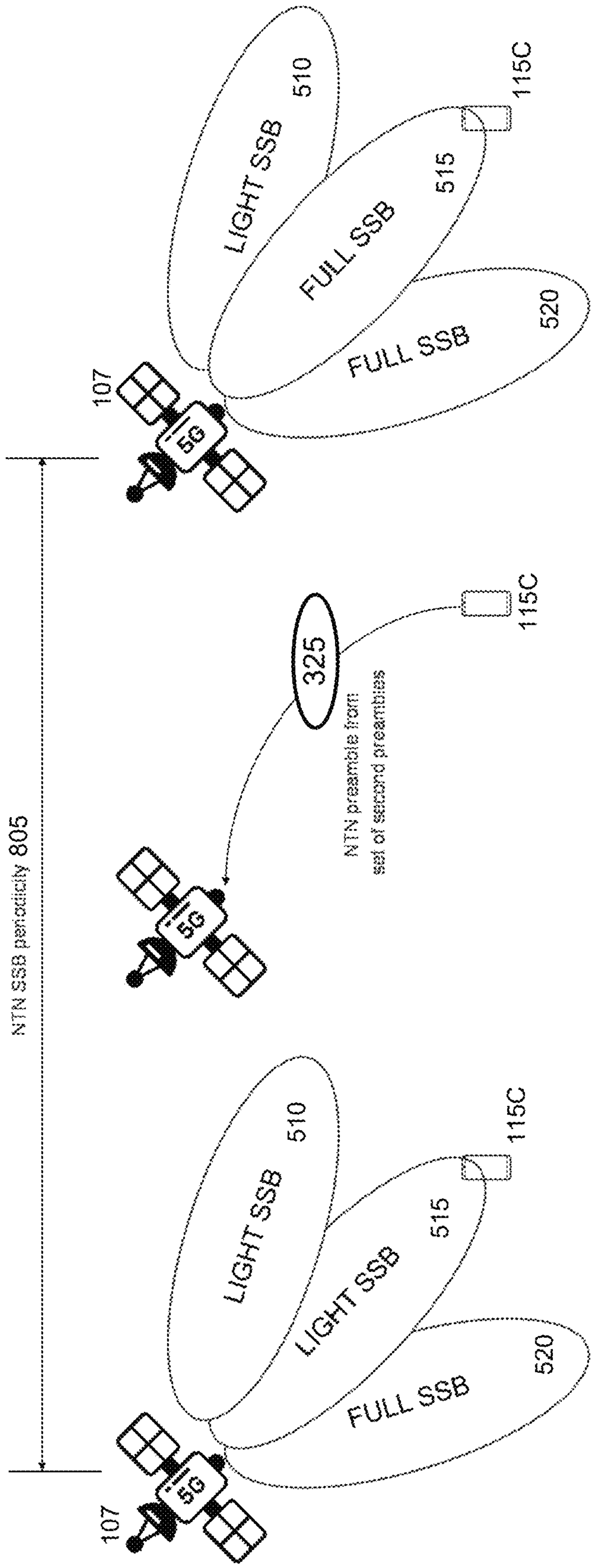
FIG. 8 illustrates an example non-terrestrial radio network node activating, in response to receiving a preamble from a second group of preambles configured to a user equipment via a reduced-content synchronization signal block signal message, an idle-mode beam to broadcast full synchronization signal block information via the activated beam.

In an example embodiment shown by FIG. 8, on condition of receiving, via preamble message 325, a device-common second uplink preamble, selected by UE 115C from a second preamble set, NTN RAN 107 may activate idle-mode beam 115, which may have been broadcasting light/reduced-content SSB information, and may broadcast/transmit full SSB information, corresponding to NTN node 107, via downlink NTN beam 515. As shown in FIG. 8, node 107 may broadcast/transmit full SSB information after a configured SSB broadcast periodicity 805 has elapsed after node 107 broadcast reduced content SSB information via beam 515 before receiving preamble message 325.

Figure 9:
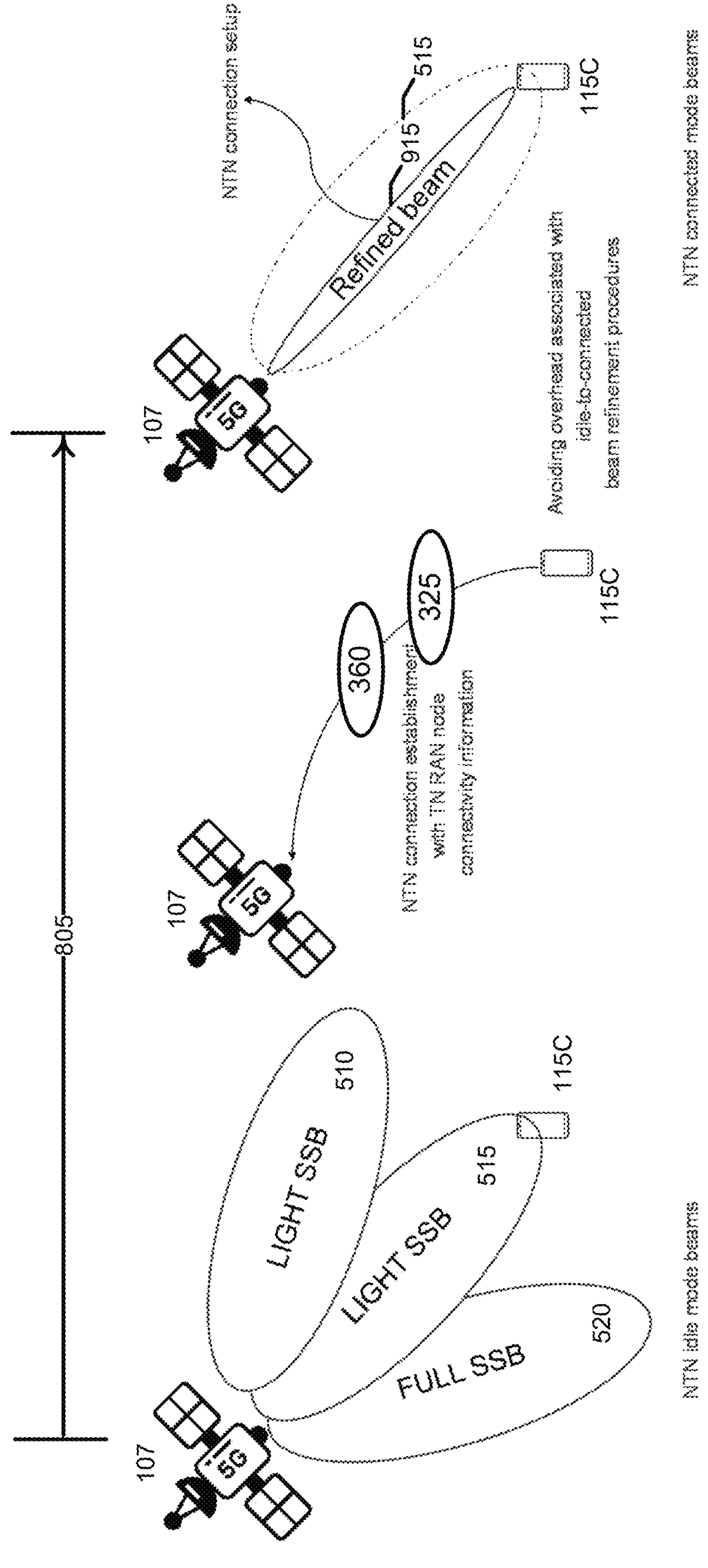
FIG. 9 illustrates an example non-terrestrial radio network node activating, in response to receiving a preamble from a first group of preambles configured to a user equipment via a reduced-content synchronization signal block signal message, a refined beam to facilitate establishing a connection with the user equipment.

In an example embodiment shown by FIG. 9, on condition of receiving, via preamble message 325, a first device-common uplink preamble, selected by user equipment 115C from a first preamble set, and on condition that reduced content SSB information message 310 transmitted via beam 515 indicates in field 625 an SSB detection priority order TN-NTN (e.g., obtaining minimum system information from a TN RAN corresponds to a higher priority than obtaining the minimum system information from node 107), NTN RAN node may resume, or continue, broadcasting light/reduced-content SSB information via NTN beam 515 according to periodicity 805. Responsive to receiving the first preamble via preamble message 325, NTN node 107 may facilitate connection establishment procedure with UE 115C according to minimum system information, indicated in connection establishment message 360 received from the UE, that may have been received from a terrestrial radio network node and that corresponds to NTN node 107. If connection establishment request message 360 comprises terrestrial node information indicative of a terrestrial node from which UE 115C obtained minimum system information corresponding to NTN node 107 (e.g., a TN node identifier or a terrestrial tracking identifier), NTN RAN node 107 may determine a non-idle-mode NTN downlink beam 915 that may correspond to a sharper/narrower beam pattern or a higher gain compared to idle mode beams 515 and that may be associated with the indicated TN RAN node or tracking identifier (e.g., beam 915 overlaps beam 355 or UE 115 as shown in FIG. 3). Non-terrestrial network node 107 may facilitate delivery of non-terrestrial connection setup/response messages with NTN-capable UE device 115C via refined beam 915. It will be appreciated that because connection establishment message 360 may indicate a terrestrial network node from which user equipment 115C may have obtained minimum system information corresponding to not terrestrial network node 107, the non-terrestrial network node may use information corresponding to a location of the terrestrial network node or the user equipment to determine refined beam 915 without conducting beam refinement procedures with the user equipment. It will be appreciated that user equipment 115C may have obtained information corresponding to, or indicative of, refined beam 915 from the terrestrial radio network node from which the user equipment obtained minimum system information corresponding to the non-terrestrial radio network node.

Figure 14:
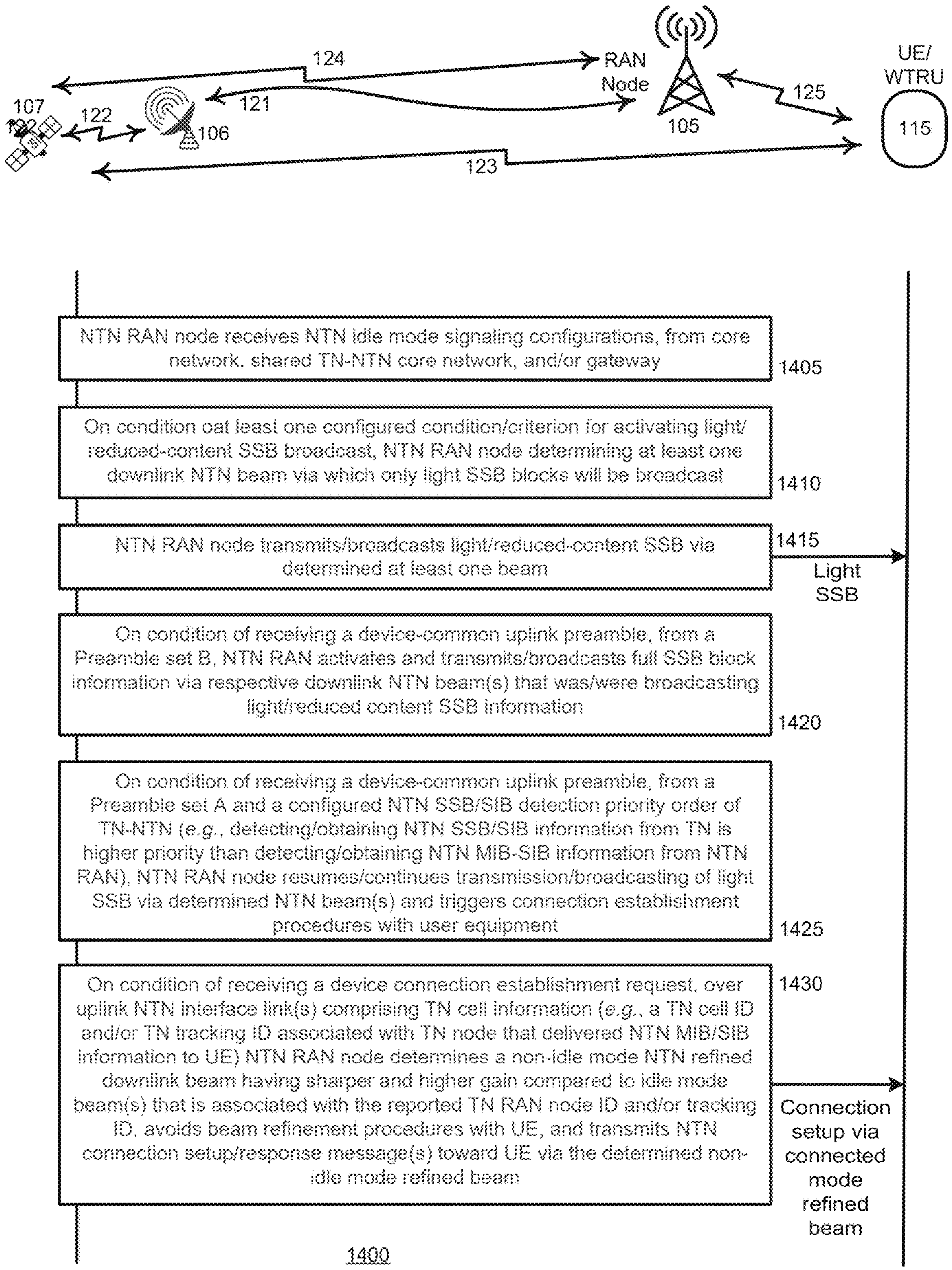
FIG. 14 illustrates an example timing diagram of a non-terrestrial radio network node broadcasting a reduced-content synchronization signal block signal message.

Turning now to FIG. 14, the figure illustrates a timing diagram of an example method 1400. At act 1405, non-terrestrial RAN node/cellular satellite 107 may receive NTN idle mode signaling configuration information, which may be referred to as a network energy saving configuration message, from core network 130, shared TN-NTN core network element 131, and/or gateway 106. The network energy saving configuration message may comprise energy saving configuration information that may comprise a minimum threshold/criterion number of NTN-capable user equipment transitioning from idle/inactive mode to connected mode with respect to an idle mode downlink beam. If an actual number of user equipment transitioning from idle/inactive mode to connected mode for a particular beam is smaller than a configured threshold/criterion, NTN RAN node 107 may activate a mode of operation wherein the NTN node broadcasts a light synchronization signal block message, which may be referred to as a reduced-content SSB message, via the particular beam. The network energy saving configuration message may comprise energy saving configuration information that may comprise an energy consumption threshold/criterion, which may be an energy consumption rate threshold/criterion. The network energy saving configuration message may comprise energy saving configuration information that may comprise a scheduled time period indication indicative of a period during which NTN node 107 is to trigger/implement light SSB broadcast via one or more NTN downlink beams.

On condition of one or more configured criterion/criteria for activating light SSB broadcast being determined to be satisfied, at act 1410 NTN RAN node 107 may determine one or more downlink NTN beam(s) via which only light SSB information is to be broadcast by the NTN node. At act 1415, NTN RAN node 107 may transmit, or broadcast, a light SSB message, which may be referred to as a reduced-content synchronization signal block signal message. The light SSB message may comprise light SSB information and may be delivered via idle-mode beams determined to be used for broadcasting of light SSB information. Light SSB information, or reduced content SSB signal message information may comprise at least one first preamble indication indicative of at least one first preamble and at least one second preamble indication indicative of at least one second preamble. NTN node 107 may not include in the reduced-content synchronization signal block signal message master information block information corresponding to the non-terrestrial radio network node. The reduced content SSB signal message information may comprise NTN downlink primary synchronization signals or sequences or NTN downlink secondary synchronization signals or sequences. The reduced content SSB signal message information may comprise indication of NTN uplink resources indicative of uplink resources usable to deliver the device-common random-access preambles, the receiving of which by NTN node 107 may trigger activating broadcasting of full SSB block information via determined beam(s). Of the two sets of uplink preambles (preamble set A or first preamble set comprising at least one first preamble, and preamble set B or second preamble set comprising at least one second preamble), preambles corresponding to preamble set A/first preamble set may be usable by user equipment 115 to indicate to NTN node 107 that the user equipment are within a range of TN node 105, corresponding to signal strength measured by the user equipment that may satisfy a configured signal strength criterion that may facilitate connectivity between the user equipment and the TN node. Preambles corresponding to preamble set B/second preamble set may be usable by user equipment 115 to indicate to NTN node 107 that the user equipment are not within a range of TN node 105, corresponding to signal strength measured by the user equipment, that is determined by the user equipment to not satisfy the configured signal strength criterion, such that connectivity between the user equipment and the TN node may not be achievable. The reduced content SSB signal message information may comprise a full NTN SSB and system information block detection priority indication, indicative of an order with respect to which user equipment 115 is to attempt to determine MIB and SIB information. For example, a priority indication of TN-NTN may be indicative to UE 115 that UE 115 is to attempt to obtain MIB and SIB1 information from TN node 105 before attempting to obtain the MIB and SIB1 information from NTN node 107, and a priority indication of NTN-TN may be indicative to UE 115 that UE 115 is to attempt to obtain MIB and SIB1 information from NTN node 107 before attempting to obtain the MIB and SIB1 information from TN node 105. The reduced content SSB signal message information may comprise a light SSP period, start time, or duration indicative of a light SSB duration period during which NTN node 10 is to activate broadcasting of light SSB/reduced-content SSB information.

If NTN RAN node 107 receives a device-common uplink second preamble according to uplink resources indicated by the reduced-content SSB information broadcast at act 1415 and corresponding to preamble set B (e.g., second preamble set), at act 1420 NTN RAN node 107 may transmit/broadcast full SSB block information (e.g., comprising MIB information that indicates SIB1 information) or SIB1 information via an activated downlink NTN beam, which may be the same beam as the reduced-content SSB information was broadcast at act 1415. If NTN RAN node 107 receives a device-common uplink preamble, according to the resources configured via the reduced-content SSB information message broadcast at act 1415 and corresponding to preamble set A (e.g., first preamble set) and if a configured NTN SSB/SIB detection priority order of TN-NTN was indicated via the reduced-content SSB information, (e.g., reduced-content information indicates that TN RAN node is a higher priority for detecting NTN SSB/SIB information than NTN RAN node), at act 1425 NTN RAN node 107 may resume/continue transmission of light SSB/reduced-content SSB information over the determined NTN beam which broadcast the reduced-content SSB information at act 1415. NTN node 107 may, at act 1425, trigger, or facilitate, connection establishment procedure with UE 115.

If NTN node 107 receives, from UE 115, a connection establishment request, via uplink NTN interface link(s) 123, comprising a TN node identifier (e.g., a node identifier or a tracking area identifier) indicative of TN node 105 (e.g., a TN RN node to which UE established a temporary connection for purposes of obtaining therefrom MIB or SIB1 information corresponding to NTN node 107), at act 1430 NTN RAN node 107 may select, or refine, a non-idle mode or connected-mode NTN downlink beam that may be sharper (e.g., narrower) or higher gain as compared to an idle-mode beam determined at act 1410 and that is associated with, corresponds to, or overlaps with TN node 105. NTN node 107 may transmit NTN connection setup/response message(s) toward NTN-capable UE device 115 the determined non-idle mode refined beam.

On-Demand Non-Terrestrial System Information Delivery Over Terrestrial Networks.

Returning to description of FIG. 3, terrestrial network RAN node 105 may receive reduced-capability connection establishment request 335 from NTN-capable user equipment device 115 via TN uplink radio interface link(s) 125. Request 335 may comprise a service cause indication 1005 (shown in FIG. 10) indicative of a request by UE 115 for synchronization signal block/system information block information (e.g., minimum system information) corresponding to NTN node 107. Request message 335 may comprise identifier 1010 indicative of NTN node 107. Request message 335, or a service cause indication 1005 indicated thereby, may be be indicative that UE 115 is requesting temporary establishment of a connection with TN node 105 for the purpose of obtaining minimum system information corresponding to NTN node 107. Thus, in establishing a reduced-capability connection with UE 115 at act 8, TN RAN node 105 may avoid establishing a dedicated bearer or quality of service ("QoS") profile with respect to UE 115. In establishing a reduced-capability connection with UE 115 at act 8, TN RAN node 105 may only allocate/schedule control channel resources corresponding to the reduced-capability connection and may avoid allocating/scheduling data channel resources corresponding to the reduced-capability connection.

Figure 11:
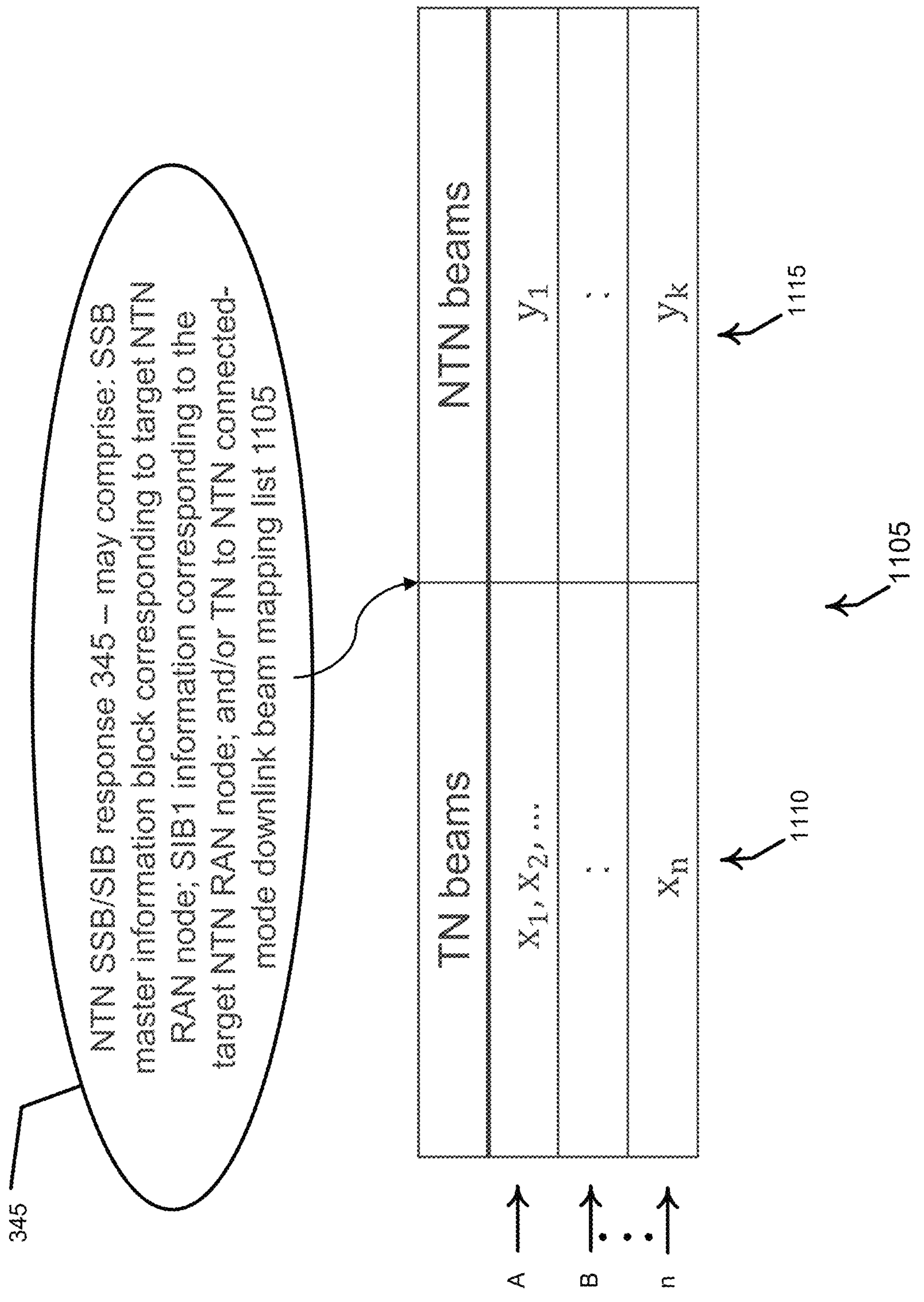
FIG. 11 illustrates example terrestrial-to-non-terrestrial connected-mode downlink beam mapping configuration information.

Continuing with description of FIG. 3, at act 9 TN RAN node 105 may transmit, via backhaul interface link(s) 120 toward shared core network element 131, an element of core network 130, and/or NTN gateway entity 106, an NTN SSB/SIB fetch request 340 that may comprise an NTN node identifier associated with target NTN RAN node 107 (the identifier of NTN node 107 may have been indicated in field 1010 of reduced capability connection establishment request message 335 received from easier equipment 115). At act 10, TN RAN node 105 may receive, from core network 130, from shared core network element 131, and/or NTN gateway 106 via backhaul interface link(s) 120, NTN SSB/SIB response message 345 that may comprise, as shown in FIG. 11, SSB master information block (MIB) content corresponding requested target NTN RAN node 107, or SIB1 information corresponding to target NTN RAN node 107. A response 345 message may comprise TN-to-NTN connected-mode downlink beam mapping information 1105, which may comprise one or more association(s) between one or more TN RAN beams, indicated/identified in column 1110, via which NTN user equipment 115 device may be served (e.g., beam 355 shown in FIG. 3) and at least one connected mode NTN RAN beam indicated in column 1115. In an example embodiment, an entire TN beam set corresponding to TN RAN node 105 may be associated with a single NTN downlink beam.

At act 11, TN RAN node 105 may determine a connected-mode TN downlink beam associated with NTN-capable user equipment 115 and, based on beam mapping information 1105, a corresponding NTN connected-mode downlink beam. TN RAN node may compile and transmit, at act 12 toward NTN-capable user equipment 115 via downlink TN radio interface link(s) 125 and beam 355, NTN SSB/SIB information message 350 that may comprise: SSB master information block content corresponding to NTN node 107; SIB1 information corresponding to target NTN RAN node 107; and/or NTN downlink connected-mode beam information, indicative of an NTN beam determined at act 11 (e.g., beam 915), usable by UE 115 to receive NTN connection establishment setup configuration information. At act 13, user equipment 115 may transmit to non-terrestrial radio network node 107 connection establishment message 360, which may comprise information received from TN node 105 via message 350.

Figure 15:
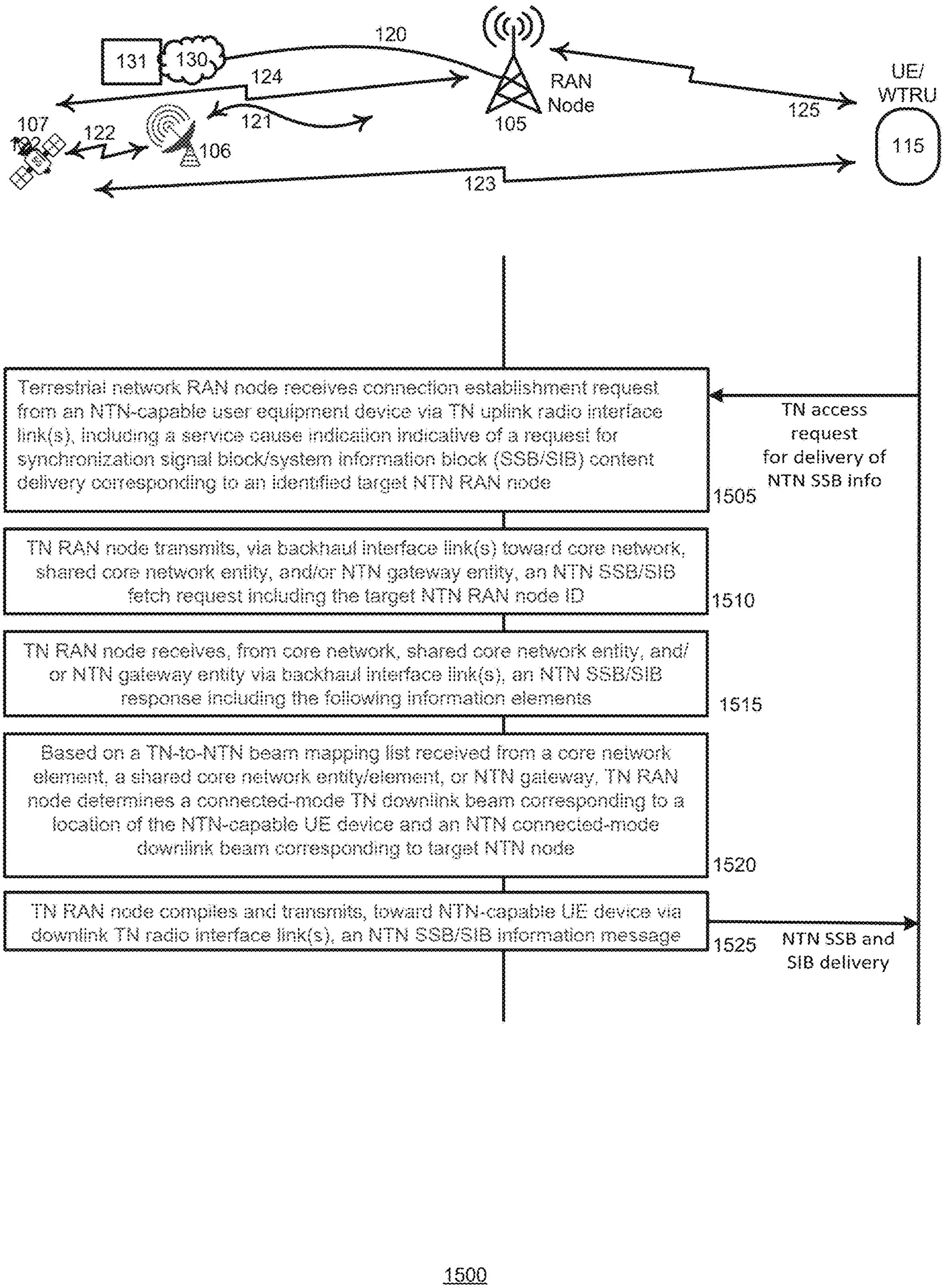
FIG. 15 illustrates an example timing diagram of a terrestrial radio access network node facilitating a user equipment establishing a connection with a non-terrestrial radio access network node that is broadcasting a reduced-content synchronization signal block signal message.

Turning now to FIG. 15, the figure illustrates a timing diagram of an embodiment method 1500. At act 1505, terrestrial RAN node 105 may receive a reduced capability connection establishment request from NTN-capable user equipment device 115 via TN uplink radio interface link(s) 125. The connection establishment request may comprise a service cause indication indicative of a request for delivery of synchronization signal block/system information block content corresponding to target NTN RAN node 107 via a reduced-capability connection via link(s) 125. Responsive to the request received at act 1505, at act 1510, TN RAN node 105 may transmit, via backhaul interface link(s) 120 toward core network 130, shared core network element 131, or NTN gateway entity 106, an NTN SSB/SIB fetch request comprising an identifier indicative of target NTN RAN node 107. At act 1515, NTN node 105 may receive, from core network 130, from shared core network element 131, of from NTN gateway 106 via backhaul interface link(s) 120, an NTN SSB/SIB response. The response received at act 1515 may comprise: SSB master information block content corresponding to NTN node 107, SIB1 information corresponding to target NTN RAN node 107, and/or an TN-to-NTN connected-mode downlink beam mapping list. At act 1520, TN RAN node 105 may determine a connected-mode TN downlink beam corresponding to the receiving of the connection establishment request from UE 115 at act 1505. TN RAN node 105 may determine an NTN connected-mode downlink beam, corresponding to NTN node 107, based on the TN-to-NTN beam mapping list, that corresponds to, or overlaps, or is associated with, UE 115 or the TN beam according to which the request was received at act 1505. At act 1525, TN RAN node 105 may compile and transmit, towards the NTN-capable UE device 115 via a reduced-capability connection over downlink TN radio interface link(s) 125 NTN SSB MIB and SIB1 content/information corresponding to NTN node 107. The reduced-capability connection may be established by TN RAN node 105 to only facilitate delivery of control channel traffic and not delivery of data channel traffic. The NTN SSB MIB and SIB information may comprise SSB master information block (MIB) content corresponding to target NTN RAN node 107, and/or SIB1 information corresponding to target NTN RAN node 107. The information transmitted by TN RAN node 105 to UE 115 via the reduced capability connection over link(s) 125 may comprise NTN beam information indicative of, or corresponding to, the determined NTN downlink connected-mode beam, which may be a refined beam, determined at act 1520, that may be usable by UE 115 to receive NTN connection establishment setup configuration information from NTN node 107.

Two-Stage Non-Terrestrial Synchronization Signal Detection.

Returning to description of FIG. 3, NTN-capable UE/WTRU 115 may receive and blindly detect/decoding downlink NTN synchronization signal block information over a best NTN downlink beam (e.g., a beam corresponding to NTN node 107 determined by UE 115 to correspond to a strongest signal strength or a best signal characteristic as compared to other downlink beams corresponding to NTN node 107). On condition of a detected light SSB message 310, for example via beam 515 shown in FIG. 8, NTN-capable UE 115 may blindly decode the light SSB message and determine contents thereof.

On condition of idle-mode UE 115 determining to establish a non-terrestrial connection with NTN node 107, NTN-capable UE 115C may determine, from field 625 in message 310, a priority order for obtaining NTN SSB and SIB based on information received via light SSB information message 310 (e.g., based on a priority order indicated in field 620 of message 310). On condition of UE/WTRU 115 failing to detect TN/ground connectivity that satisfies a minimum received coverage threshold/criterion (e.g., criterion/threshold indicated in field 1310B of preamble configuration/table 1300 shown in FIG. 13), regardless of a priority order indicated in field 625 of reduced-content SSB message 310, NTN-capable UE 115 may transmit, at act 5, via NTN uplink radio interface link(s) 123, a preamble message 325 comprising a second uplink preamble, selected by the UE from a second preamble set 1315B indicated in message 310, via at least one device-common uplink resource configured via field 615. (Determining terrestrial connectivity and then obtaining minimum system information based on a priority order may be referred to as two-stage NTN SSB detection.) At act 6, UE 115 may receive, via downlink NTN interface link(s) 123, and decode a next SSB block transmission (e.g., a next-occurring SSB signal message transmission according to a configured SSB transmission periodicity, such as periodicity 805 indicated in FIG. 8) which may be a full SSB signal message. Based on the full SSB signal message received and decoded at act 6, UE 115 may initiate NTN connection establishment with respect to NTN RAN node 107.

On condition of UE 115 detecting terrestrial/ground connectivity with a terrestrial RAN node 105 that satisfies a minimum received coverage threshold 1310A of configuration information 1300 shown in FIG. 13, and on condition of reduced-content SSB message 310 being indicative in field 625 of a TN-NTN priority order, UE 115 may, at act 7, initiate a temporary connection establishment with TN RAN node 105 (that has been determined to satisfy the preconfigured minimum TN coverage threshold/criterion 1310A) by sending connection establishment message 335, which may comprise, a service cause indication 1005, indicative of a request for delivery to UE 115 of SSB/SIB content corresponding to NTN RAN node 107 identified in field 1010 of request 335. A service cause indicated in field 1005 may indicate that UE 115 is 'announcing' to TN node 105 that the sole reason for establishing a temporary terrestrial connection with TN node 105 is to obtain NTN SSB access information and SIB information corresponding to the indicated target NTN RAN node. Thus, TN RAN node 105 does not need to establish a dedicated bearer or QoS profile with respect to UE 115.

Figure 12:
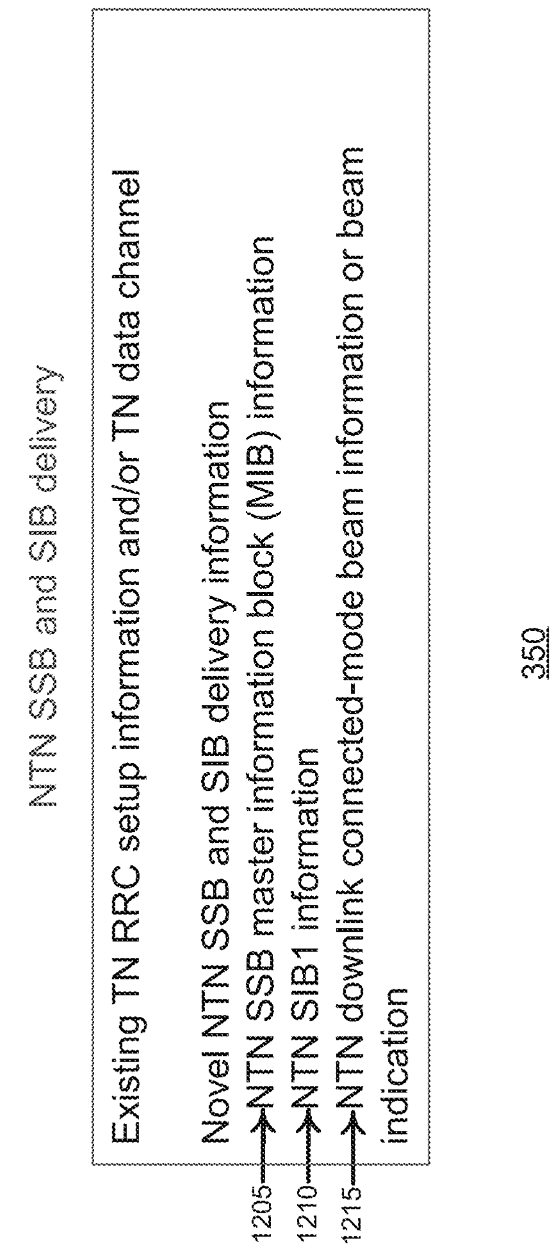
FIG. 12 illustrates an example non-terrestrial connection information message.

At act 12, NTN-capable UE/WTRU 115 may receive, from the serving TN RAN node 105 via a temporary reduced-capability connection established at act 8, an NTN idle-mode configuration block message 350, which may be referred to as a minimum system information message, comprising minimum system information corresponding to NTN RAN node 107 identified/indicated in request message 335. As shown in FIG. 12, in field 1205 message 350 may comprise SSB master information block information corresponding to NTN RAN node 107 or in field 1210 SIB1 information corresponding to the NTN RAN node. Message 350 may comprise non-terrestrial downlink connected-mode beam information, or indication thereof, corresponding to a refined beam that may be used by NTN node 107 to establish a connection with UE 115. Information contained in, or indicated by, fields 1205 and 1210 may correspond to SSB access information and/or additional SIB information, respectively, associated with target NTN RAN node 107 indicated in message 335 such that NTN-capable UE device 115 may, based on transmitting to the NTN RAN node a first preamble selected from first preamble set contained in field 1315A of configuration information 1300 shown in FIG. 13, become able to immediately, or rapidly, establish a connection with target NTN RAN node based on NTN RAN node access information Included in, or indicated by message 350.

Information included in, or indicated by, field 1215 may be optional, but use by user equipment 115 of information contained in field 1215 may facilitate reducing energy consumption at target NTN RAN node 107. Information indicated in field 1215 of message 350 May facilitate user equipment 115 and non-terrestrial radio network node 107 establishing connection via a refined beam, such as beam 915 indicated in FIG. 9, that may have a narrower beam pattern and/or a higher gain than an idle mode beam that may be used by the notarial radio network node to broadcast synchronization signal block signal messages, whether full SSB messages or reduced-content messages 310. Typically, NTN RAN node may broadcast SSB messages via much wider and lower gain idle-mode beams (e.g., beam 515) than refined beam 915, wherein the idle mode beams are typically low-capacity and are typically further refined to facilitate an established connection according to energy-consuming beam refinement procedures when an NTN-capable UE device connects to the NTN RAN node. Instead, because a non-terrestrial coverage footprint (e.g., geographic coverage area) corresponding to an NTN beam corresponding to an NTN node is typically much larger than a terrestrial footprint corresponding a TN beam, and a single NTN refined beam can span/cover a geographic area overlapping multiple terrestrial beams corresponding to multiple TN RAN nodes, NTN-capable user equipment devices 115, receiving NTN SSB/SIB information from TN node 105 via TN interface link(s) 125, can be proactively configured with beam information corresponding to an already-refined connected mode NTN beam (e.g., beam 915), which may be used by NTN RAN node 107 when the UE devices establish a connection therewith since the location of the device is known due to a connection established at act 8 based on reduced-capability connection establishment request message 335 transmitted at act 7. Accordingly, when NTN-capable UE device 115 establishes a connection with NTN RAN node 107, the connection can be rapidly established on already-refined beam 915, without the NTN RAN node and UE having to conduct and execute conventional energy-heavy and signaling-heavy beam refinement procedures. To facilitate establishing a connection with NTN RAN 107, user equipment 115 may select a first preamble from a first preamble set indicated via reduced-content SSB message 310, and the user equipment may transmit, at act 13, preamble message 360 comprising the selected first preamble. Preamble message 360 may be transmitted via NTN uplink radio interface link(s) according to uplink resources indicated in field 620 of reduced-content SSB message 310. UE 115 may receive NTN connection setup information via downlink NTN radio interface link(s) 123 and via connected-mode NTN refined downlink beam 915 configured by the TN RAN node via message 350.

Figure 16:
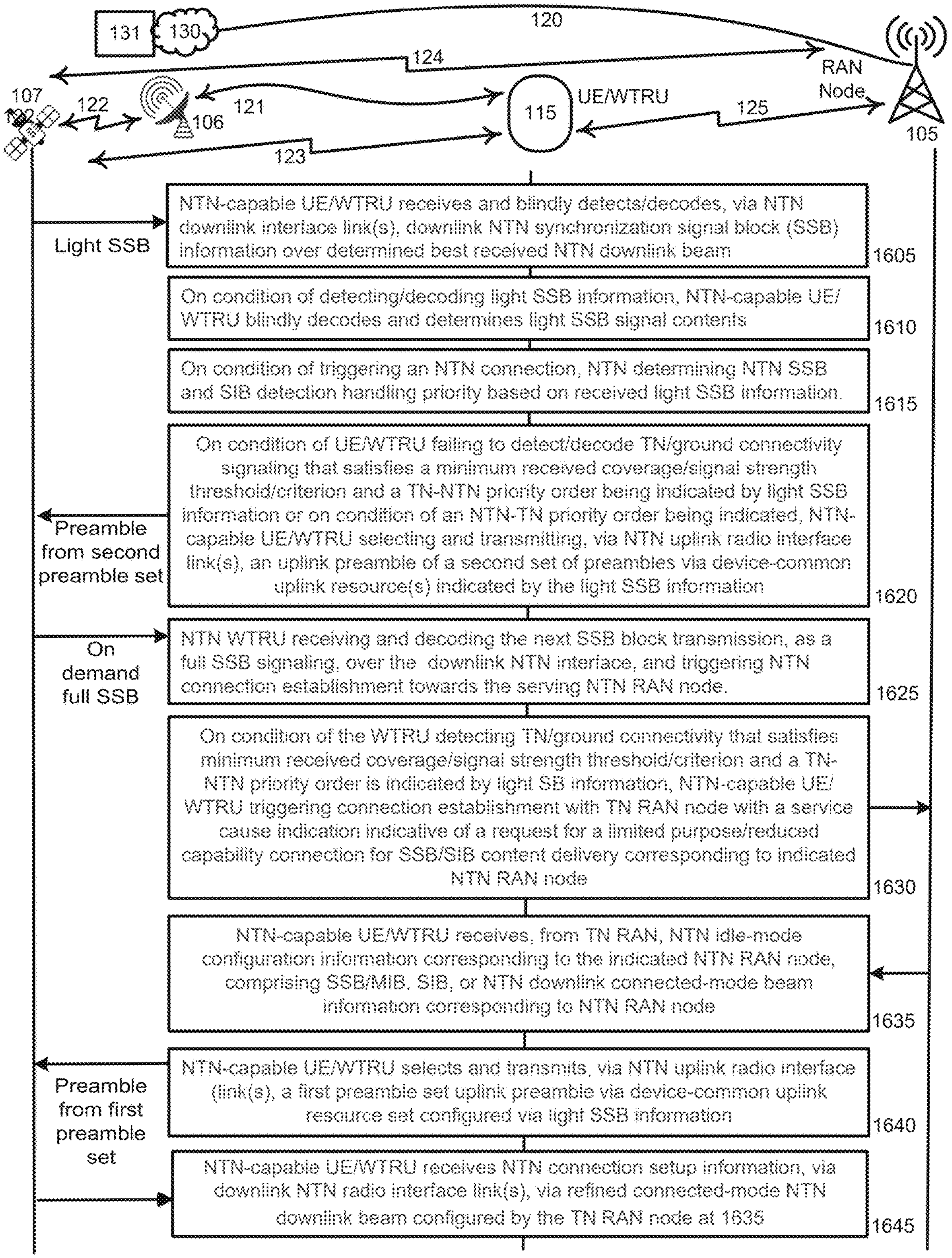
FIG. 16 illustrates an example timing diagram of a user equipment establishing a connection with a non-terrestrial radio access network node that is broadcasting a reduced-content synchronization signal block signal message.

Turning now to FIG. 16, the figure illustrates a timing diagram of an example method embodiment 1600. At act 1605, user equipment 115 may receive and blindly detect and decode, via NTN downlink interface link(s) 123, downlink NTN synchronization signal block information a best received NTN downlink beam (e.g., a beam corresponding to a strongest signal strength as determined by UE 115). On condition of determining that a SSB information detected/decoded at act 1605 corresponds to a light/reduced-content SSB, at act 1610 NTN-capable UE/WTRU 115 may blindly decode and determine light/reduced-content SSB signal content information that may comprise NTN primary and secondary downlink synchronization signals or sequences. The light/reduced-content SSB signal content information may comprise NTN uplink resource set information indicative of NTN uplink resource(s) usable by UE 115 to delivery, to NTN node 107, device-common random-access preambles that may be usable to trigger activating broadcasting of full SSB block information via an NTN beam. The light/reduced-content SSB signal content information may comprise or indicate two sets of uplink preambles including a first preamble set, which may be referred to as preamble set A, and which may comprise first preambles, or indications thereof, that may be usable by UE 115 to indicate to NTN node 107 that the UE has is located within a distance that may facilitate connectivity between the UE and TN node 105, and that UE 115 may have received MIB and SIB1 information corresponding to NTN node 107 from TN node 105. The light/reduced-content SSB signal content information may comprise a second preamble set, or second preamble set indication(s), which may be referred to as preamble set B, and which may comprise or indicate second preambles that may be usable by UE 115 to indicate to NTN node 107 that the UE has is not located within a distance that may facilitate connectivity between the UE and TN node 105, and that NTN node 107 is to transmit to UE 115 MIB and SIB1 information corresponding to NTN node 107. The light/reduced-content SSB signal content information may comprise a full NTN SSB and system information block detection priority order or priority order indication in terms of a TN-NTN priority order or an NTN-TN priority order. The light/reduced-content SSB signal content information may comprise time information indicative of a light SSB activation period during which reduced-content SSB information is to be broadcast via the NTN beam that UE 115 determined to be a best beam.

On condition of UE 115 determining to initiate connection establishment with NTN node 107, at act 1615 UE 115 may determine NTN SSB and SIB detection handling priority based on information contained in a reduced-content SSB information signal message decoded at act 1610.

On condition of UE/WTRU 115 not detecting terrestrial/ground node connectivity with respect to TN node 105 that satisfies a configured minimum received coverage threshold criterion and on condition of a TN-NTN priority order indicated in the reduced capability SSB information, or on condition of a priority order indication indicative of an NTN-TN priority order or priority order indication, NTN-capable UE 115 may, at act 1620, transmit, via NTN uplink radio interface link(s) 123, an uplink preamble selected, by the UE, from the second preamble set according to device-common NTN uplink resources configured via the reduced-content SSB signal message information decoded at act 1610. At act 1625, NTN UE/WTRU 115 may receive, from NTN node 107, and decode a next SSB block broadcast transmission, which may comprise full SSB signaling (e.g., MIB information corresponding to NTN node 107) via downlink NTN interface link(s) 123, and may transmit NTN connection establishment signal messaging toward serving NTN RAN node 107 according to information received in the full SSB broadcast message or information indicated thereby (e.g., SIB1 information corresponding to TN node 107).

On condition of NTN-capable UE/WTRU 115 determining that the TN node 105 can facilitate terrestrial connectivity that satisfies a configured minimum received coverage threshold/criterion, and on condition of UE 115 determining that reduced-content SSB information decoded at act 1610 is indicative a TN-NTN priority order, at act 1630 NTN-capable UE/WTRU 115 may transmit connection establishment messaging toward TN RAN node 105 with respect to which a signal strength determined by UE 115 satisfies a preconfigured minimum TN coverage threshold. The connection establishment message transmitted at act 1630 may comprise a service cause indication indicative of a request that TN node 105 establish a reduced-capability connection with UE 115 for the purpose of delivery of SSB/SIB1 content, corresponding to NTN node 107, to UE 115 via a control channel, wherein the reduced-capability connection does not comprise data channel resources being set up by TN RAN node 105 with respect to UE 115. At act 1635, responsive to the connection establishment request transmitted at act 1630, NTN-capable UE/WTRU may receive, from serving TN RAN node 105, NTN idle-mode configuration information block comprising SSB information and SIB1 information corresponding to NTN node 107 indicated by, or in connection with, the connection establishment request transmitted at act 1630. The NTN idle-mode configuration block received at act 1635 may comprise NTN SSB master information block information corresponding to NTN node 107, NTN SIB1 information corresponding to NTN node 107, or NTN downlink connected-mode beam information corresponding to an NTN downlink beam to be usable by UE 115 to facilitate establishing a non-terrestrial connection with NTN node 107. At act 1640, NTN-capable UE/WTRU may transmit, via NTN uplink radio interface link(s), an uplink preamble selected, by UE 115, from the second set of preambles indicated by the reduced-content SSB information decoded at act 1610, according to device-common NTN uplink resources configured via the reduced-content SSB information decoded at act 1610. At act 1645, NTN-capable UE/WTRU 115 may receive non-terrestrial connection setup information via downlink NTN radio interface link(s) 123 and via a connected-mode NTN downlink beam indicated/configured by TN RAN node 105 at act 1635.

Figure 17:
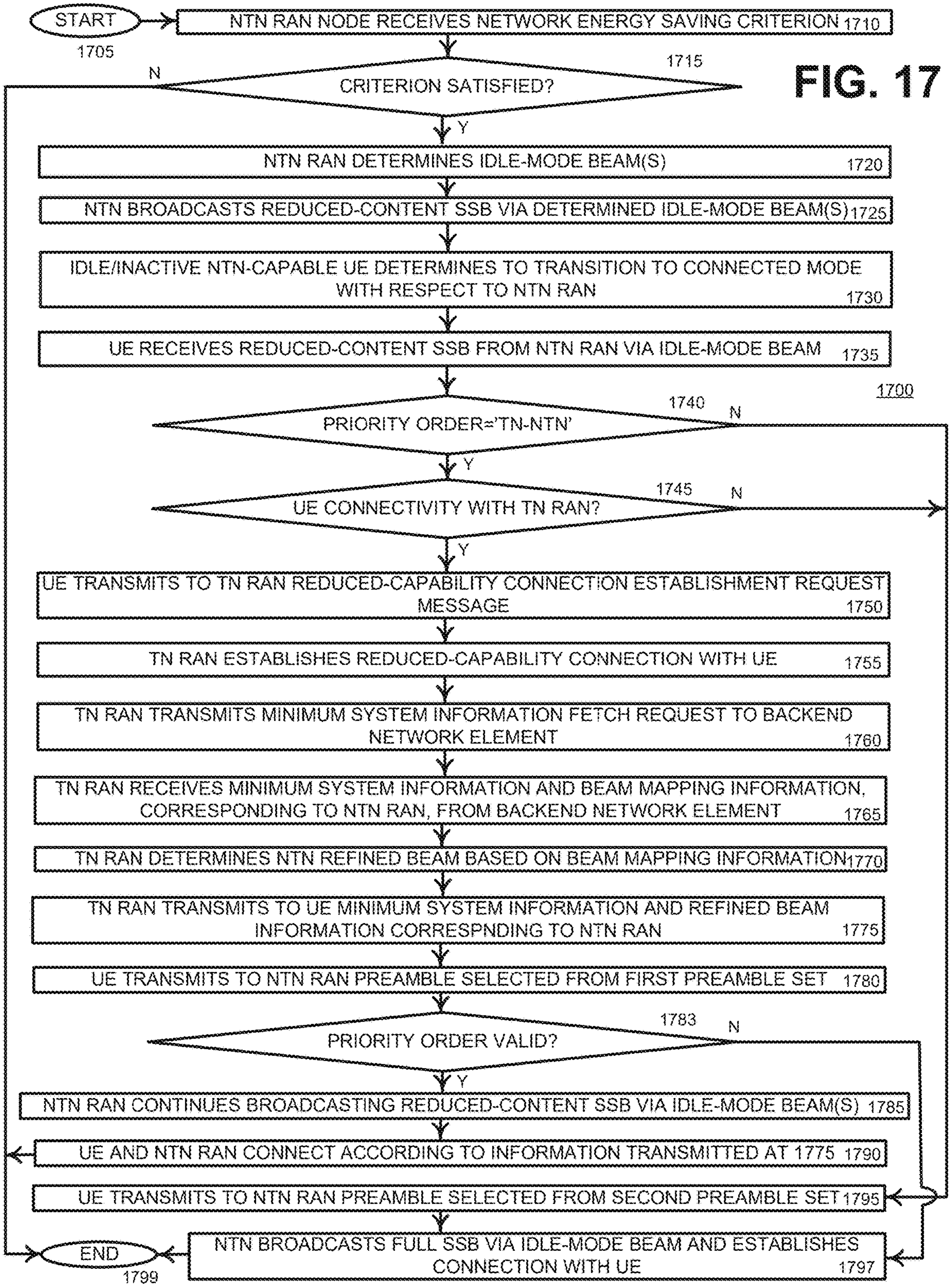
FIG. 17 illustrates a flow diagram of an example method of a non-terrestrial radio access network node broadcasting a reduced-content synchronization signal block signal message and a user equipment establishing a connection thereto.

Turning now to FIG. 17, the figure illustrates a flow diagram of an example method 1700. Method 1700 begins at act 1705. At act 1710, a non-terrestrial radio network node may receive network energy saving criterion, or criteria, from a core network element, a shared core network element, or a non-terrestrial network gateway, or another element, entity or component associated with the non-terrestrial radio network node. The network energy saving criterion, or criteria, may comprise an energy consumption criterion or a network energy saving period time value during which the non-terrestrial network node is to implement broadcasting of a reduced-content synchronization signal block signal message via at least one idle-mode beam. At act 1715, the non-terrestrial network node may determine whether at least one of the network energy saving criterion is satisfied. For example, if an energy consumption rate corresponding to a satellite, or other non-terrestrial vehicle that facilitates, encompasses, embodies or otherwise corresponds to the non-terrestrial radio network node, equals or exceeds an energy consumption rate criterion, the not terrestrial radio network node may determine that the energy consumption rate criterion is satisfied. If the non-terrestrial radio network node determines that the at least one network energy saving criterion is not satisfied, method 1700 advances to act 1799 and ends. Returning to description of act 1715, if the non-terrestrial radio network node determines that the at least one network energy saving criterion is satisfied, method 1700 advances to act 1720.

At act 1720, the non-terrestrial radio network node may determine one or more idle mode beams to use to broadcast a reduced content synchronization signal block message. At act 1725, the non-terrestrial radio network node may broadcast a reduced content synchronization signal block message, for example message 310 described in reference to FIGS. 3 and 6, via at least one of the one or more determined idle mode beams determined at act 1720. The reduced content synchronization signal block message may be referred to as a 'light' synchronization signal block. The reduced content synchronization signal block message may comprise primary synchronization signal block information and secondary synchronization signal block information. The reduced content synchronization signal block may comprise an indication of at least one non-terrestrial uplink resource usable by the user equipment to transmit a preamble corresponding to a first preamble set or corresponding to a second preamble set, wherein preambles corresponding to the first preamble set or the second preamble set are indicated by the reduced content synchronization signal block (e.g., via information block 620 shown in FIG. 6). The reduced content synchronization signal block may comprise a priority order indication in information block 625 shown in FIG. 6.

At act 1730, a user equipment that may be operating in an idle mode or in an inactive mode and that is capable of communicating with the non-terrestrial radio network node (e.g., the user equipment may be designed or configured to communicate at non-terrestrial frequencies corresponding to the non-terrestrial radio network node and may be referred to as non-terrestrial network capable or NTN-capable) may determine to establish a connection with the non-terrestrial radio network node, for example, to transmit data to the non-terrestrial radio network node, to place a voice call, to send a text message, and the like. At act 1735, the non-terrestrial capable user equipment may receive the reduced content synchronization signal block message transmitted by the non-terrestrial radio network node via one of the idle mode beams determined at act 1720.

At act 1740, the user equipment may determine whether the reduced content synchronization signal block message comprises a priority indication 'TN-NTN', indicative that the user equipment is to attempt to determine master information block information SIB1 information corresponding to the non-terrestrial radio network node (e.g., MIB and SIB1 information corresponding to the non-terrestrial radio network node) from a terrestrial radio network node before attempting to obtain the MIB and SIB1 information from the non-terrestrial radio network note. The MIB and SIB1 may be referred to as 'minimum system information.' If a determination is made at act 1740 that a priority order of TN-NTN is not indicated in the reduced content synchronization signal block message, method 1700 advances to act 1795. At act 1795, the user equipment may transmit to the non-terrestrial radio network node a preamble that the user equipment selects from the group, or set, of second preambles included in, or indicated by, the reduce content synchronization signal block message. A preamble transmitted at act 1795 may be referred to as a second preamble due to being a preamble selected from the group of second preambles. A second preamble, or a preamble selected from the second preamble group/set may be indicative that the user equipment could not establish a connection with a terrestrial radio network node, or if the user equipment was able to establish a connection with a terrestrial radio network node nevertheless could not obtain minimum system information corresponding to the non-terrestrial radio network node from the terrestrial radio network node. At act, 1797 the non-terrestrial radio network node may broadcast a full synchronization signal block information message (e.g., an SSB message that comprises MIB information corresponding to the non-terrestrial radio network node or an SIB1 message that comprises system information block information identified by the MIB information) and the non-terrestrial radio network node and user equipment may establish a connection based on the full synchronization signal block information broadcast by the notarial radio network node at act 1797. Method 1700 advances to act 1799 and ends.

Returning to description of act 1740, if a determination is made by the user equipment that the reduced content synchronization signal block message comprises a TN-NTN priority order indication, method 1700 advances to act 1745. At act 1745, the user equipment may determine whether a signal strength, or other signal parameter value, corresponding to a reference signal transmitted or broadcast by a terrestrial radio network node that can be detected by the user equipment satisfies a configured signal strength or other signal parameter value criterion. If a determination is made at act 1745 that a signal strength/other signal parameter value broadcast by a TN node does not satisfy a configured connection criterion, method 1700 advances to act 1795 and continues as previously described.

Returning to description of act 1745, if a determination is made that a signal strength/other signal parameter value satisfies a configured connection criterion, method 1700 advances to act 1750. At act 1750, the user equipment may transmit, to a terrestrial radio network node that transmitted/broadcast the detected signal corresponding to the signal strength or other single parameter value that was determined to satisfy the connection criterion at act 1745, a reduced capability connection establishment request message. The reduced capability connection establishment request message may comprise, or may be accompanied by, a service cause indication indicative that the reduced capability connection establishment request message is a request for a reduced capability connection that may not facilitate delivery of data traffic and may only facilitate delivery of control channel traffic and that may be requested for the purpose of obtaining minimum system information and other information corresponding to the non-terrestrial radio network node. At act 1755, the terrestrial radio network node may establish a reduced capability connection with the user equipment that transmitted the reduced capability connection establishment request message at act 1750. The terrestrial radio network node may schedule control channel resources corresponding to the reduced capability connection established, or to be established, at act 1750. The terrestrial radio network node may avoid scheduling data channel resources corresponding to the reduced capability connection established, or to be established, at act 1750. At act 1760, the terrestrial radio network node may transmit, via backhaul interface link(s), a minimum system information fetch request to backend network equipment, for example, a component of core network 130, a shared network element/entity 131, or a non-terrestrial network gateway 106 as shown in FIG. 1. At act 1765, responsive to transmitting the minimum system information fetch request, the terrestrial radio network node may receive, via backhaul interface link(s) from backend network equipment, minimum system information corresponding to the non-terrestrial radio network node to which the user equipment determined to attempt to connect at act 1730. At act 1765, responsive to transmitting the minimum system information fetch request, the terrestrial radio network node may receive beam mapping information that comprises indication of one or more not terrestrial beams corresponding to the non-terrestrial network node mapped to at least one terrestrial network node corresponding to the terrestrial radio network node. At act 1770, the terrestrial radio network node may determine a non-terrestrial beam from the beam mapping information received at act 1765 based on a terrestrial beam corresponding to the user equipment or used by the user equipment to transmit the reduce the capability connection establishment request message at act 1750. At act 1775, the terrestrial radio network node may transmit to the user equipment the minimum system information received at act 1765 and beam information determined by the terrestrial radio network node at act 1770. At act 1780, the user equipment may transmit to the non-terrestrial radio network node a preamble selected, by the user equipment, from a first set of preambles indicated by the reduced content synchronization signal block information received at act 1735. The preamble transmitted at act 1780 may be referred to as a first preamble due to the preamble being selected from the first group, or first set, of preambles indicated by the reduced content synchronization signal block information. Receiving, by the non-terrestrial network node from the user equipment, of a first preamble may be indicative that the user equipment is located with respect to a terrestrial network node such that the user equipment is able to establish a connection with a terrestrial network node and is able to receive minimum system information corresponding to the non-terrestrial radio network node from the terrestrial radio network node.

At act 1783, the non-terrestrial radio network node may receive the first preamble transmitted at act 1780 and may determine whether a priority order indicated in the reduced content synchronization signal block information broadcast at act 1725 remains valid. For example, the non-terrestrial radio network node may indicate in the reduced content synchronization signal block information broadcasted act 1725 a priority order TN-NTN. However, after broadcasting the reduced content synchronization signal block information at act 1725, the non-terrestrial radio network node may determine that, or receive information indicative that, the terrestrial radio network node is experiencing, or has experienced, radio channel congestion, interference, power disruption, or other condition that may preclude the user equipment from obtaining from the terrestrial network node minimum system information and beam mapping information corresponding to the non-terrestrial network node. Accordingly, if the non-terrestrial radio network node determines that obtaining, by the user equipment from the terrestrial radio network node, of minimum system information or beam mapping information is unlikely due to radio channel conditions or other channel conditions, the non-terrestrial radio network node may determine, at act 1783, that the TN-NTN priority order is no longer valid. If the non-terrestrial radio network node determines at act 1783 that the TN-NTN priority order is no longer valid, the non-terrestrial radio network node may, at act 1797, broadcast full SSB information, including MIB information, and may establish a connection with the user equipment according to the full SSB information and SIB1 information that may be indicated by the MIB information before method 1700 ends at act 1799.

Returning to description of act 1783, if the non-terrestrial radio network node determines that a TN-NTN priority order remains valid (e.g., an antenna configuration at the non-terrestrial network node has not changed or channel conditions corresponding to the terrestrial radio network node have not substantially changed after the non-terrestrial radio network node broadcast the reduced content synchronization signal block message at act 1725), method 1700 may advance to act 1785. At act 1785, the non-terrestrial radio network node may continue broadcasting the reduced content synchronization signal block message via the beam with respect to which the user equipment receives the reduced content synchronization signal block information message at act 1735. It will be appreciated that the non-terrestrial radio network node may discontinue transmitting reduce content synchronization signal block information if a network energy saving criterion received at act 1710 is no longer satisfied, if a period for implementing broadcasting of reduced content synchronization signal block information has expired, or if more than a configured number of user equipment (e.g., a number/criterion configured via information received at act 1710) attempt to transition from idle mode to connected mode with respect to the non-terrestrial network node during a configured period. At act 1790, the user equipment and non-terrestrial network node may establish a connection according to information transmitted at act 1775, for example minimum system information and refined beam information corresponding to the non-terrestrial radio network node. Method 1700 advances to act 1799 and ends.

Figure 18:
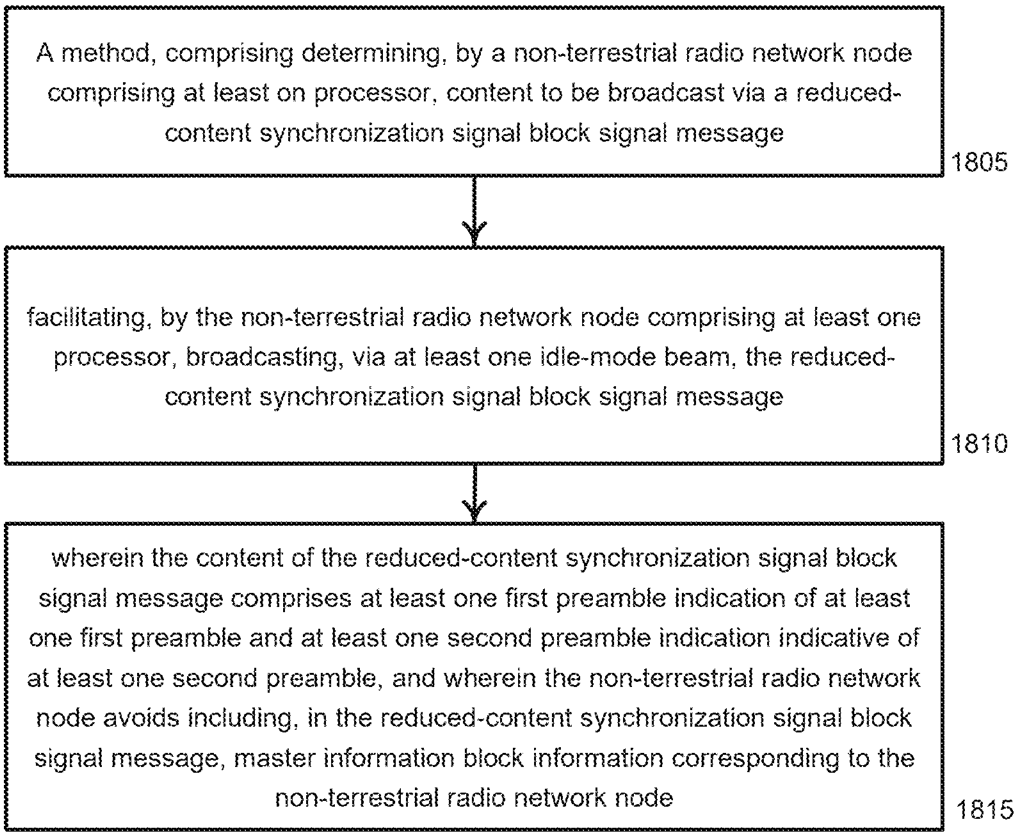
FIG. 18 illustrates a block diagram of an example method in accordance with an embodiment of the subject application.

Turning now to FIG. 18, the figure illustrates an example embodiment method 1800 comprising at block 1805 determining, by a non-terrestrial radio network node comprising at least one processor, content to be broadcast via a reduced-content synchronization signal block signal message; at act 1810 facilitating, by the non-terrestrial radio network node comprising at least one processor, broadcasting, via at least one idle-mode beam, the reduced-content synchronization signal block signal message; and at act 1815 wherein the content of the reduced-content synchronization signal block signal message comprises at least one first preamble indication of at least one first preamble and at least one second preamble indication indicative of at least one second preamble, and wherein the non-terrestrial radio network node avoids including, in the reduced-content synchronization signal block signal message, master information block information corresponding to the non-terrestrial radio network node.

Figure 19:
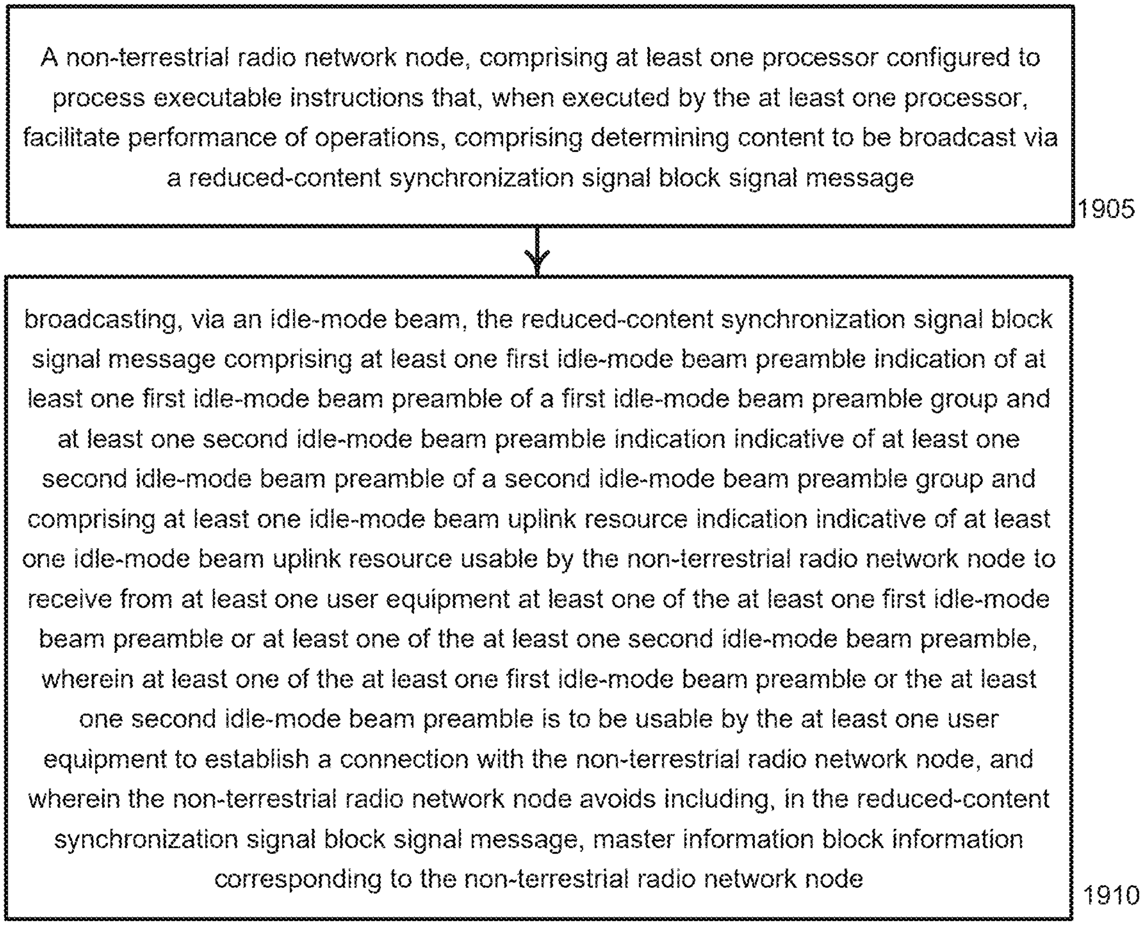
FIG. 19 illustrates a block diagram of an example non-terrestrial radio network node in accordance with an embodiment of the subject application.

Turning now to FIG. 19, the figure illustrates a non-terrestrial radio network node 1900, comprising at block 1905 at least one processor configured to process executable instructions that, when executed by the at least one processor, facilitate performance of operations, comprising determining content to be broadcast via a reduced-content synchronization signal block signal message; and at act 1910 broadcasting, via an idle-mode beam, the reduced-content synchronization signal block signal message comprising at least one first idle-mode beam preamble indication of at least one first idle-mode beam preamble of a first idle-mode beam preamble group and at least one second idle-mode beam preamble indication indicative of at least one second idle-mode beam preamble of a second idle-mode beam preamble group and comprising at least one idle-mode beam uplink resource indication indicative of at least one idle-mode beam uplink resource usable by the non-terrestrial radio network node to receive from at least one user equipment at least one of the at least one first idle-mode beam preamble or at least one of the at least one second idle-mode beam preamble, wherein at least one of the at least one first idle-mode beam preamble or the at least one second idle-mode beam preamble is to be usable by the at least one user equipment to establish a connection with the non-terrestrial radio network node, and wherein the non-terrestrial radio network node avoids including, in the reduced-content synchronization signal block signal message, master information block information corresponding to the non-terrestrial radio network node.

Figure 20:
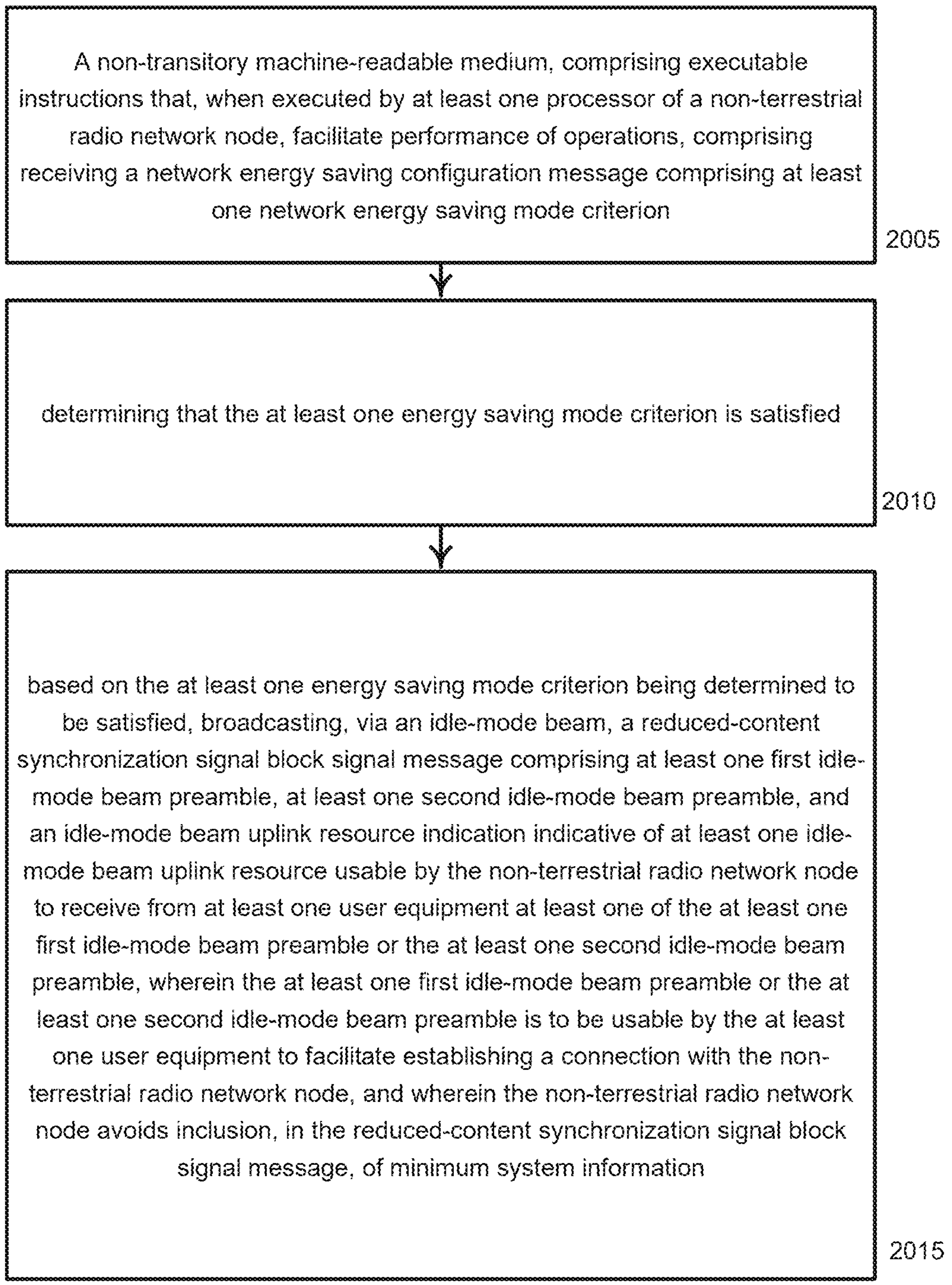
FIG. 20 illustrates a block diagram of an example non-transitory machine-readable medium in accordance with an embodiment of the subject application.

Turning now to FIG. 20, the figure illustrates a non-transitory machine-readable medium 2000 comprising at block 2005 executable instructions that, when executed by at least one processor of a non-terrestrial radio network node, facilitate performance of operations, comprising receiving a network energy saving configuration message comprising at least one network energy saving mode criterion; at block 2010 determining that the at least one energy saving mode criterion is satisfied; and at block 2015 based on the at least one energy saving mode criterion being determined to be satisfied, broadcasting, via an idle-mode beam, a reduced-content synchronization signal block signal message comprising at least one first idle-mode beam preamble, at least one second idle-mode beam preamble, and an idle-mode beam uplink resource indication indicative of at least one idle-mode beam uplink resource usable by the non-terrestrial radio network node to receive from at least one user equipment at least one of the at least one first idle-mode beam preamble or the at least one second idle-mode beam preamble, wherein the at least one first idle-mode beam preamble or the at least one second idle-mode beam preamble is to be usable by the at least one user equipment to facilitate establishing a connection with the non-terrestrial radio network node, and wherein the non-terrestrial radio network node avoids inclusion, in the reduced-content synchronization signal block signal message, of minimum system information.

Figure 21:
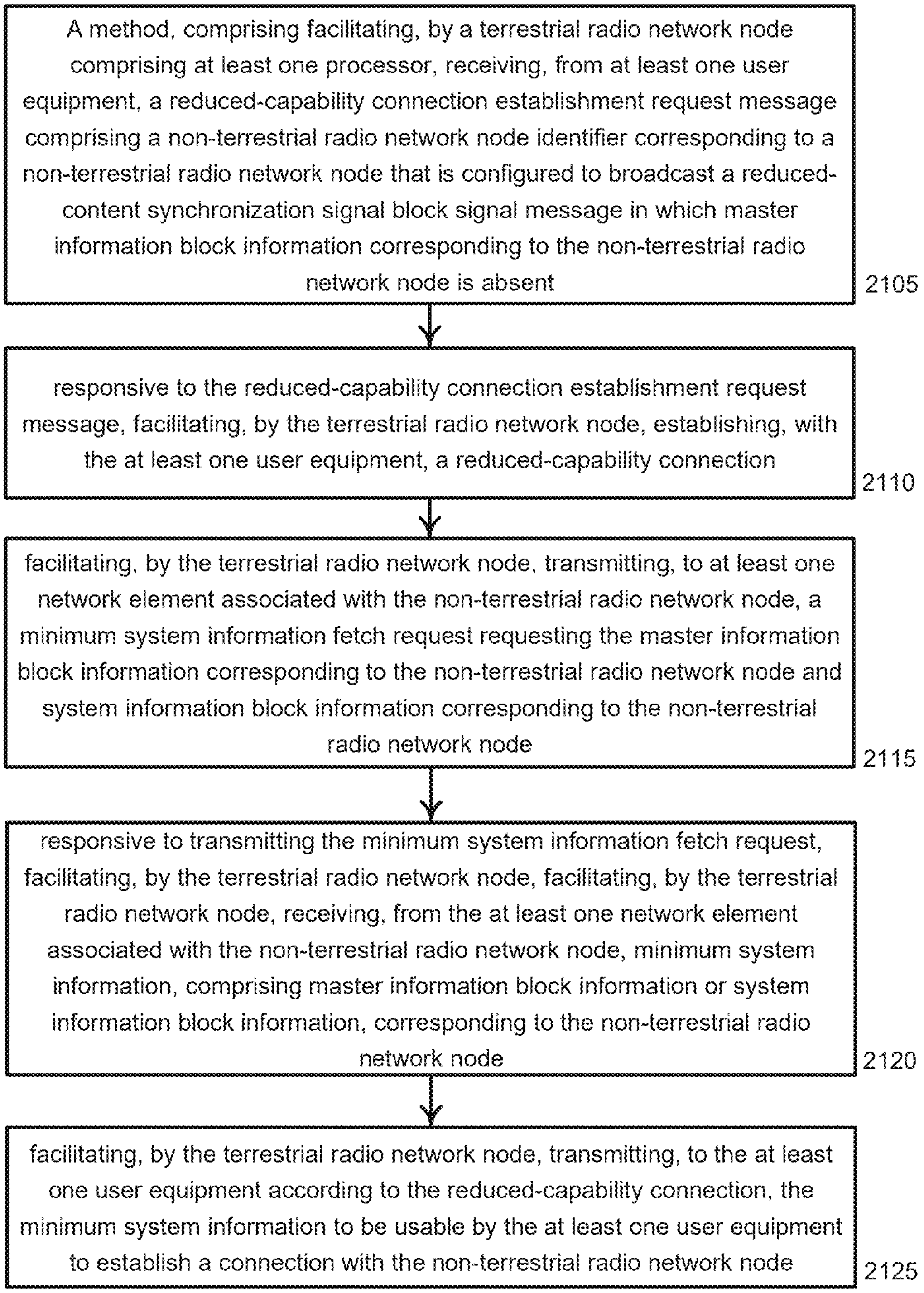
FIG. 21 illustrates a block diagram of an example method in accordance with an embodiment of the subject application.

Turning now to FIG. 21, the figure illustrates an example embodiment method 2100 comprising, at block 2105, facilitating, by a terrestrial radio network node comprising at least one processor, receiving, from at least one user equipment, a reduced-capability connection establishment request message comprising a non-terrestrial radio network node identifier corresponding to a non-terrestrial radio network node that is configured to broadcast a reduced-content synchronization signal block signal message in which master information block information corresponding to the non-terrestrial radio network node is absent; at block 2110 responsive to the reduced-capability connection establishment request message, facilitating, by the terrestrial radio network node, establishing, with the at least one user equipment, a reduced-capability connection; at block 2115 facilitating, by the terrestrial radio network node, transmitting, to at least one network element associated with the non-terrestrial radio network node, a minimum system information fetch request requesting the master information block information corresponding to the non-terrestrial radio network node and system information block information corresponding to the non-terrestrial radio network node; at block 2120 responsive to transmitting the minimum system information fetch request, facilitating, by the terrestrial radio network node, facilitating, by the terrestrial radio network node, receiving, from the at least one network element associated with the non-terrestrial radio network node, minimum system information, comprising master information block information or system information block information, corresponding to the non-terrestrial radio network node; and at block 2125 facilitating, by the terrestrial radio network node, transmitting, to the at least one user equipment according to the reduced-capability connection, the minimum system information to be usable by the at least one user equipment to establish a connection with the non-terrestrial radio network node.

Figure 22:
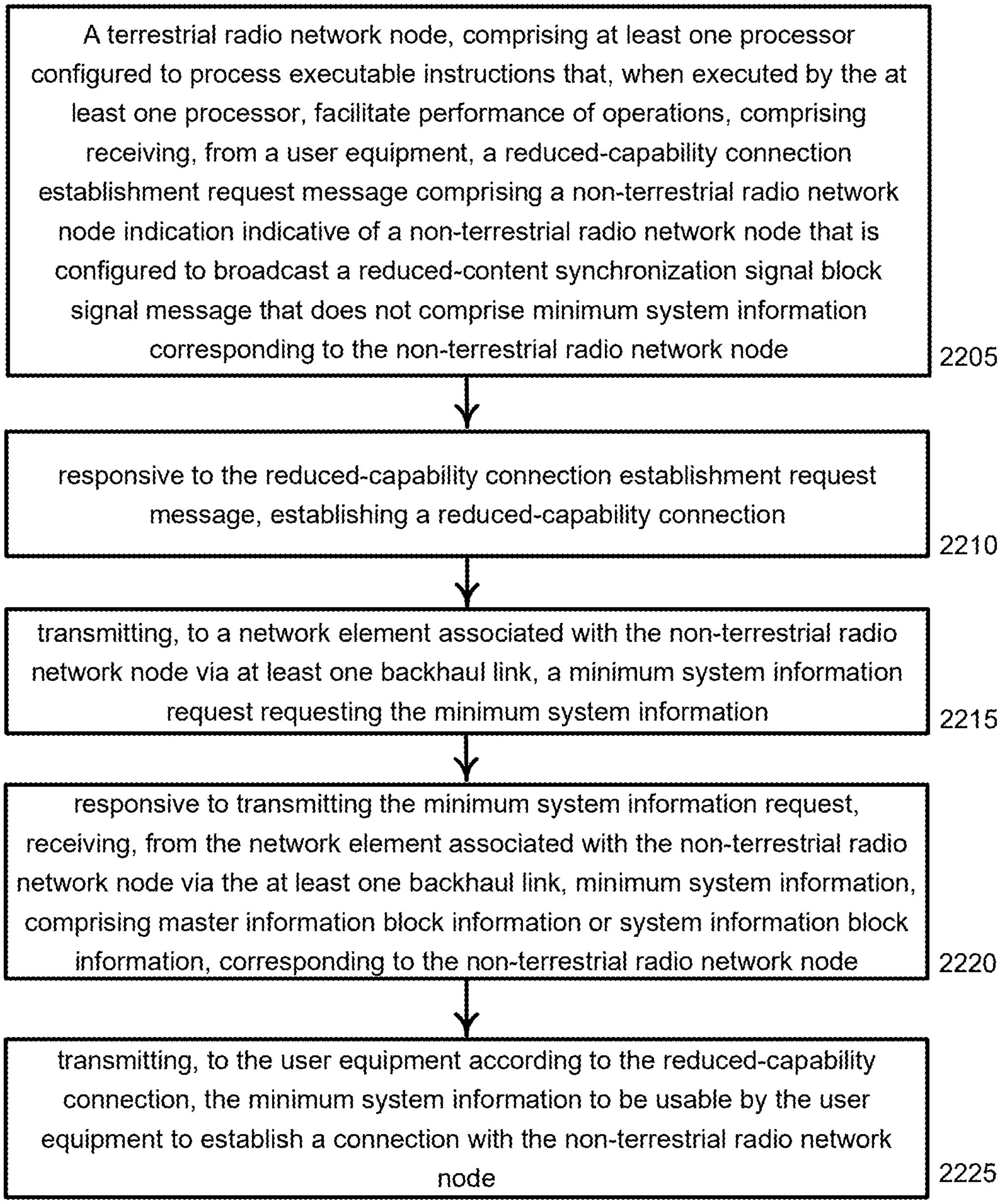
FIG. 22 illustrates a block diagram of an example terrestrial radio network node in accordance with an embodiment of the subject application.

Turning now to FIG. 22, the figure illustrates an example terrestrial radio network node 2200, comprising at block 2205 at least one processor configured to process executable instructions that, when executed by the at least one processor, facilitate performance of operations comprising receiving, from a user equipment, a reduced-capability connection establishment request message comprising a non-terrestrial radio network node indication indicative of a non-terrestrial radio network node that is configured to broadcast a reduced-content synchronization signal block signal message that does not comprise minimum system information corresponding to the non-terrestrial radio network node; at block 2210 responsive to the reduced-capability connection establishment request message, establishing a reduced-capability connection; at block 2215 transmitting, to a network element associated with the non-terrestrial radio network node via at least one backhaul link, a minimum system information request requesting the minimum system information; at block 2220 responsive to transmitting the minimum system information request, receiving, from the network element associated with the non-terrestrial radio network node via the at least one backhaul link, minimum system information, comprising master information block information or system information block information, corresponding to the non-terrestrial radio network node; and at block 2225 transmitting, to the user equipment according to the reduced-capability connection, the minimum system information to be usable by the user equipment to establish a connection with the non-terrestrial radio network node.

Figure 23:
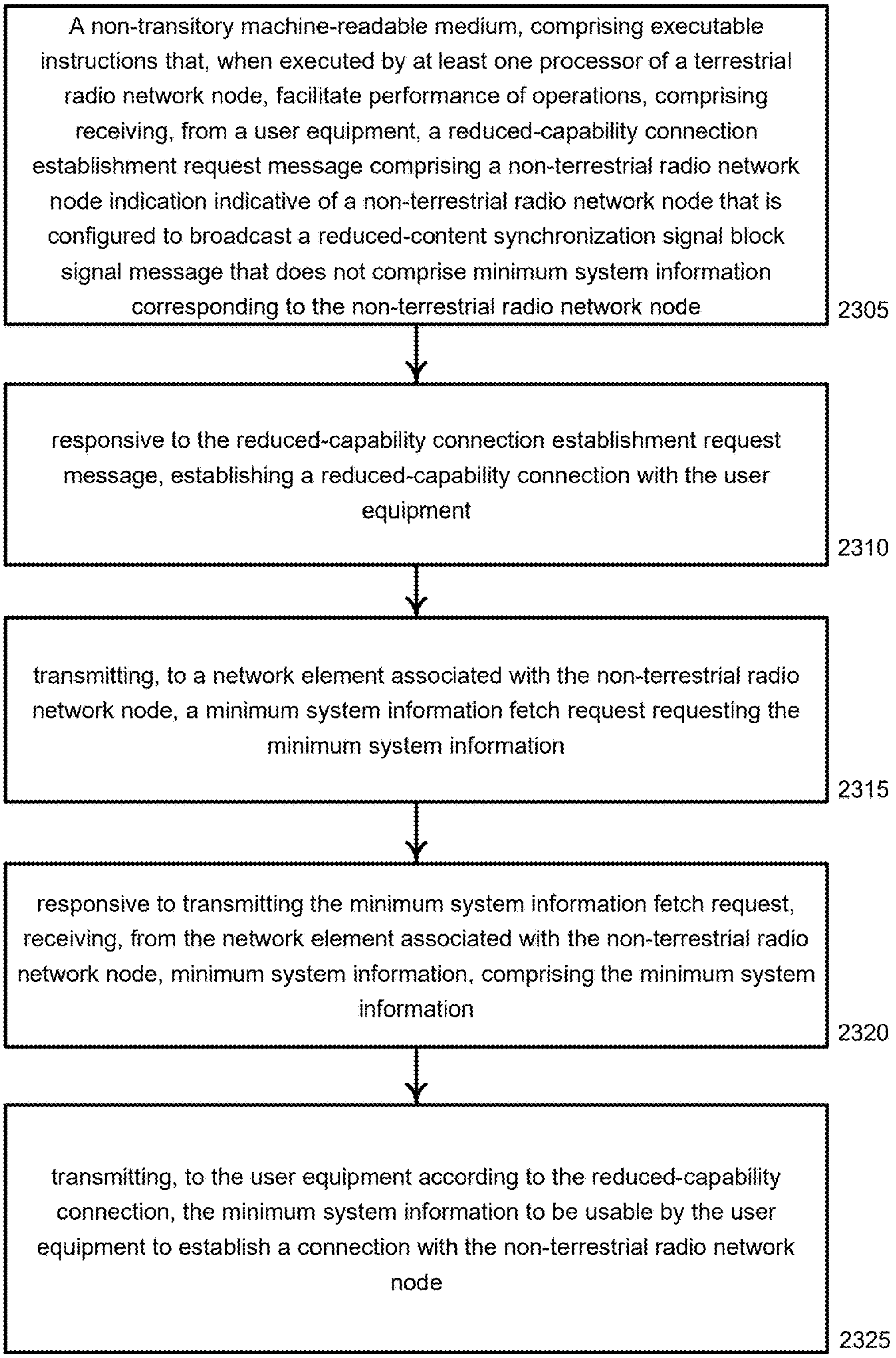
FIG. 23 illustrates a block diagram of an example non-transitory machine-readable medium in accordance with an embodiment of the subject application.

Turning now to FIG. 23, the figure illustrates a non-transitory machine-readable medium 2300 comprising at block 2305 executable instructions that, when executed by at least one processor of a terrestrial radio network node, facilitate performance of operations, comprising receiving, from a user equipment, a reduced-capability connection establishment request message comprising a non-terrestrial radio network node indication indicative of a non-terrestrial radio network node that is configured to broadcast a reduced-content synchronization signal block signal message that does not comprise minimum system information corresponding to the non-terrestrial radio network node; at block 2310 responsive to the reduced-capability connection establishment request message, establishing a reduced-capability connection with the user equipment; at block 2315 transmitting, to a network element associated with the non-terrestrial radio network node, a minimum system information fetch request requesting the minimum system information; at block 2320 responsive to transmitting the minimum system information fetch request, receiving, from the network element associated with the non-terrestrial radio network node, minimum system information, comprising the minimum system information; and at block 2325 transmitting, to the user equipment according to the reduced-capability connection, the minimum system information to be usable by the user equipment to establish a connection with the non-terrestrial radio network node.

Figure 24:
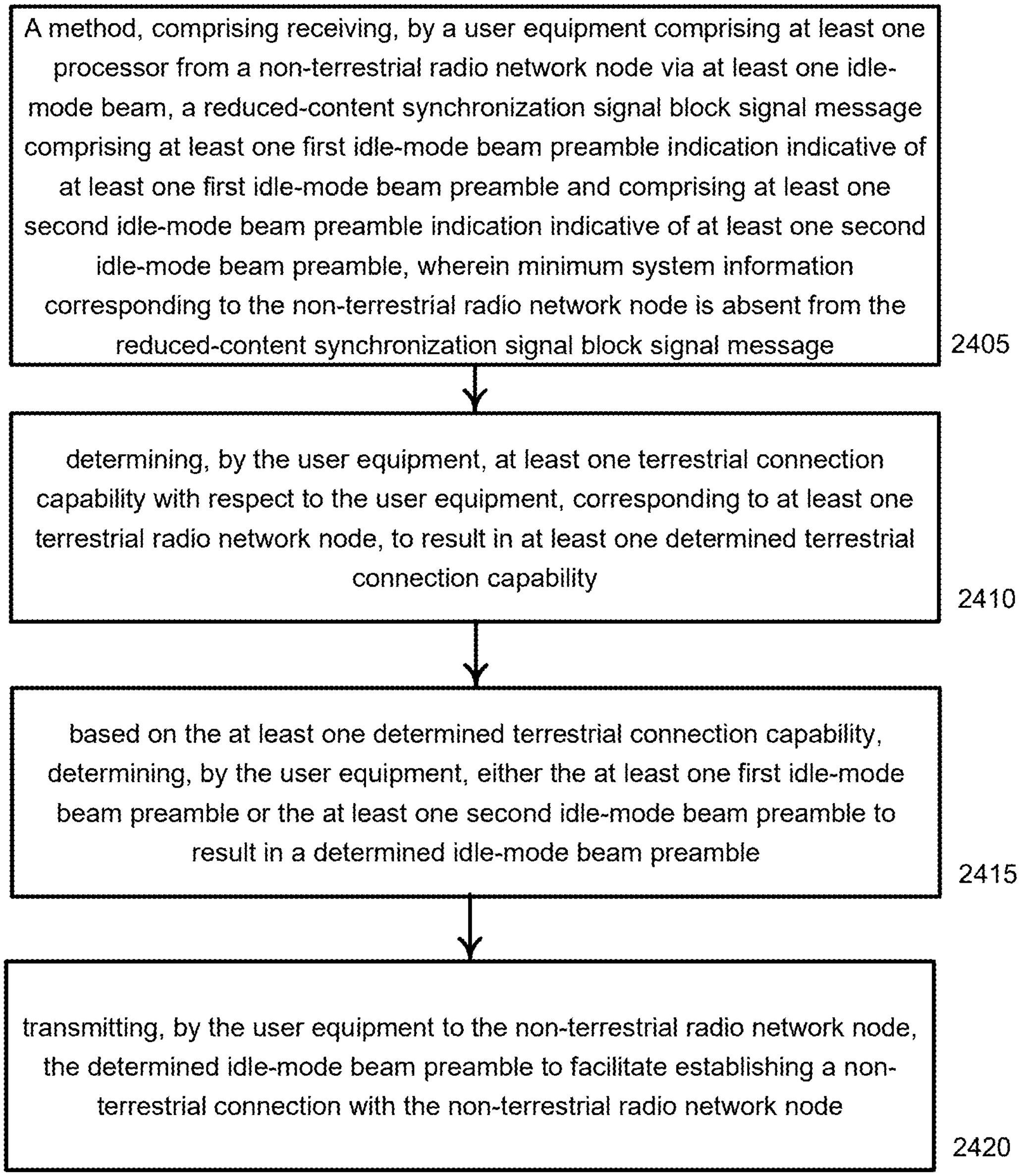
FIG. 24 illustrates a block diagram of an example method in accordance with an embodiment of the subject application.

Turning now to FIG. 24, the figure illustrates an example embodiment method 2400 comprising, at block 2405, receiving, by a user equipment comprising at least one processor from a non-terrestrial radio network node via at least one idle-mode beam, a reduced-content synchronization signal block signal message comprising at least one first idle-mode beam preamble indication indicative of at least one first idle-mode beam preamble and comprising at least one second idle-mode beam preamble indication indicative of at least one second idle-mode beam preamble, wherein minimum system information corresponding to the non-terrestrial radio network node is absent from the reduced-content synchronization signal block signal message; at block 2410 determining, by the user equipment, at least one terrestrial connection capability with respect to the user equipment, corresponding to at least one terrestrial radio network node, to result in at least one determined terrestrial connection capability; at block 2415 based on the at least one determined terrestrial connection capability, determining, by the user equipment, either the at least one first idle-mode beam preamble or the at least one second idle-mode beam preamble to result in a determined idle-mode beam preamble; and at block 2420 transmitting, by the user equipment to the non-terrestrial radio network node, the determined idle-mode beam preamble to facilitate establishing a non-terrestrial connection with the non-terrestrial radio network node.

Figure 25:
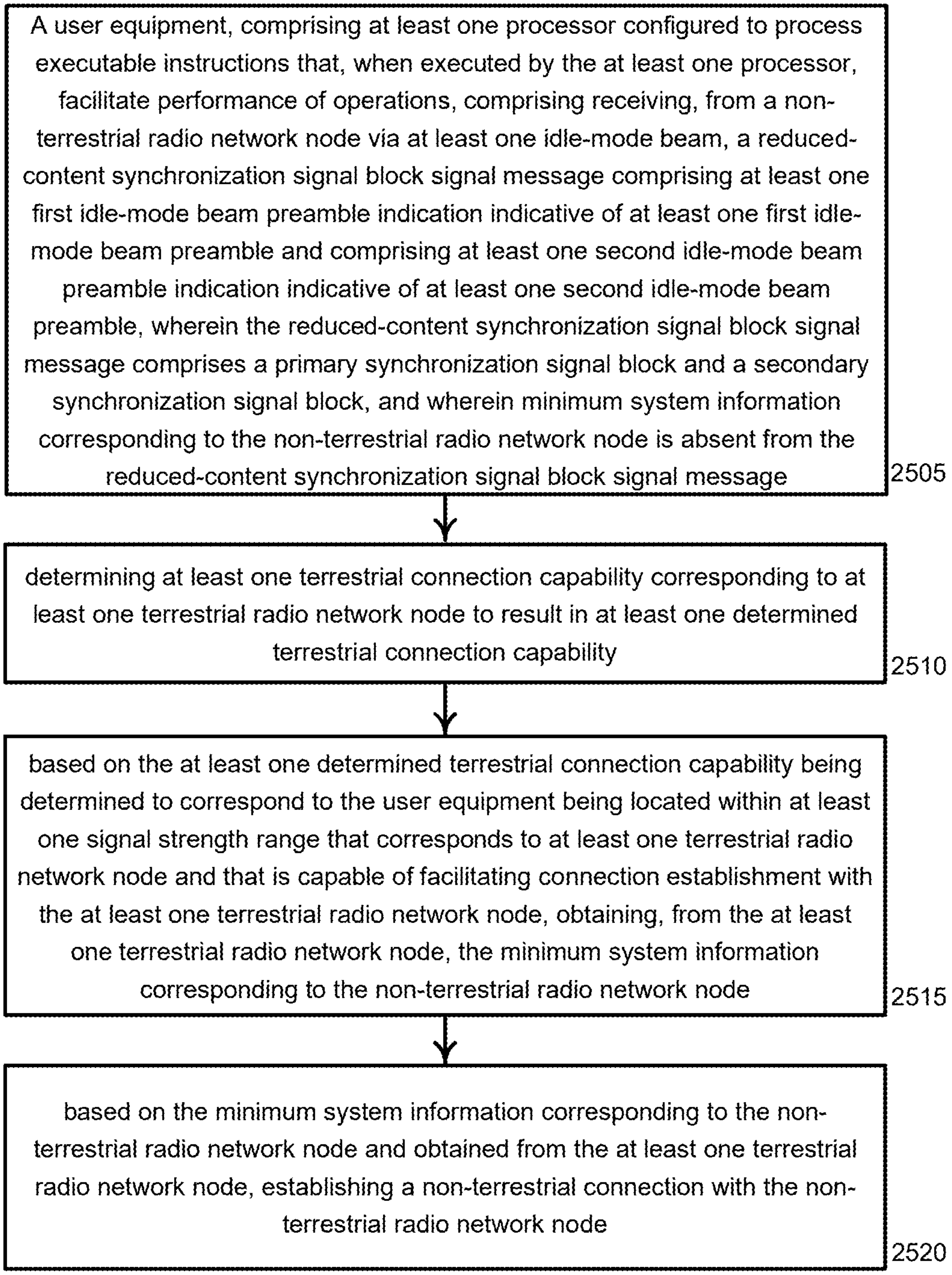
FIG. 25 illustrates a block diagram of an example user equipment in accordance with an embodiment of the subject application.

Turning now to FIG. 25, the figure illustrates an example user equipment 2500, comprising at block 2505 at least one processor configured to process executable instructions that, when executed by the at least one processor, facilitate performance of operations comprising receiving, from a non-terrestrial radio network node via at least one idle-mode beam, a reduced-content synchronization signal block signal message comprising at least one first idle-mode beam preamble indication indicative of at least one first idle-mode beam preamble and comprising at least one second idle-mode beam preamble indication indicative of at least one second idle-mode beam preamble, wherein the reduced-content synchronization signal block signal message comprises a primary synchronization signal block and a secondary synchronization signal block, and wherein minimum system information corresponding to the non-terrestrial radio network node is absent from the reduced-content synchronization signal block signal message; at block 2510 determining at least one terrestrial connection capability corresponding to at least one terrestrial radio network node to result in at least one determined terrestrial connection capability; at block 2515 based on the at least one determined terrestrial connection capability being determined to correspond to the user equipment being located within at least one signal strength range that corresponds to at least one terrestrial radio network node and that is capable of facilitating connection establishment with the at least one terrestrial radio network node, obtaining, from the at least one terrestrial radio network node, the minimum system information corresponding to the non-terrestrial radio network node; and at block 2520 based on the minimum system information corresponding to the non-terrestrial radio network node and obtained from the at least one terrestrial radio network node, establishing a non-terrestrial connection with the non-terrestrial radio network node.

Figure 26:
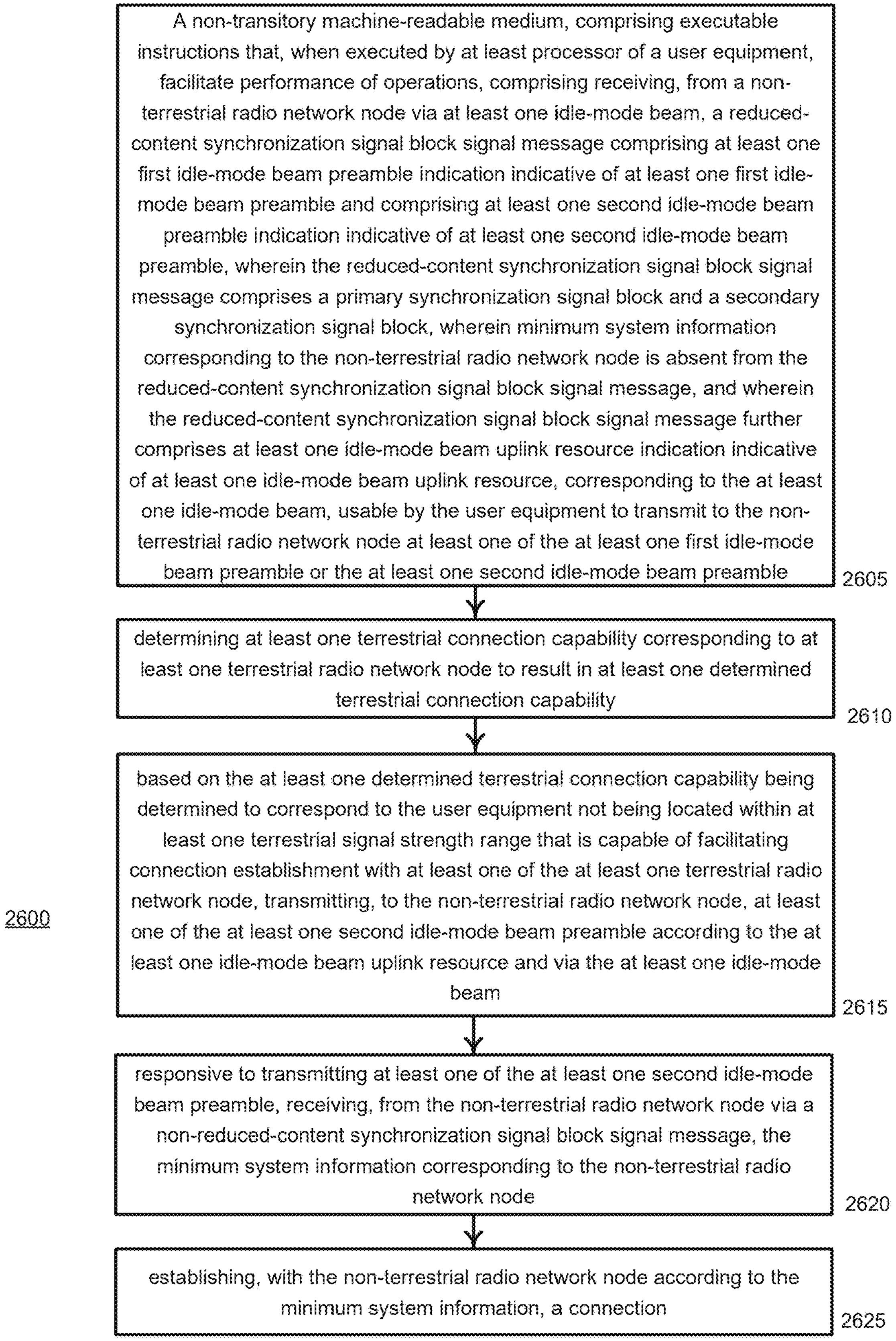
FIG. 26 illustrates a block diagram of an example non-transitory machine-readable medium in accordance with an embodiment of the subject application.

Turning now to FIG. 26, the figure illustrates a non-transitory machine-readable medium 2600 comprising at block 2605 executable instructions that, when executed by at least one processor of a user equipment, facilitate performance of operations, comprising receiving, from a non-terrestrial radio network node via at least one idle-mode beam, a reduced-content synchronization signal block signal message comprising at least one first idle-mode beam preamble indication indicative of at least one first idle-mode beam preamble and comprising at least one second idle-mode beam preamble indication indicative of at least one second idle-mode beam preamble, wherein the reduced-content synchronization signal block signal message comprises a primary synchronization signal block and a secondary synchronization signal block, wherein minimum system information corresponding to the non-terrestrial radio network node is absent from the reduced-content synchronization signal block signal message, and wherein the reduced-content synchronization signal block signal message further comprises at least one idle-mode beam uplink resource indication indicative of at least one idle-mode beam uplink resource, corresponding to the at least one idle-mode beam, usable by the user equipment to transmit to the non-terrestrial radio network node at least one of the at least one first idle-mode beam preamble or the at least one second idle-mode beam preamble; at block 2610 determining at least one terrestrial connection capability corresponding to at least one terrestrial radio network node to result in at least one determined terrestrial connection capability; at block based on the at least one determined terrestrial connection capability being determined to correspond to the user equipment not being located within at least one terrestrial signal strength range that is capable of facilitating connection establishment with at least one of the at least one terrestrial radio network node, transmitting, to the non-terrestrial radio network node, at least one of the at least one second idle-mode beam preamble according to the at least one idle-mode beam uplink resource and via the at least one idle-mode beam; at block 2615, based on the at least one determined terrestrial connection capability being determined to correspond to the user equipment not being located within at least one terrestrial signal strength range that is capable of facilitating connection establishment with at least one of the at least one terrestrial radio network node, transmitting, to the non-terrestrial radio network node, at least one of the at least one second idle-mode beam preamble according to the at least one idle-mode beam uplink resource and via the at least one idle-mode beam; at block 2620, responsive to transmitting at least one of the at least one second idle-mode beam preamble, receiving, from the non-terrestrial radio network node via a non-reduced-content synchronization signal block signal message, the minimum system information corresponding to the non-terrestrial radio network node; and at block 2625 establishing, with the non-terrestrial radio network node according to the minimum system information, a connection.

Figure 27:
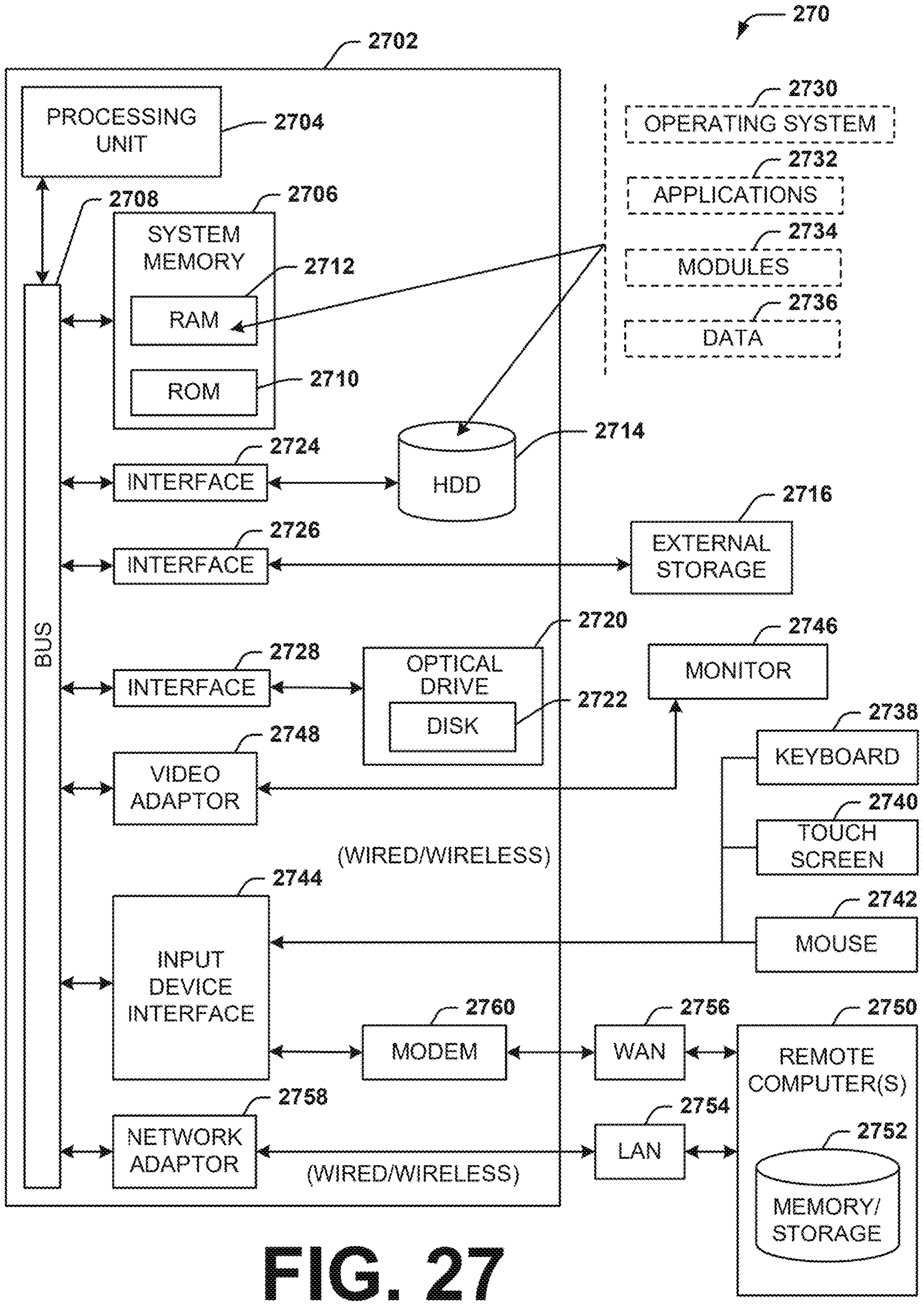
FIG. 27 illustrates an example computer environment.

In order to provide additional context for various embodiments described herein, FIG. 27 and the following discussion are intended to provide a brief, general description of a suitable computing environment 2700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 27, the example environment 2700 for implementing various embodiments of the aspects described herein includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors and may include a cache memory. Dual microprocessors and other multi-processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes ROM 2710 and RAM 2712. A basic input/output system (BIOS) can be stored in a non-volatile memory such as ROM, erasable programmable read only memory (EPROM), EEPROM, which BIOS contains the basic routines that help to transfer information between elements within the computer 2702, such as during startup. The RAM 2712 can also include a high-speed RAM such as static RAM for caching data.

Computer 2702 further includes an internal hard disk drive (HDD) 2714 (e.g., EIDE, SATA), one or more external storage devices 2716 (e.g., a magnetic floppy disk drive (FDD) 2716, a memory stick or flash drive reader, a memory card reader, etc.) and an optical disk drive 2720 (e.g., which can read or write from a CD-ROM disc, a DVD, a BD, etc.). While the internal HDD 2714 is illustrated as located within the computer 2702, the internal HDD 2714 can also be configured for external use in a suitable chassis (not shown). Additionally, while not shown in environment 2700, a solid-state drive (SSD) could be used in addition to, or in place of, an HDD 2714. The HDD 2714, external storage device(s) 2716 and optical disk drive 2720 can be connected to the system bus 2708 by an HDD interface 2724, an external storage interface 2726 and an optical drive interface 2728, respectively. The interface 2724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. The systems and methods described herein can be implemented utilizing various commercially available operating systems or combinations of operating systems.

Computer 2702 can optionally comprise emulation technologies. For example, a hypervisor (not shown) or other intermediary can emulate a hardware environment for operating system 2730, and the emulated hardware can optionally be different from the hardware illustrated in FIG. 27. In such an embodiment, operating system 2730 can comprise one virtual machine (VM) of multiple VMs hosted at computer 2702. Furthermore, operating system 2730 can provide runtime environments, such as the Java runtime environment or the .NET framework, for applications 2732. Runtime environments are consistent execution environments that allow applications 2732 to run on any operating system that includes the runtime environment. Similarly, operating system 2730 can support containers, and applications 2732 can be in the form of containers, which are lightweight, standalone, executable packages of software that include, e.g., code, runtime, system tools, system libraries and settings for an application.

Further, computer 2702 can comprise a security module, such as a trusted processing module (TPM). For instance, with a TPM, boot components hash next in time boot components, and wait for a match of results to secured values, before loading a next boot component. This process can take place at any layer in the code execution stack of computer 2702, e.g., applied at the application execution level or at the operating system (OS) kernel level, thereby enabling security at any level of code execution.

A user can enter commands and information into the computer 2702 through one or more wired/wireless input devices, e.g., a keyboard 2738, a touch screen 2740, and a pointing device, such as a mouse 2742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2704 through an input device interface 2744 that can be coupled to the system bus 2708, but can be connected by other interfaces, such as a parallel port, an IEEE 1394 serial port, a game port, a USB port, an IR interface, a BLUETOOTH® interface, etc.

A monitor 2746 or other type of display device can be also connected to the system bus 2708 via an interface, such as a video adapter 2748. In addition to the monitor 2746, a computer typically includes other peripheral output devices (not shown), such as speakers, printers, etc.

The computer 2702 can operate in a networked environment using logical connections via wired and/or wireless communications to one or more remote computers, such as a remote computer(s) 2750. The remote computer(s) 2750 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2752 is illustrated. The logical connections depicted include wired/wireless connectivity to a local area network (LAN) 2754 and/or larger networks, e.g., a wide area network (WAN) 2756. Such LAN and WAN networking environments are commonplace in offices and companies, and facilitate enterprise-wide computer networks, such as intranets, all of which can connect to a global communications network, e.g., the internet.

When used in a LAN networking environment, the computer 2702 can be connected to the local network 2754 through a wired and/or wireless communication network interface or adapter 2758. The adapter 2758 can facilitate wired or wireless communication to the LAN 2754, which can also include a wireless access point (AP) disposed thereon for communicating with the adapter 2758 in a wireless mode.

When used in a WAN networking environment, the computer 2702 can include a modem 2760 or can be connected to a communications server on the WAN 2756 via other means for establishing communications over the WAN 2756, such as by way of the internet. The modem 2760, which can be internal or external and a wired or wireless device, can be connected to the system bus 2708 via the input device interface 2744. In a networked environment, program modules depicted relative to the computer 2702 or portions thereof, can be stored in the remote memory/storage device 2752. It will be appreciated that the network connections shown are example and other means of establishing a communications link between the computers can be used.

When used in either a LAN or WAN networking environment, the computer 2702 can access cloud storage systems or other network-based storage systems in addition to, or in place of, external storage devices 2716 as described above. Generally, a connection between the computer 2702 and a cloud storage system can be established over a LAN 2754 or WAN 2756 e.g., by the adapter 2758 or modem 2760, respectively. Upon connecting the computer 2702 to an associated cloud storage system, the external storage interface 2726 can, with the aid of the adapter 2758 and/or modem 2760, manage storage provided by the cloud storage system as it would other types of external storage. For instance, the external storage interface 2726 can be configured to provide access to cloud storage sources as if those sources were physically connected to the computer 2702.

The computer 2702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 28:
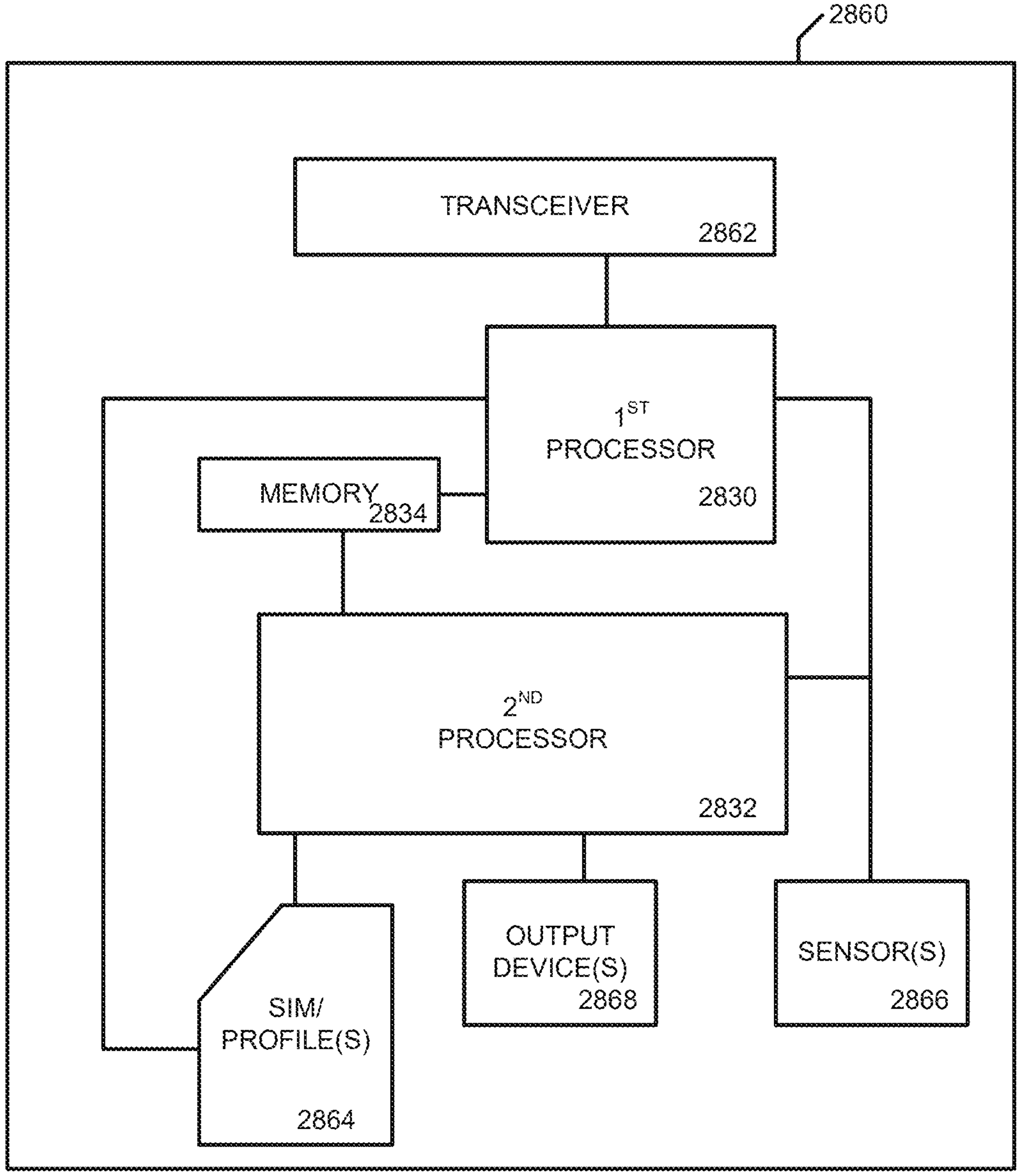
FIG. 28 illustrates a block diagram of an example wireless UE.

Turning to FIG. 28, the figure illustrates a block diagram of an example UE 2860. UE 2860 may comprise a smart phone, a wireless tablet, a laptop computer with wireless capability, a wearable device, a machine device that may facilitate vehicle telematics, a tracking device, remote sensing devices, and the like. UE 2860 comprises a first processor 2830, a second processor 2832, and a shared memory 2834. UE 2860 includes radio front end circuitry 2862, which may be referred to herein as a transceiver, but is understood to typically include transceiver circuitry, separate filters, and separate antennas for facilitating transmission and receiving of signals over a wireless link, such as one or more wireless links 128, 135, and 137 shown in FIG. 1. Furthermore, transceiver 2862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 28, UE 2860 may also include a SIM 2864, or a SIM profile, which may comprise information stored in a memory (memory 2834 or a separate memory portion), for facilitating wireless communication with RAN 105 or core network 130 shown in FIG. 1. FIG. 28 shows SIM 2864 as a single component in the shape of a conventional SIM card, but it will be appreciated that SIM 2864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 2864 and another device, which may be a component of RAN 105 or core network 130 shown in FIG. 1). A SIM profile 2864 may also comprise identifying information that is unique to the SIM, or SIM profile, such as, for example, an International Mobile Subscriber Identity ("IMSI") or information that may make up an IMSI.

SIM 2864 is shown coupled to both the first processor portion 2830 and the second processor portion 2832. Such an implementation may provide an advantage that first processor portion 2830 may not need to request or receive information or data from SIM 2864 that second processor 2832 may request, thus eliminating the use of the first processor acting as a 'go-between' when the second processor uses information from the SIM in performing its functions and in executing applications. First processor 2830, which may be a modem processor or a baseband processor, is shown smaller than processor 2832, which may be a more sophisticated application processor, to visually indicate the relative levels of sophistication (i.e., processing capability and performance) and corresponding relative levels of operating power consumption levels between the two processor portions. Keeping the second processor portion 2832 asleep/inactive/in a low power state when UE 2860 does not need it for executing applications and processing data related to an application provides an advantage of reducing power consumption when the UE only needs to use the first processor portion 2830 while in listening mode for monitoring routine configured bearer management and mobility management/maintenance procedures, or for monitoring search spaces that the UE has been configured to monitor while the second processor portion remains inactive/asleep.

UE 2860 may also include sensors 2866, such as, for example, temperature sensors, accelerometers, gyroscopes, barometers, moisture sensors, and the like that may provide signals to the first processor 2830 or second processor 2832. Output devices 2868 may comprise, for example, one or more visual displays (e.g., computer monitors, VR appliances, and the like), acoustic transducers, such as speakers or microphones, vibration components, and the like. Output devices 2868 may comprise software that interfaces with output devices, for example, visual displays, speakers, microphones, touch sensation devices, smell or taste devices, and the like, that are external to UE 2860.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| UE | User equipment |
| WTRU | Wireless transmit receive unit |
| CBR | Channel busy ratio |
| SCI | Sidelink control information |
| QoS | Quality of service |
| PER | Packet error rate |
| PDB | Packet delay budget |
| E2E | End to end |
| NES | Network energy saving |
| QCI | Quality class indication |
| RSRP | Reference signal received power |
| PCI | Primary cell ID |
| CSI-RS | Channel state information reference signals |
| PTRS | Phase tracking reference signals |
| DTX | Discontinuous transmission or discontinuous transmit |
| DRX | Discontinuous reception or discontinuous receive |
| CG | Configured grant |
| ULP | Uplink power |
| FBS | Fake base station |
| NTN | Non-terrestrial network |
| gRAN | Ground radio access network |
| RAN | Radio access network |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a non-terrestrial radio network node comprising at least one processor, content to be broadcast via a reduced-content synchronization signal block signal message; and facilitating, by the non-terrestrial radio network node comprising at least one processor, broadcasting, via at least one idle-mode beam, the reduced-content synchronization signal block signal message, wherein the content of the reduced-content synchronization signal block signal message comprises at least one first preamble indication of at least one first preamble and at least one second preamble indication indicative of at least one second preamble, and wherein the non-terrestrial radio network node avoids including, in the reduced-content synchronization signal block signal message, master information block information corresponding to the non-terrestrial radio network node.

2. The method of claim 1, wherein the at least one first preamble is usable by at least one user equipment to request connection establishment with respect to the non-terrestrial radio network node according to system information block information corresponding to the non-terrestrial radio network node indicated by the master information block information.

3. The method of claim 2, wherein the reduced-content synchronization signal block signal message further comprises at least one idle-mode uplink resource indication indicative of at least one idle-mode uplink resource usable to receive, by the non-terrestrial radio network node from the at least one user equipment, at least one of the at least one first preamble or the at least one second preamble further comprising:

facilitating, by the non-terrestrial radio network node, receiving, from at least one of the at least one user equipment via the at least one idle-mode uplink resource, at least one of the at least one first preamble; and responsive to the at least one of the at least one first preamble, facilitating, by the non-terrestrial radio network node, establishment of a non-terrestrial connection with the at least one of the at least one user equipment.

4. The method of claim 3, further comprising:

facilitating, by the non-terrestrial radio network node, receiving, from the at least one of the at least one user equipment, a terrestrial node identifier associated with a terrestrial radio network node from which the at least one of the at least one user equipment obtained the system information block information corresponding to the non-terrestrial radio network node; and determining, by the non-terrestrial radio network node, a refined non-terrestrial beam, corresponding to the non-terrestrial radio network node, that has a geographic signal coverage area that overlaps the terrestrial radio network node, wherein the facilitating of the establishment of the non-terrestrial connection with the at least one of the at least one user equipment comprises facilitating delivery of at least one connection setup message signal via the refined non-terrestrial beam.

5. The method of claim 2, wherein the reduced-content synchronization signal block signal message further comprises a synchronization signal block detection priority indication indicative of a detection order according to which the at least one user equipment is to attempt to obtain, from the non-terrestrial radio network node or a terrestrial radio network node, the master information block information or the system information block information, wherein the synchronization signal block detection priority indication is indicative that the at least one user equipment is to attempt to obtain the master information block information and the system information block information from the terrestrial radio network node before the non-terrestrial radio network node, wherein the broadcasting of the reduced-content synchronization signal block signal message is conducted via the at least one idle-mode beam corresponding to at least one idle-mode geographic coverage area, wherein the facilitating of the establishing of the non-terrestrial connection with the at least one of the at least one user equipment is conducted via the at least one idle-mode beam, and wherein the method further comprises:

facilitating, by the non-terrestrial radio network node, receiving, from the at least one user equipment, at least one of the at least one first preamble; and responsive to receiving the at least one first preamble and based on the synchronization signal block detection priority indication being indicative that the at least one user equipment is to attempt to obtain the master information block information and the system information block information from the terrestrial radio network node before the non-terrestrial radio network node, facilitating, by the non-terrestrial radio network node, continuing the broadcasting of the reduced-content synchronization signal block signal message via the at least one idle-mode beam corresponding to the at least one idle-mode geographic coverage area.

6. The method of claim 2, wherein the reduced-content synchronization signal block signal message further comprises a synchronization signal block detection priority indication indicative of a detection order according to which the at least one user equipment is to attempt to obtain, from the non-terrestrial radio network node or a terrestrial radio network node, the master information block information corresponding to the non-terrestrial radio network node or the system information block information corresponding to the non-terrestrial radio network node, wherein the synchronization signal block detection priority indication is indicative that the at least one user equipment is to attempt to obtain the master information block information and the system information block information from the non-terrestrial radio network node before the terrestrial radio network node, and wherein the method further comprises:

facilitating, by the non-terrestrial radio network node, receiving, from the at least one user equipment, at least one of the at least one first preamble; and responsive to receiving the at least one first preamble and based on the synchronization signal block detection priority indication being indicative that the at least one user equipment is to attempt to obtain the master information block information and the system information block information from the non-terrestrial radio network node before the terrestrial radio network node, facilitating, by the non-terrestrial radio network node, delivering, to the at least one user equipment, the master information block information and the system information block information.

7. The method of claim 1, wherein the reduced-content synchronization signal block signal message further comprises at least one non-terrestrial idle-mode uplink resource usable by at least one user equipment to transmit the at least one second preamble.

8. The method of claim 7, wherein the at least one second preamble is usable by the at least one user equipment to request, from the non-terrestrial radio network node, the master information block information to facilitate the at least one of the at least one user equipment transmitting a connection establishment request to the non-terrestrial radio network node.

9. The method of claim 8, further comprising:

facilitating, by the non-terrestrial radio network node, receiving, from the at least one user equipment according to the at least one non-terrestrial idle-mode uplink resource, at least one of the at least one second preamble;

responsive to receiving the at least one of the at least one second preamble via the at least one non-terrestrial idle-mode uplink resource, facilitating, by the non-terrestrial radio network node, transmitting, to the at least one user equipment via the at least one idle-mode beam, the master information block information and system information block information corresponding to the non-terrestrial radio network node; and facilitating, by the non-terrestrial radio network node, establishing a non-terrestrial connection with the at least one user equipment based on at least one connection establishment message delivered according to the system information block information.

10. The method of claim 1, further comprising:

facilitating, by the non-terrestrial radio network node, receiving a network energy saving configuration message comprising at least one network energy saving mode criterion;

determining, by the non-terrestrial radio network node, that the at least one energy saving mode criterion is satisfied; and based on the at least one energy saving mode criterion being determined to be satisfied, implementing the broadcasting, via the at least one idle-mode beam, of the reduced-content synchronization signal block signal message.

11. The method of claim 10, wherein the at least one network energy saving mode criterion comprises at least one of: at least one transitioning user equipment number criterion, applicable to a number of user equipment determined to be attempting to transition from an idle mode or an inactive mode to a connected mode with respect to the non-terrestrial radio network node; at least one energy consumption parameter criterion, applicable to energy consumption corresponding to the non-terrestrial radio network node; or at least one scheduled idle-mode beam period indication indicative of at least one idle-mode beam period during which the non-terrestrial radio network node is to broadcast the at least one reduced-content synchronization signal block signal message via the at least one idle-mode beam.

12. The method of claim 1, wherein the non-terrestrial radio network node avoids broadcasting, in the reduced-content synchronization signal block signal message via the at least one idle-mode beam, system information block information corresponding to the non-terrestrial radio network node.

13. A non-terrestrial radio network node, comprising at least one processor configured to process executable instructions that, when executed by the at least one processor, facilitate performance of operations, comprising:

determining content to be broadcast via a reduced-content synchronization signal block signal message; and broadcasting, via an idle-mode beam, the reduced-content synchronization signal block signal message comprising at least one first idle-mode beam preamble indication of at least one first idle-mode beam preamble of a first idle-mode beam preamble group and at least one second idle-mode beam preamble indication indicative of at least one second idle-mode beam preamble of a second idle-mode beam preamble group and comprising at least one idle-mode beam uplink resource indication indicative of at least one idle-mode beam uplink resource usable by the non-terrestrial radio network node to receive from at least one user equipment at least one of the at least one first idle-mode beam preamble or at least one of the at least one second idle-mode beam preamble, wherein at least one of the at least one first idle-mode beam preamble or the at least one second idle-mode beam preamble is to be usable by the at least one user equipment to establish a connection with the non-terrestrial radio network node, and wherein the non-terrestrial radio network node avoids including, in the reduced-content synchronization signal block signal message, master information block information corresponding to the non-terrestrial radio network node.

14. The non-terrestrial radio network node of claim 13, wherein receiving, by the non-terrestrial radio network node from the at least one user equipment via the at least one idle-mode beam uplink resource, of the at least one first idle-mode beam preamble of the first idle-mode beam preamble group is indicative to the non-terrestrial radio network node that the at least one user equipment obtained, from a terrestrial radio network node, system information block information, corresponding to the non-terrestrial radio network node, usable by the at least one user equipment to establish a connection with the non-terrestrial radio network node, and wherein the operations further comprise:

receiving, from at least one of the least one user equipment, a first idle-mode beam preamble via the at least one idle-mode beam uplink resource; and responsive to the receiving of the first idle-mode beam preamble via the at least one idle-mode beam uplink resource, establishing, with the at least one of the at least one user equipment, a connection according to the system information block information to result in an established connection.

15. The non-terrestrial radio network node of claim 14, wherein the operations further comprise:

receiving, from the at least one user equipment, a terrestrial radio node indication indicative of the terrestrial radio network node from which the at least one user equipment received the system information block information corresponding to the non-terrestrial radio network node;

determining a refined beam corresponding to the non-terrestrial radio network node to facilitate the established connection, wherein the refined beam corresponds to a location associated with the terrestrial radio network node; and conducting the established connection via the refined beam.

16. The non-terrestrial radio network node of claim 13, wherein receiving, by the non-terrestrial radio network node from the at least one user equipment via the at least one idle-mode beam uplink resource, of at least one second idle-mode beam preamble of the second idle-mode beam preamble group is indicative to the non-terrestrial radio network node that the at least one user equipment has not obtained system information block information corresponding to the non-terrestrial radio network node, and wherein the operations further comprise:

receiving, from at least one of the least one user equipment, a second idle-mode beam preamble via the at least one idle-mode beam uplink resource;

responsive to the receiving of the second idle-mode beam preamble via the at least one idle-mode beam uplink resource, activating the at least one idle-mode beam to result in at least one non-idle-mode beam;

transmitting, via the at least one non-idle-mode beam, a full synchronization signal block signal message at least comprising master information block information corresponding to the non-terrestrial radio network node and indicative of system information block information corresponding to the non-terrestrial radio network node; and establishing, with the at least one of the at least one user equipment, a connection according to the master information block information or the system information block information to result in an established connection.

17. The non-terrestrial radio network node of claim 13, wherein the operations further comprise:

receiving a network energy saving configuration message comprising at least one network energy saving mode criterion, and wherein the broadcasting of the reduced-content synchronization signal block signal message is implemented based on the at least one energy saving mode criterion being determined to be satisfied.

18. A non-transitory machine-readable medium, comprising executable instructions that, when executed by at least one processor of a non-terrestrial radio network node, facilitate performance of operations, comprising:

receiving a network energy saving configuration message comprising at least one network energy saving mode criterion;

determining that the at least one energy saving mode criterion is satisfied;

based on the at least one energy saving mode criterion being determined to be satisfied, broadcasting, via an idle-mode beam, a reduced-content synchronization signal block signal message comprising at least one first idle-mode beam preamble, at least one second idle-mode beam preamble, and an idle-mode beam uplink resource indication indicative of at least one idle-mode beam uplink resource usable by the non-terrestrial radio network node to receive from at least one user equipment at least one of the at least one first idle-mode beam preamble or the at least one second idle-mode beam preamble, wherein the at least one first idle-mode beam preamble or the at least one second idle-mode beam preamble is to be usable by the at least one user equipment to facilitate establishing a connection with the non-terrestrial radio network node, and wherein the non-terrestrial radio network node avoids inclusion, in the reduced-content synchronization signal block signal message, of minimum system information.

19. The non-transitory machine-readable medium of claim 18, wherein the operations further comprise:

receiving, from at least one of the least one user equipment, a first idle-mode beam preamble via the at least one idle-mode beam uplink resource;

receiving, from at least one of the at least one user equipment, a terrestrial radio node indication indicative of a terrestrial radio network node from which the at least one of the at least one user equipment obtained system information block information corresponding to the non-terrestrial radio network node;

based on the terrestrial radio node indication, determining a refined beam corresponding to the non-terrestrial radio network node, wherein the refined beam is associated with a geographic coverage area that overlaps a location associated with the terrestrial radio network node and wherein the non-terrestrial radio network node avoids conducting a beam refinement procedure with the at least one of the at least one user equipment to determine the refined beam; and responsive to the first idle-mode beam preamble, establishing, with the at least one of the at least one user equipment via the refined beam, a connection according to the system information block information.

20. The non-transitory machine-readable medium of claim 18, wherein the reduced-content synchronization signal block signal message may comprise a primary synchronization signal block and a secondary synchronization signal block.

* * * * *